(12) United States Patent
Sato

(10) Patent No.: US 12,459,056 B2
(45) Date of Patent: Nov. 4, 2025

(54) PROCESSING SYSTEM

(71) Applicant: NIKON CORPORATION, Tokyo (JP)

(72) Inventor: Shinji Sato, Fukaya (JP)

(73) Assignee: NIKON CORPORATION, Tokyo (JP)

( * ) Notice: Subject to any disclaimer, the term of this patent is extended or adjusted under 35 U.S.C. 154(b) by 205 days.

(21) Appl. No.: 18/017,936

(22) PCT Filed: Jul. 29, 2020

(86) PCT No.: PCT/JP2020/029000
§ 371 (c)(1),
(2) Date: Jan. 25, 2023

(87) PCT Pub. No.: WO2022/024246
PCT Pub. Date: Feb. 3, 2022

(65) Prior Publication Data
US 2023/0256537 A1    Aug. 17, 2023

(51) Int. Cl.
*B23K 26/08* (2014.01)
*B23K 26/03* (2006.01)
(Continued)

(52) U.S. Cl.
CPC .......... *B23K 26/0884* (2013.01); *B23K 26/03* (2013.01); *B23K 26/032* (2013.01);
(Continued)

(58) Field of Classification Search
CPC .. B25K 26/0884; B25K 26/032; B25K 26/03; B25J 9/1679; B25J 9/1697; B25J 13/088;
(Continued)

(56) References Cited

U.S. PATENT DOCUMENTS

| | | |
|---|---|---|
| 4,733,606 A | 3/1988 | Frestadius et al. |
| 4,994,639 A | 2/1991 | Dickinson et al. |

(Continued)

FOREIGN PATENT DOCUMENTS

| | | |
|---|---|---|
| CA | 2851493 A1 | 12/2014 |
| DE | 10 2014 018 912 A1 | 6/2015 |

(Continued)

OTHER PUBLICATIONS

Jun. 5, 2024 Office Action issued in Australian Patent Application No. 2020460879.

(Continued)

*Primary Examiner* — Spencer D Patton
(74) *Attorney, Agent, or Firm* — Oliff PLC

(57) ABSTRACT

A processing system, which processes an object by irradiating the object with a processing light through an irradiation optical system, includes: an irradiation apparatus including at least a terminal optical element of the irradiation optical system; a movement apparatus that moves the irradiation apparatus; a first measurement apparatus that is disposed at the irradiation apparatus and measures a position of the object; a second measurement apparatus that measures the position of the object through at least the terminal optical element; and a third measurement apparatus that emits, from a position which is away from the irradiation apparatus, a measurement light toward the irradiation apparatus and measures the position of the irradiation apparatus by detecting the measurement light.

60 Claims, 24 Drawing Sheets

(51) Int. Cl.
*B25J 9/16* (2006.01)
*B25J 13/08* (2006.01)
(52) U.S. Cl.
CPC ........... *B25J 9/1679* (2013.01); *B25J 9/1697* (2013.01); *B25J 13/088* (2013.01)
(58) Field of Classification Search
CPC ...... B25J 11/005; B25J 19/021; B25J 19/022; B25J 19/023
See application file for complete search history.

(56) References Cited

U.S. PATENT DOCUMENTS

| | | | |
|---|---|---|---|
| 6,847,436 | B2 | 1/2005 | Bridges |
| 7,800,758 | B1 | 9/2010 | Bridges et al. |
| 2012/0188557 | A1 | 7/2012 | Goodwin et al. |
| 2017/0016712 | A1 | 1/2017 | Suzuki |
| 2017/0044002 | A1 | 2/2017 | Hariyama et al. |
| 2017/0210011 | A1 | 7/2017 | Hull |
| 2018/0221990 | A1* | 8/2018 | Aoki ................... G02B 26/10 |
| 2021/0323163 | A1* | 10/2021 | Halvorsen ............ G05B 19/401 |
| 2021/0370444 | A1* | 12/2021 | Shiraishi .............. B23K 26/082 |

FOREIGN PATENT DOCUMENTS

| | | |
|---|---|---|
| DE | 10 2018 102 333 A1 | 8/2018 |
| JP | H02-229687 A | 9/1990 |
| JP | 2005-169397 A | 6/2005 |
| JP | 2005-337912 A | 12/2005 |
| WO | 2000/054925 A1 | 9/2000 |
| WO | WO-2019082309 A1 * 5/2019 ............ B23K 26/03 |

OTHER PUBLICATIONS

Apr. 2, 2024 Office Action issued in Japanese Patent Application No. 2022-539857.
Mar. 7, 2024 extended Search Report issued in European Patent Application No. 20947613.4.
Oct. 30, 2024 Office Action issued in Canadian Patent Application No. 3,189,581.
Oct. 13, 2020 Search Report issued in International Patent Application No. PCT/JP2020/029000.
Oct. 13, 2020 Written Opinion issued in International Patent Application No. PT/JP2020/029000.
Mar. 28, 2025 Office Action issued in Chinese Patent Application No. 202080104817.7.

* cited by examiner

PROCESSING SYSTEM

TECHNICAL FIELD

The present invention relates to a technical field of a processing system that processes an object.

BACKGROUND ART

A Patent Literature 1 discloses, as a processing system configured to process an object, a processing system that processes an object by irradiating a surface of the object with a processing light. This type of processing system is required to properly measure a position of at least one of the object and an irradiation apparatus that irradiates the object with the processing light (namely, a processing apparatus that process the object).

CITATION LIST

Patent Literature

Patent Literature 1: WO2000/054925A

SUMMARY OF INVENTION

A first aspect provides a processing system that processes an object by irradiating the object with a processing light through an irradiation optical system, the processing system including: an irradiation apparatus that includes at least a terminal optical element of the irradiation optical system; a movement apparatus that moves the irradiation apparatus; a first measurement apparatus that is disposed at the irradiation apparatus and that measures a position of the object; a second measurement apparatus that measures a position of the object through at least the terminal optical element of the irradiation optical system; and a third measurement apparatus that measures a position of the irradiation apparatus by emitting, from a position which is away from the irradiation apparatus, a measurement light toward the irradiation apparatus and detecting the measurement light.

A second aspect provides a processing system that processes an object by irradiating the object with a processing light through an irradiation optical system, the processing system including: an irradiation apparatus that includes at least a terminal optical element of the irradiation optical system; a movement apparatus that moves the irradiation apparatus; a first measurement apparatus that is disposed at the irradiation apparatus and that measures a position of the object; a second measurement apparatus that measures a position of the object through the irradiation optical system; and a third measurement apparatus that measures a position of the irradiation apparatus.

A third aspect provides a processing system that processes an object by irradiating the object with a processing light through an irradiation optical system, the processing system including: an irradiation apparatus that includes at least a terminal optical element of the irradiation optical system; a movement apparatus that moves the irradiation apparatus; a first measurement apparatus that is disposed at a position fixed relative to the terminal optical element and that measures a position of the object; a second measurement apparatus that measures a position of the object through the terminal optical element; and a third measurement apparatus that measures a position of a reflection part by irradiating the reflection part, which is disposed at a position fixed relative to the terminal optical element, with a measurement light and detecting the measurement light reflected by the reflection part.

A fourth aspect provides a processing system that processes an object, the processing system including: a movable arm; an end effector that is connected to the movable arm and that is for processing the object; a first measurement apparatus that is fixed relative to the end effector and that measures a position of the object; a second measurement apparatus that measures a position of the object through the irradiation optical system; and a third measurement apparatus that measures a position of the end effector by emitting, from a position which is away from the end effector, a measurement light toward the end effector and detecting the measurement light.

A fifth aspect provides a processing system that processes an object by irradiating the object with a processing light through an irradiation optical system, the processing system including: an irradiation apparatus that includes at least a terminal optical element of the irradiation optical system; a first measurement apparatus that measures a position of the object in at least a direction that intersects with an irradiation direction of the processing light; a movement apparatus that moves the irradiation apparatus and the first measurement apparatus; a second measurement apparatus that measures a position of the object in the irradiation direction of the processing light through at least a part of the irradiation optical system; and a third measurement apparatus that measures a position of the irradiation apparatus by emitting, from a position which is away from the irradiation apparatus, a measurement light toward the irradiation apparatus and detecting the measurement light.

A sixth aspect provides a processing system that processes an object, the processing system including: a first irradiation apparatus that includes at least a first terminal optical element of a first irradiation optical system that irradiates the object with a first processing light; a second irradiation apparatus that includes at least a second terminal optical element of a second irradiation optical system that irradiates the object with a second processing light; and a measurement apparatus that measures positions of the first and second irradiation apparatuses, the first irradiation apparatus processing a first area of the object, the second irradiation apparatus processing a second area of the object, the measurement apparatus being configured to measure the positions of the first and second irradiation apparatuses from a position that is away from the first irradiation apparatus, the second irradiation apparatus, and the object.

A seventh aspect provides a processing system that processes an object by irradiating the object with a processing light through an irradiation optical system, the processing system including: an irradiation apparatus that includes at least a terminal optical element of the irradiation optical system; a movement apparatus that moves the irradiation apparatus; a first measurement apparatus that is disposed at the irradiation apparatus and that measures a position of the object; a second measurement apparatus that measures a position of the object through at least the terminal optical element of the irradiation optical system; and a third measurement apparatus that measures a position of the irradiation apparatus by emitting, from a position which is away from the irradiation apparatus, a measurement light toward the irradiation apparatus and detecting the measurement light.

DESCRIPTION OF EXAMPLE EMBODIMENTS

Next, an example embodiment of a processing system will be described with reference to drawings. In the below-described description, the example embodiment of the processing system will be described by using a processing system SYS configured to process an object that is a workpiece W (namely, to perform a processing operation for the workpiece W) by using a processing light EL. However, the present invention is not limited to the below-described example embodiments.

Moreover, in the below-described description, a positional relationship of various components included in the processing system SYS will be described by using an XYZ rectangular coordinate system that is defined by an X-axis, a Y-axis, and a Z-axis that are perpendicular to one another. Note that each of an X-axis direction and a Y-axis direction is assumed to be a horizontal direction (namely, a predetermined direction in a horizontal plane), and a Z-axis direction is assumed to be a vertical direction (namely, a direction that is perpendicular to the horizontal plane, and substantially a vertical direction) in the below-described description, for convenience of the description. In the below-described description, a coordinate system in which each of the X-axis direction and the Y-axis direction is the horizontal direction, and the Z-axis direction is the vertical direction is referred to as a base coordinate system that is used as a base in the processing system SYSa. In the below-described description, the X-axis, the Y-axis, and the Z-axis may mean the X-axis, the Y-axis, and the Z-axis in the base coordinate system, respectively, when there is no specific notation. Moreover, rotational directions (in other words, inclination directions) around the X-axis, the Y-axis, and the Z-axis are referred to as a OX direction, a OY direction, and a OZ direction, respectively.

(1) Processing System SYSa in First Example Embodiment

Firstly, a processing system SYS in a first example embodiment (in the below-described description, the processing system SYS in the first example embodiment is referred to as a "processing system SYSa") will be described.

(1-1) Configuration of Processing System SYSa

Figure 1:
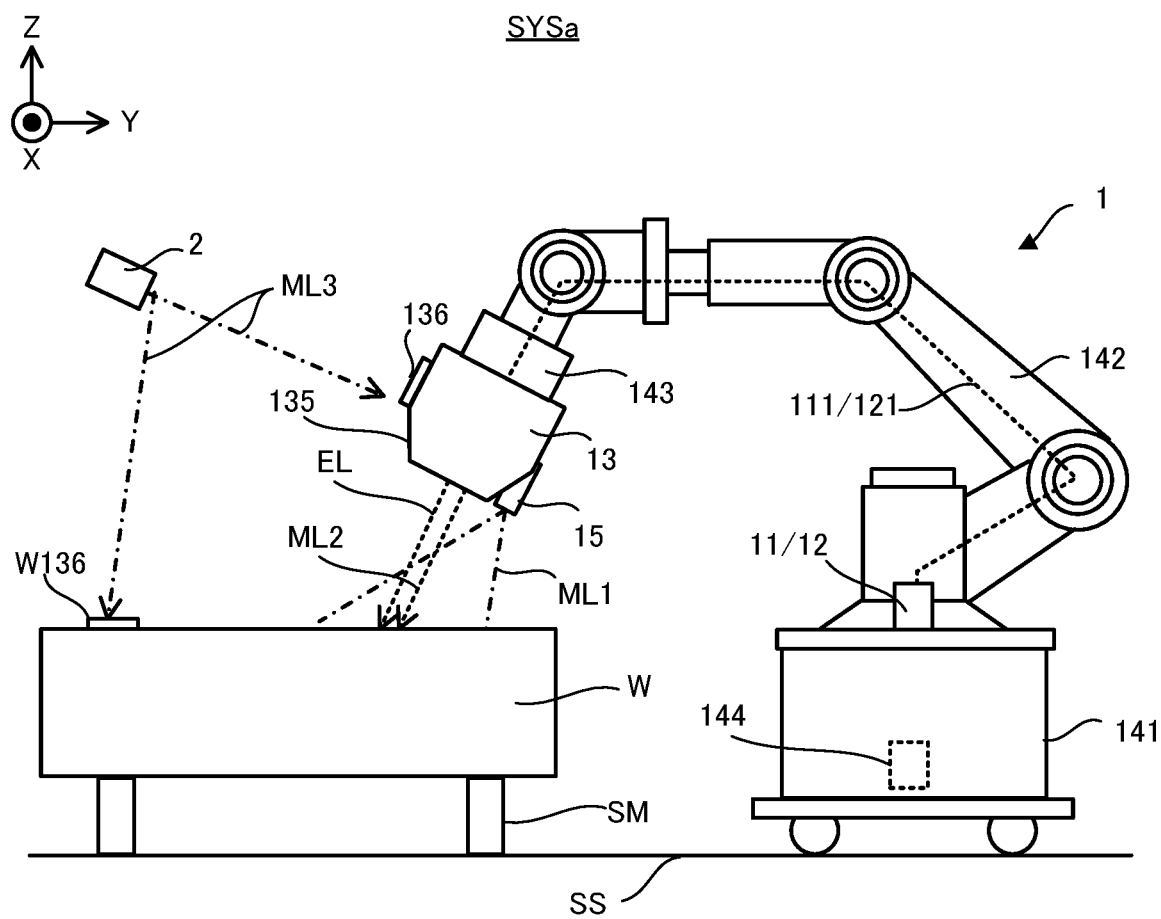
FIG. 1 is a schematical view that schematically illustrates one example of an entire configuration of a processing system in a first example embodiment.
Figure 2:
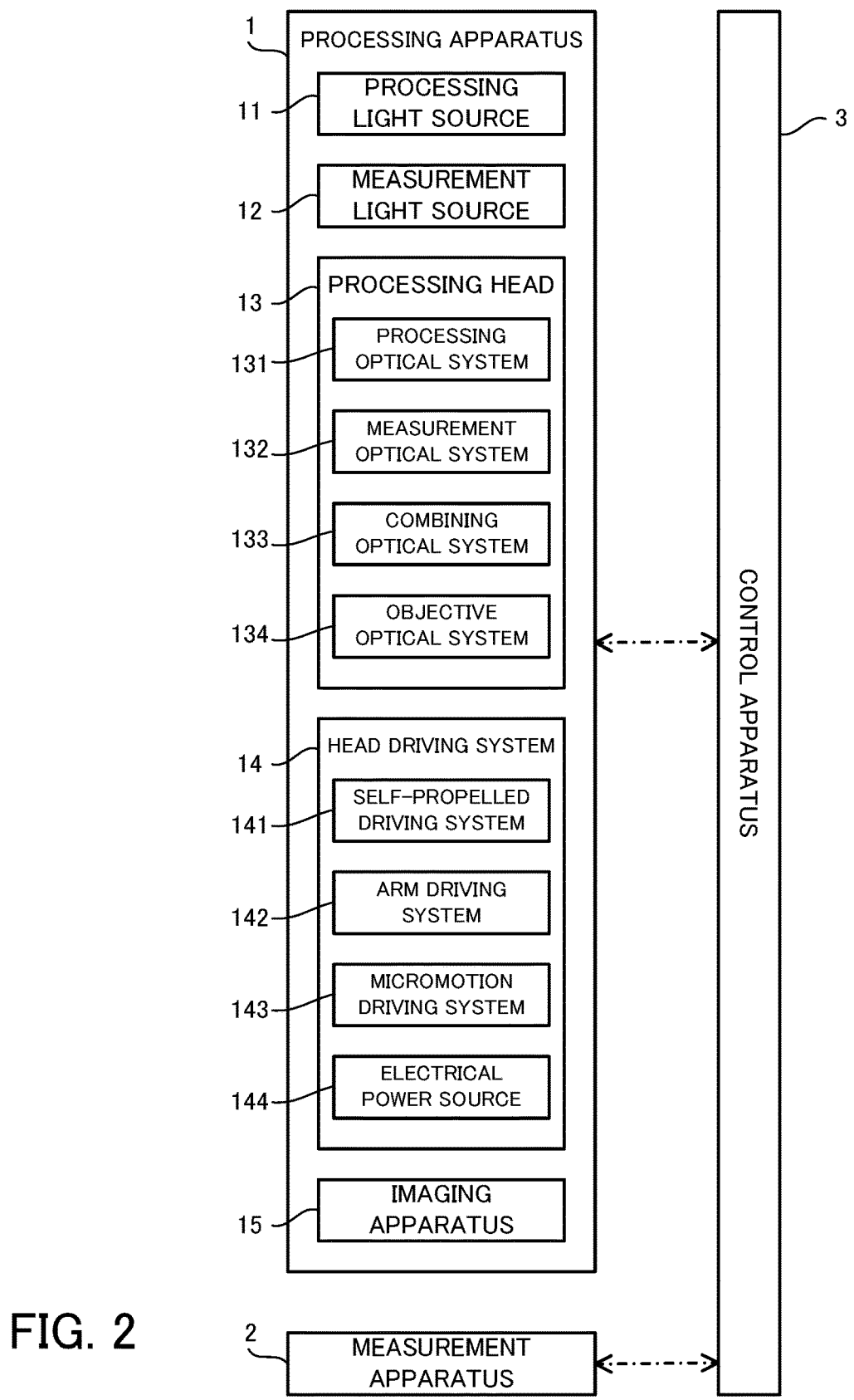
FIG. 2 is a system configuration diagram that illustrates one example of a system configuration of the processing system in the first example embodiment.

Firstly, with reference to FIG. 1 and FIG. 2, a configuration of the processing system SYSa in the first example embodiment will be described. FIG. 1 is a side view that schematically illustrates exterior appearance of the processing system SYSa in the first example embodiment. FIG. 2 is a system configuration diagram that illustrates a system configuration of the processing system SYSa in the first example embodiment.

As illustrated in FIG. 1 and FIG. 2, the processing system SYSa includes a processing apparatus 1, a measurement apparatus 2, and a control apparatus 3.

The processing apparatus 1 is configured to process the workpiece W under the control of the control apparatus 3. The workpiece W may be a metal, may be an alloy (for example, duralumin and the like), may be a semiconductor (for example, silicon), may be a resin, may be a composited material such as a CFRP (Carbon Fiber Reinforced Plastic), a painting material (as one example a film of painting material that is coated on a base member), may be a glass or may be an object that is made from any other material, for example.

The workpiece W is disposed on a support surface SS. As illustrated in FIG. 1, the workpiece W may be disposed on the support surface SS through a support member SM that supports the workpiece on the support surface SS. Alternatively, the workpiece W may be directly disposed on the support surface SS. The support surface SS may be referred to as a disposed surface, because the workpiece W may be disposed on the support surface SS.

The processing apparatus 1 irradiates the workpiece W with the processing light EL in order to process the workpiece W. The processing light EL may be any light as long as the workpiece W is processed by irradiating the workpiece W with it. In the first example embodiment, an example in which the processing light EL is a laser light will be described, however, the processing light EL may be a light that is different from the laser light. Furthermore, a wavelength of the processing light EL may be any wavelength as long as the workpiece W is processed by irradiating the workpiece W with it. For example, the processing light EL may be a visible light or may be an invisible light (for example, at least one of infrared light, ultraviolet light, extreme ultraviolet light, and the like). The processing light EL may include a pulsed light (for example, a pulsed light, an ON time of which is equal to or shorter than a pico-order second). Alternatively, the processing light EL may not include the pulsed light. In other words, the processing light EL may be a continuous light.

The processing apparatus 1 may perform a removal processing for removing a part of the workpiece W by irradiating the workpiece W with the processing light EL. When the removal processing is performed, the processing apparatus 1 may form a riblet structure on the workpiece W. The riblet structure may include a structure by which a resistance (especially at least one of frictional resistance and a turbulent frictional resistance) of the surface of the workpiece W to a fluid is reducible. The riblet structure may include a structure by which noise generated when the fluid and the surface of the workpiece W relatively move is reducible. The riblet structure may include a structure in which a plurality of grooves, each of which extends along a first direction (for example, the Y-axis direction) that is along a surface of the workpiece W, are arranged along a second direction (for example, the X-axis direction) that is along the surface of the workpiece W, and that intersects with the first direction, for example. Note that the fluid here means any medium (for example, at least one of a gas and a liquid) that flows relative to the surface of the workpiece W. For example, the medium may be referred to as the fluid when the surface of workpiece W moves relative to the medium, although the medium itself is static. Note that a state where the medium is static may mean a state where the medium does not move relative to a predetermined reference object (for example, the support surface SS or surface of a ground).

When the removal processing is performed, the processing system SYSa may form any structure having any shape on the surface of the workpiece W. A structure for generating a swirl in a flow of the fluid on the surface of the workpiece W is one example of any structure. A structure for giving a hydrophobic property to the workpiece W is one example of any structure. A fine texture structure (typically, a concave and convex structure) that is formed regularly or irregularly in a micro/nano-meter order is one example of any structure. This fine texture structure may include at least one of a shark skin structure or a dimple structure that has a function of reducing a resistance from a fluid (a liquid and/or a gas). The fine texture structure may include a lotus leaf surface structure that has at least one of a liquid repellent function and a self-cleaning function (for example, has a lotus effect). The fine texture structure may include at least one of a fine protrusion structure that has a liquid transporting function (US2017/0044002A1), a concave and convex structure that has a lyophile effect, a concave and convex structure that has an antifouling effect, a moth eye structure that has at least one of a reflectance reduction function and a liquid repellent function, a concave and convex structure that intensifies only light of a specific wavelength by interference to have a structural color, a pillar array structure that has an adhesion function using van der Waals force, a concave and convex structure that has an aerodynamic noise reduction function, a honeycomb structure that has a droplet collection function, a concave and convex structure that improves an adherence to a layer formed on a surface and so on. Here, the fine texture structure may not have specific function. Note that the processing system SYSa may smooth the surface of the workpiece W. Here, smoothing the surface may mean processing the surface so that the surface that has been processed is smoother than the surface that is not yet processed. Moreover, the processing system SYSa may remove burr existing on the surface of the workpiece W.

The processing apparatus 1 may perform an additive processing for adding new structural object to the workpiece W by irradiating the workpiece W with the processing light EL, in addition to or instead of the removal processing. In this case, the processing apparatus 1 may form the above-described riblet structure on the surface of the workpiece W by performing the additive processing. The processing apparatus 1 may perform a marking processing for forming a desired mark on the surface of the workpiece W by irradiating the workpiece W with the processing light EL, in addition to or instead of at least one of the removal processing and the additive processing.

Furthermore, the processing apparatus 1 is configured to measure the workpiece W under the control of the control apparatus 3. The processing apparatus 1 irradiates the workpiece W with a measurement light ML2 in order to measure the workpiece W. The measurement light ML2 may be any type of light, as long as the workpiece W is measurable by irradiating the workpiece W with it. In the first example embodiment, an example in which the measurement light ML2 is a laser light will be described. However, the measurement light ML2 may be a light that is different from the laser light. Furthermore, a wavelength of the measurement light ML2 may be any wavelength, as long as the workpiece W is measurable by irradiating the workpiece W with it. For example, the measurement light ML2 may be a visible light, or may be an invisible light (for example, at least one of infrared light, ultraviolet light, extreme ultraviolet light and the like). The measurement light ML2 may include a pulsed light (for example, a pulsed light an ON time of which is equal to or shorter than an pico-order second). Alternatively, the measurement light ML2 may not include the pulsed light. In other words, the measurement light ML2 may be a continuous light.

The wavelength of the measurement light ML2 may be different from the wavelength of the processing light EL. For example, the wavelength of the measurement light ML2 may be shorter than the wavelength of the processing light EL. As one example, a light having a wavelength of 266 nm or 355 nm may be used as the measurement light ML2 and a light having a wavelength of 532 nm, 1 µm or 10 µm may be used as the processing light EL. In this case, a diameter of a spot of the measurement light ML2 on the workpiece W is smaller than a diameter of a spot of the processing light EL on the workpiece W. As a result, a measurement resolution by the measurement light ML2 is higher than a processing resolution by the processing light EL. Note that the processing resolution may mean a limit value of fineness of the processing by the processing light EL (for example, a minimum size that can be processed). The measurement resolution may mean a limit value of fineness of the measurement by the measurement light ML2 (for example, a minimum size that can be measured). However, the wavelength of the measurement light ML2 may not be shorter than the wavelength of the processing light EL. The wavelength of the measurement light ML2 may be same as the wavelength of the processing light EL.

The processing apparatus 1 may be configured to measure a state of the workpiece W by using the measurement light ML2. The state of the workpiece W may include a position of the workpiece W. The position of the workpiece W may include a position of the surface of the workpiece W. The position of the surface of the workpiece W may include a position of each surface part, which is obtained by segmentalizing the surface of the workpiece W, in at least one of the X-axis direction, the Y-axis direction and the Z-axis direction. The position of the surface of the workpiece W may include a position of each surface part, which is obtained by segmentalizing the surface of the workpiece W, in at least one of the OX direction, the OY direction and the OZ direction. Namely, the processing apparatus 1 may be configured to measure the position of the workpiece W in at least one of the X-axis direction, the Y-axis direction, Z-axis direction, the OX direction, the OY direction and the OZ direction. Here, the position of the workpiece W in at least one of the OX direction, the OY direction and the OZ direction may be referred to as an attitude of the workpiece W. Note that the position of each surface part in at least one of the OX direction, the OY direction and the OZ direction may be regarded to be equivalent to an attitude of each surface part (namely, a direction of each surface part (for example, a direction of a normal line of each surface part), and it is substantially equivalent to an inclined amount of each surface part with respect to at least one of the X-axis, the Y-axis and the Z-axis). Here, the inclined amount of each surface part may mean an angle between the normal line of each surface part and at least one of the X-axis, the Y-axis and the Z-axis. In this case, it can be said that the state of the workpiece substantially includes a shape (for example, a three-dimensional shape) of the workpiece W. Moreover, the state of the workpiece W may include a size (for example, a size in at least one of the X-axis direction, the Y-axis direction and the Z-axis direction) of the workpiece W. Moreover, the processing apparatus 1 may be configured to measure a characteristic of the workpiece W by using the measurement light ML2. The characteristic of the workpiece W may include a roughness of the surface of the workpiece W. the roughness of the surface may mean a roughness of the surface defined in ISO25178. The characteristic of the workpiece W may include at least one of a reflectance of the workpiece W relative to the light having a predetermined wavelength. Note that the reflectance of the workpiece W may mean a ratio of a luminous flux of a light entering the workpiece W relative to a luminous flux of a light that is reflected by the workpiece W and that has the predetermined wavelength. Here, the reflectance of the workpiece W may include a reflectance for each wavelength. Namely, the characteristic of the workpiece W may include a color of the workpiece W. Note that the color of the workpiece W may mean a visual perception (a color perception or a white stimulus) perceived by a composition of the light from the surface of the workpiece W (namely, a wavelength component constituting the light from the surface of the workpiece W).

In order to process and measure the workpiece W, the processing apparatus 1 includes a processing light source 11 that generates the processing light EL, a measurement light source 12 that generates and the measurement light ML2, a processing head 13, a head driving system 14 and an imaging apparatus 15.

The processing head 13 irradiates the workpiece W with the processing light EL from the processing light source 11 and irradiates the workpiece W with the measurement light EM2 from the measurement light source 12. Thus, the processing head 13 may be referred to as an irradiation apparatus. In order to irradiate the workpiece W with the processing light EL and the measurement light ML2, the processing head 13 includes a processing optical system 131, a measurement optical system 132, a combining optical system 133 and an objective optical system 134. The processing head 13 irradiates the workpiece W with the processing light EL through the processing optical system 131, the combining optical system 133 and the objective optical system 134. Thus, the processing head 13 may be regarded to process the workpiece W through the processing optical system 131, the combining optical system 133 and the objective optical system 134. In this case, an optical system including the processing optical system 131, the combining optical system 133 and the objective optical system 134 may be regarded to serve as an irradiation optical system for irradiating the workpiece W with the processing light EL. Moreover, the processing head 13 irradiates the workpiece W with the measurement light ML2 through the measurement optical system 132, the combining optical system 133 and the objective optical system 134. Thus, the processing head 13 may be regarded to measure the workpiece W through the measurement optical system 132, the combining optical system 133 and the objective optical system 134. In this case, an optical system including the measurement optical system 132, the combining optical system 133 and the objective optical system 134 may be regarded to serve as an irradiation optical system for irradiating the workpiece W with the measurement light ML2. Note that a detailed description of a configuration of the processing head 13 will be described later in detail with reference to FIG. 4.

The head driving system 14 moves the processing head 13. Specifically, the head driving system 14 moves the processing head 13 relative to the workpiece W. Thus, the head driving system 14 may be referred to as a movement apparatus. In order to move the processing head 13, the head driving system 14 includes a self-propelled driving system 141, an arm driving system 142 and a micromotion driving system 143. However, the head driving system 14 may not include at least one of the self-propelled driving system 141, the arm driving system 142 and the micromotion driving system 143. The head driving system 14 that is referred to as the movement apparatus moves a terminal optical element of the processing head 13 (specifically, an optical element at a final stage having a power of a plurality of optical elements disposed on an optical path of the processing light EL, and a fθ lens 1342 described below). Note that a configuration of each of the self-propelled driving system 141, the arm driving system 142 and the micromotion driving system 143 will be described later in detail with reference to FIG. 6 to FIG. 7. However, an overview of the self-propelled driving system 141, the arm driving system 142 and the micromotion driving system 143 is briefly described here.

The self-propelled driving system 141 is configured to move by itself on the support surface SS which supports the workpiece W or on which the workpiece W is disposed. Here, "a state where the self-propelled driving system 141 moves by itself on the support surface SS" may mean a state where the self-propelled driving system 141 moves relative to the support surface SS by using a driving power generated the self-propelled driving system 141 itself. The processing head 13 is connected to (in other words, coupled to or linked to) the self-propelled driving system 141 through the arm driving system 142 and the micromotion driving system 143. Thus, the self-propelled driving system 141 moves the processing head 13 by moving by itself to. Thus, the self-propelled driving system 141 may be referred to as a movement apparatus or a self-propelled apparatus.

The arm driving system 142 is a driving system that is configured to serve as a robot arm. The processing head 13 is connected to the arm driving system 142 through the micromotion driving system 143. The arm driving system 142 moves the processing head 13 by moving like the robot arm. Thus, the arm driving system 142 may be referred to as a movement apparatus.

The arm driving system 142 may move the processing head 13 in a moving stroke that is shorter than that by the self-propelled driving system 141. In other words, the self-propelled driving system 141 may move the processing head 13 in a moving stroke that is longer than that by the arm driving system 142. Note that the moving stroke may mean a maximum moving distance along one direction. The arm driving system 142 may move the processing head 13 in the moving stroke equal to or longer than that of the self-propelled driving system 141. On the other hand, a moving accuracy (in other words, a moving resolution) of the processing head 13 by the arm driving system 142 may be higher than the moving accuracy of the processing head 13 by the self-propelled driving system 141. In other words, the moving accuracy of the processing head 13 by the self-propelled driving system 141 may be lower than the moving accuracy of the processing head 13 by the arm driving system 142. Note that the moving accuracy (the moving resolution) may mean a limit value of fineness of the movement (for example, a minimum moving distance). However, the moving accuracy of the processing head 13 by the arm driving system 142 may be equal to the moving accuracy of the processing head 13 by the self-propelled driving system 141. Note that the processing head 13 may be referred to as an end effector, because the processing head 13 is connected to the arm driving system 142 configured to serve as the robot arm.

The micromotion driving system 143 moves (in other words, drives) the processing head 13 in the moving stroke that is shorter than that by the arm driving system 142. Thus, the micromotion driving system 143 may be referred to as a movement apparatus or a driving apparatus. On the other hand, the moving accuracy of the processing head 13 by the micromotion driving system 143 is higher than the moving accuracy of the processing head 13 by the arm driving system 142. Thus, in the first example embodiment, the processing system SYSa may adjust a position of the processing head 13 relative to the workpiece W with relatively rough or low accuracy by using the self-propelled driving system 141 and the arm driving system 142. Then, the processing system SYSa may adjust the position of the processing head 13 relative to the workpiece W with relatively fine or high accuracy by using the micromotion driving system 143.

The head driving system 14 may include an electric power source 144. Note that the electric power source 144 is disposed at the self-propelled driving system 141 in an example illustrated in FIG. 1, however, a disposed position of the electric power source 144 is not limited to the position illustrated in FIG. 1. The electric power source 144 may supply, to the self-propelled driving system 141, an electric power that is used by the self-propelled driving system 141 to move the processing head 13. The electric power source 144 may supply, to the arm driving system 142, an electric power used by the arm driving system 142 to move the processing head 13. The electric power source 144 may supply, to the micromotion driving system 143, an electric power used by the micromotion driving system 143 to move the processing head 13. The electric power source 144 may supply the electric power to at least one of the self-propelled driving system 141, the arm driving system 142 and the micromotion driving system 143 through an electric power cable. The electric power source 144 may supply the electric power to at least one of the self-propelled driving system 141, the arm driving system 142 and the micromotion driving system 143 by using a non-contact charging method (in other words, a wireless charging method). The electric power source 144 may be charged by an electric power that is supplied from an outside of the electric power source 144 through a charging cable. The electric power source 144 may be charged by an electric power that is supplied from an outside of the electric power source 144 by the non-contact charging method (in other words, the wireless charging method).

Each of the self-propelled driving system 141, the arm driving system 142 and the micromotion driving system 143 moves the processing head 13 along at least one of the X-axis, the Y-axis, the Z-axis, the OX direction, the OY direction and the OZ direction. Note that moving the processing head 13 along at least one of the OX direction, the OY direction and the OZ direction may be regarded to be equivalent to changing an attitude of the processing head 13 around at least one of the X-axis, the Y-axis, the Z-axis.

When the processing head 13 moves, a positional relationship between the processing head 13 and the workpiece W changes. Furthermore, when the positional relationship between the processing head 13 and the workpiece W changes, a positional relationship between each optical system (namely, at least one of the processing optical system 131, the measurement optical system 132, the combining optical system 133 and the objective optical system 134) of the processing head 13 and the workpiece W changes. Furthermore, when the positional relationship between the processing head 13 and the workpiece W changes, an irradiation position of each of the processing light EL and the measurement light ML2 on the workpiece W changes. Therefore, moving the processing head 13 is equivalent to changing the irradiation position of each of the processing light EL and the measurement light ML2 on the workpiece W. Moving the processing head 13 is equivalent to changing a condensed position of each of the processing light EL and the measurement light ML2 relative to the workpiece W.

The imaging apparatus 15 is disposed at (namely, attached to or fixed to) the processing head 13. Thus, the imaging apparatus 15 is disposed at a position that is fixed relative to the processing head 13. Since the processing head 13 includes each optical system described above, the imaging apparatus 15 may be regarded to be disposed at a position that is fixed relative to each optical system of the processing head 13. When the head driving system 14 moves the processing head 13 as described above, the imaging apparatus 15 attached to the processing head 13 also moves. Thus, the head driving system 14 may be regarded to serve as a movement apparatus that moves the imaging apparatus 15. Alternatively, the head driving system 14 may be regarded to serve as a movement apparatus that moves the processing head 13 and the imaging apparatus 15 together. Note that the imaging apparatus 15 may be disposed at a member other than the processing head 13. Even in this case, the imaging apparatus 15 may be disposed at a position that is fixed relative to the processing head 13.

The imaging apparatus 15 is configured to capture an image of the workpiece W. For example, the imaging apparatus 15 may illuminate the workpiece W with an illumination light ML1 that may be referred to as a metering light and capture the image of the workpiece W that is illuminated with the illumination light ML1. Alternatively, the imaging apparatus 15 may capture the image of the workpiece W that is illuminated with an ambient light (alternatively, nan illumination light emitted from an apparatus different from the imaging apparatus 15) without illuminating the workpiece W with the illumination light ML1.

The imaging apparatus 15 may capture the image of the workpiece W not through at least a part of each optical system of the processing head 13. Note that "capturing the image of the workpiece W not through at least a part of the optical system" may mean "capturing the image of the workpiece W without optically receiving a light from the workpiece W that has passed through at least a part of the optical system". "Capturing the image of the workpiece W not through at least a part of the optical system" may mean "capturing the image of the workpiece W by optically receiving a light from the workpiece W that has not passed through at least a part of the optical system". For example, the imaging apparatus 15 may capture the image of the workpiece W not through the processing optical system 131, the measurement optical system 132, the combining optical system 133 and the objective optical system 134. For example, the imaging apparatus 15 may capture the image of the workpiece W not through at least the fθ lens 1342.

The imaging apparatus 15 measures a position of the workpiece W by capturing the image of the workpiece W. Thus, the imaging apparatus 15 may be referred to as a measurement apparatus. Incidentally, when the imaging apparatus 15 may capture the image of the workpiece W not through at least a part of each optical system of the processing head 13 as described above, the imaging apparatus 15 may be regarded to serve as a measurement apparatus that measures the position of the workpiece W not through at least a part of each optical system of the processing head 13. Note that "measuring the position of the workpiece W not through at least a part of the optical system" may mean "measuring the position of the workpiece W without using light from the workpiece W that has passed through at least a part of the optical system". "Measuring the position of the workpiece W not through at least a part of the optical system" may mean "measuring the position of the workpiece W by using the light from the workpiece W that has not passed through at least a part of the optical system".

Specifically, the image of the workpiece W (hereinafter, it is referred to as a "workpiece image") captured by the imaging apparatus 15 is outputted from the imaging apparatus 15 to the control apparatus 3. The control apparatus 3 calculates the position of the workpiece W by analyzing the workpiece image. For example, the control apparatus 3 calculates the position of the workpiece W in at least one of the X-axis, the Y-axis, the Z-axis, the OX direction, the OY direction and the OZ direction by analyzing the workpiece image. In this case, it can be said that the imaging apparatus 15 measures the position of the workpiece W by using a method that is different from the above-described method of measuring the position of the workpiece W by using the measurement light ML2. For example, it can be said that the imaging apparatus 15 optically measures the position of the workpiece W not through each optical system of the processing head 13.

Since the imaging apparatus 15 is attached to the processing head 13, the imaging apparatus 15 may measure the position of the workpiece W in a head coordinate system that is defined based on the processing head 13. Namely, the control apparatus 3 may calculate the position of the workpiece W in the head coordinate system based on the workpiece image captured by the imaging apparatus 15. Note that the head coordinate system may be a coordinate system in which an axis along an optical axis of the objective optical system 134 (especially, an optical axis AX of the fθ lens 1342 described below) of the processing head 13 is set to be the Z-axis and two axes that are perpendicular to the optical axis AX of the fθ lens 1342 and that are perpendicular to each other are set to be the X-axis and the Y-axis. Namely, the head coordinate system is a coordinate system that is defined in the base coordinate system by three coordinate axes whose position and attitude relative to the base coordinate system are determined based on the position (including the attitude) of the processing head 13 in the base coordinate system. However, since the processing head 13 moves in the base coordinate system by the head driving system 14, the position of the processing head 13 in the base coordinate system is an information that is already known to the control apparatus 3. Thus, the control apparatus 3 may convert a coordinate in the base coordinate system into a coordinate in the head coordinate system and convert the coordinate in the head coordinate system into the coordinate in the base coordinate system based on the position of the processing head 13 in the base coordinate system. Thus, an operation for measuring the position of the workpiece W (alternatively, any object) in the head coordinate system may be regarded to be substantially equivalent to an operation for measuring the position of the workpiece W (alternatively, any object) in the base coordinate system.

Note that the processing head 13 irradiates the workpiece W with the measurement light ML2 propagating along the optical axis AX of the fθ lens 1342 as described below. Thus, the head coordinate system may be a coordinate system in which an axis along a propagating direction (an irradiation direction) of the measurement light ML2 is set to be the Z-axis and two axes that are perpendicular to the propagating direction of the measurement light ML2 and that are perpendicular to each other are set to be the X-axis and the Y-axis. Moreover, the processing head 13 irradiates the workpiece W with the processing light EL propagating along the optical axis AX of the fθ lens 1342 as described below. Thus, the head coordinate system may be a coordinate system in which an axis along a propagating direction (an irradiation direction) of the processing light EL is set to be the Z-axis and two axes that are perpendicular to the propagating direction of the processing light EL and that are perpendicular to each other are set to be the X-axis and the Y-axis.

The imaging apparatus 15 may capture an image of a feature point of the workpiece W in order to measure the position of the workpiece W. The feature point of the workpiece W may include a part of the workpiece W that exists at a characterizing position. The characterizing position may include a position corresponding to at least a corner of the workpiece W, an edge of the workpiece W, a center of the workpiece W and a border between an area that has been already processed by the processing light EL and an area that has not been processed by the processing light EL on the workpiece W, for example. The feature point of the workpiece W may include a part of the workpiece W that has a characterizing shape. The characterizing shape may include at least one of a convex shape protruding from a surrounding and a convex shape depressed from a surrounding, for example. In this case, the control apparatus 3 may calculate the position of the workpiece W in the head coordinate system by calculating a position of the feature point in the workpiece image. For example, the control apparatus 3 may calculate the position of the workpiece W along either one of the X-axis direction, the Y-axis direction and the OZ direction in the head coordinate system by calculating the position of one feature point in the workpiece image. For example, the control apparatus 3 may calculate the position of the workpiece W along either two of the X-axis direction, the Y-axis direction and the OZ direction in the head coordinate system by calculating the positions of two feature points in the workpiece image. For example, the control apparatus 3 may calculate the position of the workpiece W along each of the X-axis direction, the Y-axis direction and the OZ direction in the head coordinate system by calculating the positions of three or more feature point in the workpiece image.

Figure 3:
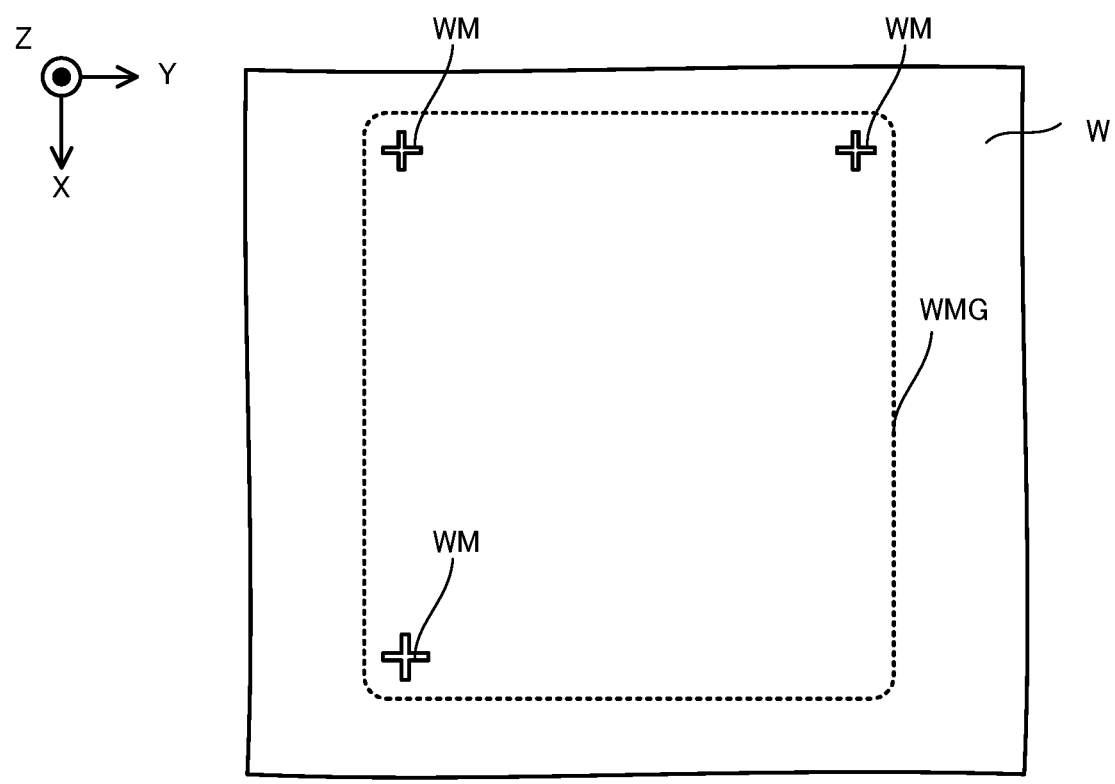
FIG. 3 is a planar view that illustrates one example of a workpiece marker formed on a workpiece.

The imaging apparatus 15 may capture an image of a marker formed on the workpiece W (hereinafter, it is referred to as a "workpiece marker WM") in order to measure the position of the workpiece W. Note that the workpiece marker WM may be an object marker, because it is a marker formed on an object that is the workpiece W. FIG. 3 illustrates one example of the workpiece marker WM. As illustrated in FIG. 3, a marker group WMG including at least three workpiece markers WM that have a predetermined positional relationship on the surface of the workpiece W may be formed on the workpiece W. In this case, the imaging apparatus may capture an image of the marker group WMG (namely, at least three workpiece markers WM). In this case, the control apparatus 3 may calculate the position of the workpiece W along either one of the X-axis direction, the Y-axis direction and the OZ direction in the head coordinate system by calculating the position of one workpiece marker WM in the workpiece image. The control apparatus 3 may calculate the position of the workpiece W along either two of the X-axis direction, the Y-axis direction and the OZ direction in the head coordinate system by calculating the positions of two workpiece markers WM in the workpiece image. The control apparatus 3 may calculate the position of the workpiece W along each of the X-axis direction, the Y-axis direction and the OZ direction in the head coordinate system by calculating the positions of three or more workpiece markers WM in the workpiece image. Moreover, the control apparatus 3 may calculate the position of the workpiece W along each of the Z-axis direction, the OX direction and the OY direction in the head coordinate system by calculating at least one of a shape and a size of at least three workpiece markers WM in the workpiece image.

Again in FIG. 1 and FIG. 2, the measurement apparatus 2 is configured to measure the position of the processing head 13. Thus, the measurement apparatus 2 may be referred to as a position measurement apparatus. The measurement apparatus 2 is configured to measure the position of the processing head 13 in at least one of the X-axis direction, the Y-axis direction, Z-axis direction, the OX direction, the OY direction and the OZ direction. Here, the position of the processing head 13 in at least one of the OX direction, the OY direction and the OZ direction may be referred to as the attitude of the processing head 13. Note that a configuration of the measurement apparatus 2 itself will be described later in detail with reference to FIG. 7 and FIG. 8. However, an overview of an operation of the measurement apparatus 2 is briefly described here.

In order to measure the position of the processing head 13, the measurement apparatus 2 may use a measurement light ML3. Specifically, the measurement apparatus 2 may measure the position of the processing head 13 by emitting the measurement light ML3 toward the processing head 13 and detecting the measurement light ML3 from the processing head 13 (namely, a returned light of the measurement light ML3 from the processing head 13). The returned light of the measurement light ML3 from the processing head 13 may include at least one of a reflection light of the measurement light ML3 by the processing head 13 and a scattering light of the measurement light ML3 by the processing head 13.

In order to emit the measurement light ML3 toward the processing head 13, the measurement apparatus 2 may be disposed at a position that is away from the processing head 13. Note that the position that is away from the processing head 13 may mean at least one of a position that is different from a position at which the processing head 13 exists and a position satisfying that there is a space between the position and the processing head 13. For example, the measurement apparatus 2 may be disposed at a position that is away from the processing head 13 so that a distance between the measurement apparatus 2 and the processing head 13 is longer than a distance between the processing head 13 and the workpiece W. In other words, the measurement apparatus 2 may be disposed at a position that is away from the processing head 13 so that the distance between the processing head 13 and the workpiece W is shorter than the distance between the measurement apparatus 2 and the processing head 13. In this case, the measurement apparatus 2 may emit, from the position that is away from the processing head 13, the measurement light ML3 toward the processing head 13. The measurement apparatus 2 may detect, from the position that is away from the processing head 13, the returned light of the measurement light ML3 from the processing head 13.

The measurement apparatus 2 may emit the measurement light ML3 toward any part of the processing head 13 and detect the measurement light ML3 from any part of the processing head 13. Alternatively, the measurement apparatus 2 may emit the measurement light ML3 toward a reflector 136 of the processing head 13 that is configured to reflect (typically, is configured to retroreflect) the measurement light ML3 and detect the measurement light ML3 from the reflector 136. The reflector 136 may be disposed at a position that is fixed relative to the processing head 13. The reflector 136 may be disposed at a position that has an invariable positional relationship relative to the processing head 13. Typically, the reflector 136 may be disposed at the processing head 13 (for example, a head housing 135 that constitutes an exterior appearance of the processing head 13). In this case, the measurement apparatus 2 measures a position of the reflector 136. However, since the reflector 136 is disposed at the position that is fixed relative to the processing head 13, an operation for measuring the position of the reflector 136 may be regarded to be equivalent to an operation for measuring the position of the processing head 13. Note that a tooling ball may be used in addition to or instead of the reflector 136 that is configured to perform the retroreflection.

The measurement apparatus 2 may measure a position of the workpiece W in addition to or instead of the position of the processing head 13. Specifically, the measurement apparatus 2 may measure the position of the workpiece W in at least one of the X-axis direction, the Y-axis direction, Z-axis direction, the OX direction, the OY direction and the OZ direction. In order to measure the position of the workpiece W, the measurement apparatus 2 may measure the position of the workpiece W by emitting the measurement light ML3 toward the workpiece W and detecting the measurement light ML3 from the workpiece W (namely, a returned light of the measurement light ML3 from the workpiece W). 2 may use a measurement light ML3. Specifically, the measurement apparatus 2 may measure the position of the processing head 13 by emitting the measurement light ML3 toward the processing head 13 and detecting the measurement light ML3 from the processing head 13 (namely, a returned light of the measurement light ML3 from the processing head 13). The returned light of the measurement light ML3 from the workpiece W may include at least one of a reflection light of the measurement light ML3 by the workpiece W and a scattering light of the measurement light ML3 by the workpiece W.

In order to emit the measurement light ML3 toward the workpiece W, the measurement apparatus 2 may be disposed at a position that is away from the workpiece W. For example, the measurement apparatus 2 may be disposed at a position that is away from the workpiece W so that a distance between the measurement apparatus 2 and the workpiece W is longer than a distance between the processing head 13 and the workpiece W. In other words, the measurement apparatus 2 may be disposed at a position that is away from the workpiece W so that the distance between the processing head 13 and the workpiece W is shorter than the distance between the measurement apparatus 2 and the workpiece W. In this case, the measurement apparatus 2 may emit, from the position that is away from the workpiece W, the measurement light ML3 toward the workpiece W. The measurement apparatus 2 may detect, from the position that is away from the workpiece W, the returned light of the measurement light ML3 from the workpiece W.

The measurement apparatus 2 may emit the measurement light ML3 toward any part of the workpiece W and detect the measurement light ML3 from any part of the workpiece W. Alternatively, the measurement apparatus 2 may emit the measurement light ML3 toward a reflector W136 that is disposed at the workpiece W that is configured to reflect (typically, is configured to retroreflect) the measurement light ML3 and detect the measurement light ML3 from the reflector W136. The reflector W136 may be disposed at a position that is fixed relative to the workpiece W. The reflector W136 may be disposed at a position that has an invariable positional relationship relative to the workpiece W. Typically, the reflector W136 may be disposed at the workpiece W. In this case, the measurement apparatus 2 measures a position of the reflector W136. However, since the reflector W136 is disposed at the position that is fixed relative to the workpiece W, an operation for measuring the position of the reflector W136 may be regarded to be equivalent to an operation for measuring the position of the workpiece W. Note that a tooling ball may be used in addition to or instead of the reflector W136 that is configured to perform the retroreflection.

As described later in detail, a measured result by the measurement apparatus 2 (namely, a measured result of the position of at least one of the processing head 13 and the workpiece W using the measurement light ML3) may be mainly used to control the self-propelled driving system 141 and the arm driving system 142 the moving accuracy of each of which is relatively low. On the other hand, a measured result by the imaging apparatus 15 (namely, a measured result of the position of the workpiece W using the imaging apparatus 15) may be mainly used to control the micromotion the moving accuracy of which is relatively high. A measured result by the processing head 13 (namely, a measured result of the workpiece W using the measurement light ML2) may be mainly used to control a below-described Galvano mirror 1341 that is configured to control the irradiation position (for example, the condensed position) of the processing light EL with high accuracy. In this case, a measurement resolution of the measurement apparatus 2 (namely, a resolution of the measured result of the position of at least one of the processing head 13 and the workpiece W using the measurement light ML3) may be lower than a measurement resolution of the imaging apparatus 15 (namely, a resolution of the measured result of the position of the workpiece W using the imaging apparatus 15). The measurement resolution of the measurement apparatus 2 may be lower than a measurement resolution of the processing head 13 (namely, a resolution of the measured result of the workpiece W using the measurement light ML2). In other words, the measurement resolution of each of the imaging apparatus 15 and the processing head 13 may be higher than the measurement resolution of the measurement apparatus 2.

The control apparatus 3 controls the operation of the processing system SYSa. For example, the control apparatus 3 may set a processing condition of the workpiece W and control the processing apparatus 1 and the measurement apparatus 2 so that the workpiece W is processed based on the set processing condition. Namely, the control apparatus 3 may control a processing of the workpiece W. For example, the control apparatus 3 sets a measurement condition of the workpiece W and controls the processing apparatus 1 and the measurement apparatus 2 so that the workpiece W is measured based on the set measurement condition.

In the first example embodiment, the control apparatus 3 may control the processing apparatus 1 to process the workpiece W based on the measured result by the imaging apparatus 15, the measured result by the processing head 13 and the measured result by the measurement apparatus 2. Namely, the processing system SYSa may process the workpiece W based on the measured result by the imaging apparatus 15, the measured result by the processing head 13 and the measured result by the measurement apparatus 2. Note that an operation for processing the workpiece W based on the measured result by the imaging apparatus 15, the measured result by the processing head 13 and the measured result by the measurement apparatus 2 will be described later in detail with reference to FIG. 12 and so on.

The control apparatus 3 may include an arithmetic apparatus and a storage apparatus, for example. The arithmetic apparatus may include at least one of a CPU (Central Processing Unit) and a GPU (Graphical Processing Unit), for example. The control apparatus 3 serves as an apparatus for controlling the operation of the processing system SYSa by means of the arithmetic apparatus executing a computer program. The computer program is a computer program that allows the control apparatus 3 (for example, the arithmetic apparatus) to execute (namely, to perform) a below-described operation that should be executed by the control apparatus 3. Namely, the computer program is a computer program that allows the control apparatus 3 to function so as to make the processing system SYSa execute the below-described operation. The computer program executed by the arithmetic apparatus may be recorded in the storage apparatus (namely, a recording medium) of the control apparatus 3, or may be recorded in any recording medium (for example, a hard disk or a semiconductor memory) that is built in the control apparatus 3 or that is attachable to the control apparatus 3. Alternatively, the arithmetic apparatus may download the computer program that should be executed from an apparatus disposed at the outside of the control apparatus 3 through a network interface.

The control apparatus 3 may not be disposed in the processing system SYSa. For example, the control apparatus 3 may be disposed at the outside of the processing system SYSa as a server or the like. In this case, the control apparatus 3 may be connected to the processing system SYSa through a wired and/or wireless network (alternatively, a data bus and/or a communication line). A network using a serial-bus-type interface such as at least one of IEEE1394, RS-232x, RS-422, RS-423, RS-485 and USB may be used as the wired network. A network using a parallel-bus-type interface may be used as the wired network. A network using an interface that is compatible to Ethernet (a registered trademark) such as at least one of 10-BASE-T, 100BASE-TX or 1000BASE-T may be used as the wired network. A network using an electrical wave may be used as the wireless network. A network that is compatible to IEEE802.1x (for example, at least one of a wireless LAN and Bluetooth (registered trademark)) is one example of the network using the electrical wave. A network using an infrared ray may be used as the wireless network. A network using an optical communication may be used as the wireless network. In this case, the control apparatus 3 and the processing system SYSa may be configured to transmit and receive various information through the network. Moreover, the control apparatus 3 may be configured to transmit information such as a command and a control parameter to the processing system SYSa through the network. The processing system SYSa may include a receiving apparatus that receives the information such as the command and the control parameter from the control apparatus 3 through the network. Alternatively, a first control apparatus that performs a part of the processing performed by the control apparatus 3 may be disposed in the processing system SYSa and a second control apparatus that performs another part of the processing performed by the control apparatus 3 may be disposed at the outside of the processing system SYSa.

Note that the recording medium recording therein the computer program that should be executed by the arithmetic apparatus may include an optical disc such as a CD-ROM, a CD-R, a CD-RW, a flexible disc, a MO, a DVD-ROM, a DVD-RAM, a DVD-R, a DVD+R, a DVD-RW, a DVD+RW and a Blu-ray (registered trademark), a magnetic disc such as a magnetic tape, an optical-magnetic disc, a semiconductor memory such as a USB memory, and another medium that is configured to store the program. The recording medium may include a device that is configured to record the computer program (for example, a device for a universal use or a device for an exclusive use in which the computer program is embedded to be executable in a form of at least one of a software, a firmware and the like). Moreover, each process or function included in the computer program may be realized by a logical process block that is realized in the control apparatus 3 by means of the control apparatus 3 (namely, a computer) executing the computer program, may be realized by a hardware such as a predetermined gate array (a FPGA, an ASIC) of the control apparatus 3, or may be realized in a form in which the logical process block and a partial hardware module that realizes an partial element of the hardware are combined.

(1-2) Configuration of Processing Head 13

Figure 4:
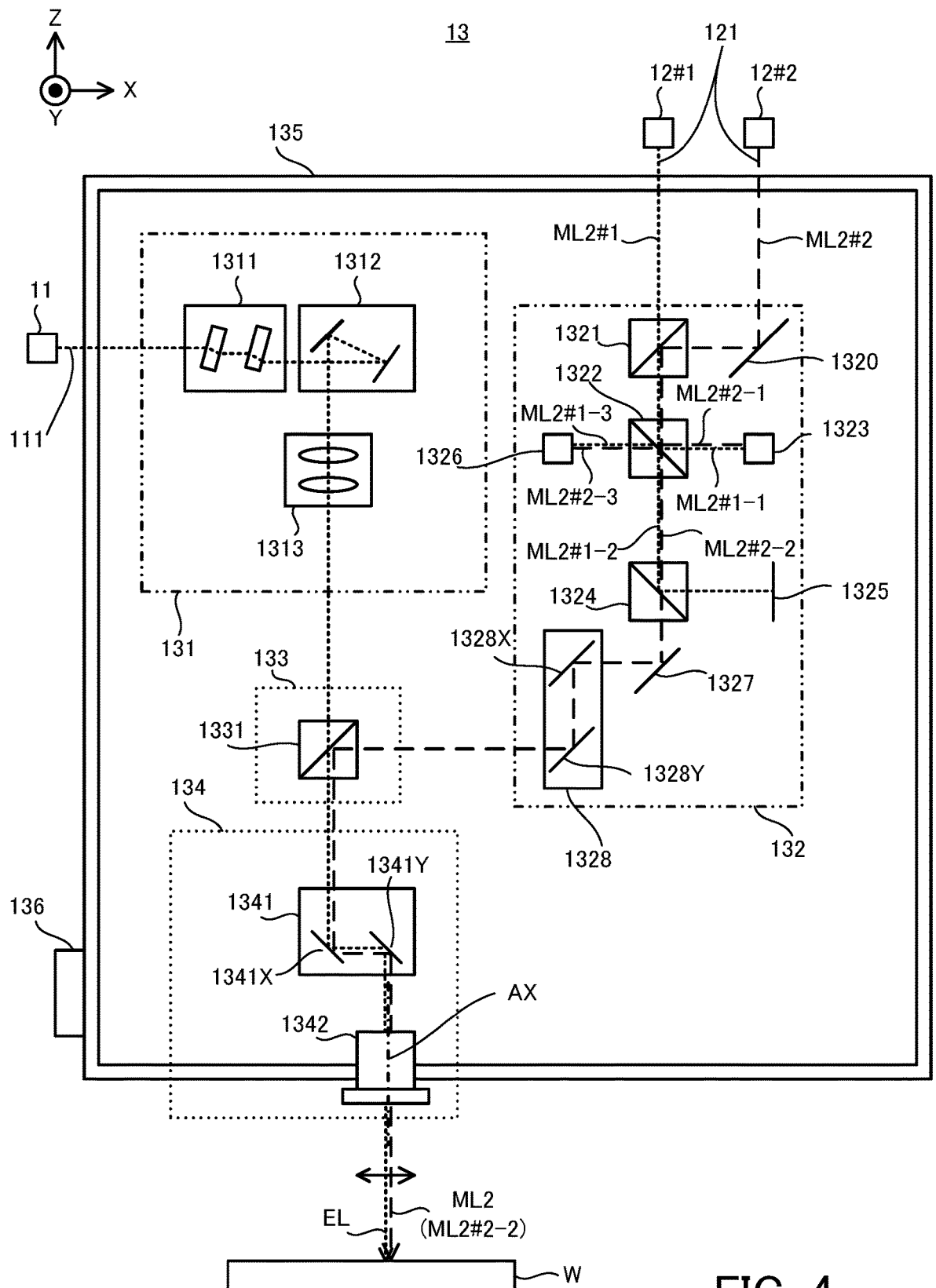
FIG. 4 is a block diagram that illustrates a configuration of a processing head of the processing system in the first example embodiment.
Figure 5:
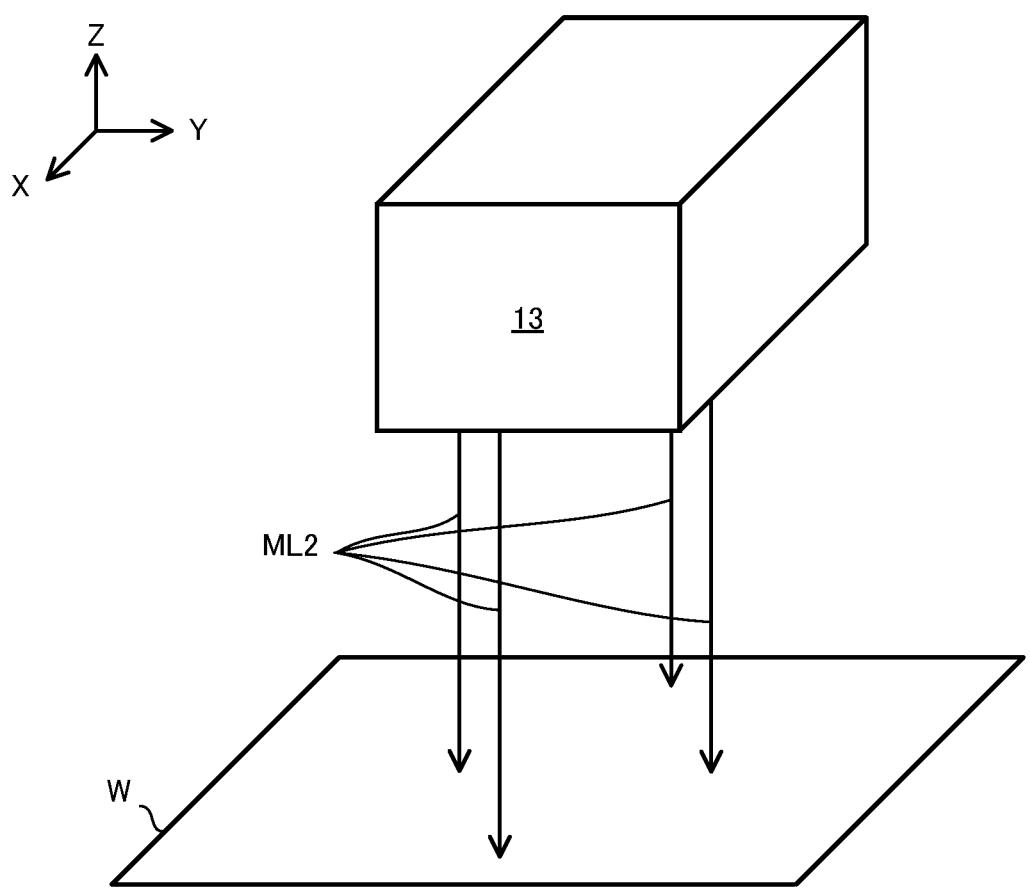
FIG. 5 is a perspective view that illustrates a measurement light with which a plurality of positions on the workpiece are irradiated.

Next, with reference to FIG. 4, one example of the configuration of the processing head 13 will be described. FIG. 4 is a cross-sectional view that illustrates one example of the configuration of the processing head 13.

As illustrated in FIG. 4, the processing light EL generated by processing light source 11 enters the processing head 13 through a light transmitting member 111 such as an optical fiber and the like. The processing light source 11 may be disposed outside the processing head 13. For example, as illustrated in FIG. 1 described above, the processing light source 11 may be disposed at the self-propelled driving system 141. In this case, the light transmitting member 111 may extend from the processing light source 11 to the processing head 13 through the arm driving system 142 or along the arm driving system 142. However, a disposed position of the processing light source 11 is not limited to a disposed position illustrated in FIG. 1. The processing light source 11 may be disposed at any position outside the processing head 13 or may be disposed in the processing head 13.

The processing light source 11 is configured to generate the processing light EL. When the processing light EL is the laser light, the processing light source 11 may include a laser diode, for example. Furthermore, the processing light source 11 may be a light source that is configured to pulsed-oscillate. In this case, the processing light source 11 is configured to generate the pulsed light (for example, a pulsed light an ON time of which is shorter than pico-seconds) as the processing light EL. The processing light source 11 may be a CW light source that is configured to generate a CW (continuous wave).

The processing head 13 includes the processing optical system 131, the measurement optical system 132, the combining optical system 133 and the objective optical system 134. The processing optical system 131, the measurement optical system 132, the combining optical system 133 and the objective optical system 134 are housed in a head housing 135. However, at least one of the processing optical system 131, the measurement optical system 132, the combining optical system 133 and the objective optical system 134 may not be housed in the head housing 135.

The processing optical system 131 is an optical system to which the processing light EL from the processing light source 11 enters. The processing optical system 131 is an optical system that emits, toward the combining optical system 133, the processing light EL entering the processing optical system 131. The workpiece W is irradiated with the processing light EL emitted from the processing optical system 131 through the combining optical system 133 and the objective optical system 134.

The processing optical system 131 may include a position adjustment optical system 1311, an angle adjustment optical system 1312 and a condensed position adjustment optical system 1313. The position adjustment optical system 1311 is configured to adjust an emitting position of the processing light EL from the processing optical system 131. The position adjustment optical system 1311 may include a parallel plate that is configured to incline with respect to a propagating direction of the processing light EL, for example, and change the emitting position of the processing light EL by changing an inclined angle of the parallel plate. The angle adjustment optical system 1312 is configured to adjust an emitting angle (namely, an emitting direction) of the processing light EL from the processing optical system 131. The angle adjustment optical system 1312 may include a mirror that is configured to incline with respect to the propagating direction of the processing light EL, for example, and change the emitting angle of the processing light by changing an inclined angle of the mirror. The condensed position adjustment optical system 1313 is an optical member that is configured to adjust the condensed position of the processing light EL along the propagating direction of the processing light EL. The condensed position adjustment optical system 1313 may include a plurality of lenses that are arranged along the propagating direction of the processing light EL, for example. In this case, the condensed position of the processing light EL is adjusted by moving at least one of the plurality of lenses along its optical axis direction. Alternatively, the condensed position adjustment optical system 1313 may include an optical member (typically, a Galvano mirror) that is configured to move the condensed position of the processing light EL along a desired direction by deflecting the processing light EL, for example. However, the processing optical system 131 may not include at least one of the position adjustment optical system 1311, the angle adjustment optical system 1312 and the condensed position adjustment optical system 1313.

The processing light EL emitted from the processing optical system 131 enters the combining optical system 133. The combining optical system 133 includes a beam splitter (for example, a polarized beam splitter) 1331. The beam splitter 1331 emits, toward the objective optical system 134, the processing light EL entering the beam splitter 1331. In an example illustrated in FIG. 4, the processing light EL entering the beam splitter 1331 passes through a polarization split surface to be emitted toward the objective optical system 134. Thus, in the example illustrated in FIG. 4, the processing light EL enters the polarization split surface of the polarized beam splitter 1331 in a state where it has a polarized direction by which it is allowed to pass through the polarization split surface (a polarized direction by which it is a p-polarized light with respect to the polarization split surface).

The processing light EL emitted from the combining optical system 133 enters the objective optical system 134. The objective optical system 134 emits, toward the workpiece W, the processing light EL entering the objective optical system 134. The objective optical system 134 includes a Galvano mirror 1341 and a fθ lens 1342.

The processing light EL entering the objective optical system 134 enters the Galvano mirror 1341. The Galvano mirror 1341 changes the irradiation position of the processing light EL on the workpiece W by deflecting the processing light EL (namely, by changing the emitting angle of the processing light EL). The Galvano mirror 1341 changes the condensed position of the processing light EL in a plane intersecting with the optical axis AX of the fθ lens 1342 (namely, a plane along the XY plane in the head coordinate system) by deflecting the processing light EL. Thus, the Galvano mirror 1341 may be referred to as a condensed position change apparatus. The processing head 13 usually irradiates the workpiece W with the processing light EL in a state where the optical axis AX of the fθ lens 1342 intersects with the surface of the workpiece W, as illustrated in FIG. 4. Thus, when the condensed position of the processing light EL in the plane intersecting with the optical axis AX of the fθ lens 1342 is changed, the irradiation position of the processing light EL on the surface of the workpiece W is changed in a direction along the surface of the workpiece W. Namely, the irradiation position of the processing light EL is changed along at least one of the X-axis direction and the Y-axis direction in the head coordinate system. Thus, the Galvano mirror 1341 may be configured to serve as an irradiation position change apparatus that is configured to change, along the surface of the workpiece W, the irradiation position of the processing light EL on the surface of the workpiece W.

The Galvano mirror 1341 includes a X scanning mirror 1341X and a Y scanning mirror 1341Y. Each of the X scanning mirror 1341X and the Y scanning mirror 1341Y is an inclined angle variable mirror whose angle relative to the optical path of the processing light EL entering the Galvano mirror 1341 is changeable. The X scanning mirror 1341X deflects the processing light EL so as to change the irradiation position of the processing light EL on the surface of the workpiece W along the X-axis direction in the head coordinate system. In this case, the X scanning mirror 1341X may rotate or swing around the Y-axis in the head coordinate system. The Y scanning mirror 1341Y deflects the processing light EL so as to change the irradiation position of the processing light EL on the surface of the workpiece W along the Y-axis direction in the head coordinate system. In this case, the Y scanning mirror 1341Y may rotate or swing around the X-axis in the head coordinate system.

Note that the processing optical system 131 may include any deflection optical member that is configured to deflect the processing light EL in addition to or instead of the Galvano mirror 1341. A polygonal mirror that includes a plurality of reflection surfaces angles of which are different from each other is one example of the deflection optical member. The polygonal mirror is configured to rotate so as to change an incident angle of the processing light EL relative to one reflection surface in a period during which the one reflection surface is irradiated with the processing light EL and to switch the reflection surface that is irradiated with the processing light EL between the plurality of reflection surfaces. Moreover, at least one of an acousto-optical element, an electro-optical element, a MEMS mirror and a two-dimensional mirror that is configured to rotate (swing) in two axis directions is another example of the deflection optical member.

Alternatively, the irradiation position of the processing light EL on the surface of the workpiece W is changed when the head driving system 14 moves the processing head 13 relative to the workpiece W. Thus, the processing apparatus 1 may not include the Galvano mirror 1341.

The processing light EL from the Galvano mirror 1341 enters the fθ lens 1342. The fθ lens 1342 irradiates the workpiece W with the processing light EL from the Galvano mirror 1341. Specifically, the fθ lens 1342 emits the processing light EL along the optical axis AX of the fθ lens 1342. As a result, the processing light EL emitted from the fθ lens 1342 propagates along the direction that is along the optical axis AX to enter the workpiece W.

The fθ lens 1342 condenses the processing light EL from the Galvano mirror 1341 on the workpiece W. In this case, the processing light EL that has been emitted from the fθ lens 1342 may enter the workpiece W without passing through another optical element (in other words, an optical member, and a lens for example) having a power. In this case, the fθ lens 1342 may be referred to as a terminal optical element, because it is a last optical element (namely, an optical element that is closest to the workpiece W) having a power of a plurality of optical elements disposed on the optical path of the processing light EL.

Note that the processing head 13 may include at least the fθ lens 1342 in order for the processing head 13 to irradiate the workpiece W with the processing light EL. In this case, the processing light EL may enter the processing head 13 through the processing optical system 131, the combining optical system 133 and the Galvano mirror 1341 that are disposed outside the processing head 13. The processing head 13 may irradiate the workpiece W with the processing light EL entering the processing head 13 through the fθ lens 1342.

The measurement light ML2 generated by measurement light source 12 further enters the processing head 13 through a light transmitting member 121 such as an optical fiber and the like. The measurement light source 12 may be disposed outside the processing head 13. For example, as illustrated in FIG. 1 described above, the measurement light source 12 may be disposed at the self-propelled driving system 141. In this case, the light transmitting member 121 may extend from the measurement light source 12 to the processing head 13 through the arm driving system 142 or along the arm driving system 142. However, a disposed position of the measurement light source 12 is not limited to a disposed position illustrated in FIG. 1. The measurement light source 12 may be disposed at any position outside the processing head 13 (for example, the support surface SS) or may be disposed in the processing head 13.

The measurement light source 12 includes a light comb light source. The light comb light source is a light source that is configured to generate, as the pulsed light, a light including frequency components that are arranged with equal interval on a frequency axis (hereinafter, it is referred to as a "light frequency comb"). In this case, the measurement light source 12 emits, as the measurement light ML2, the pulsed light including the frequency components that are arranged with equal interval on the frequency axis. However, the measurement light source 12 may include a light source that is different from the light comb light source.

In the example illustrated in FIG. 4, the processing head 13 includes a plurality of measurement light sources 12. For example, the processing head 13 may include the measurement light source 12 #1 and the measurement light source 12 #2. The plurality of measurement light sources 12 emit a plurality of measurement lights ML whose phases are synchronized with each other and that are coherent, respectively. For example, oscillation frequencies of the plurality of measurement light sources 12 may be different from each other. Thus, the plurality of measurement lights ML respectively emitted from the plurality of measurement light sources 12 are the plurality of measurement lights ML having different pulse frequencies (for example, the number of the pulsed light per unit time, and an inverse number of the ON time of the pulsed light). As one example, the measurement light source 12 #1 may emit the measurement light ML2 #1 whose pulse frequency is 25 GHz and the measurement light source 12 #2 may emit the measurement light ML2 #2 whose pulse frequency is 25 GHz+α (for example, 100 Hz). However, the processing head 13 may include a single measurement light source 12.

The measurement light ML2 emitted from the measurement light source 12 enters the measurement optical system 132. The measurement optical system 132 is an optical system that emits, toward the combining optical system 133, the measurement light ML2 entering the measurement optical system 132. The workpiece W is irradiated with the measurement light ML2 emitted from the measurement optical system 132 through the combining optical system 133 and the objective optical system 134. Thus, the measurement optical system 132 irradiates the workpiece W with the measurement light ML2 through the combining optical system 133 and the objective optical system 134 in order to measure the workpiece W.

The measurement optical system 132 includes a mirror 1320, a beam splitter 1321, a beam splitter 1322, a detector 1323, a beam splitter 1324, a mirror 1325, a detector 1326, a mirror 1327 and a Galvano mirror 1328, for example.

The measurement light ML2 emitted from the measurement light source 12 enters the beam splitter 1321. Specifically, the measurement light ML2 emitted from the measurement light source 12 #1 (hereinafter, it is referred to as the "measurement light ML2 #1") enters the beam splitter 1321. The measurement light ML2 emitted from the measurement light source 12 #2 (hereinafter, it is referred to as the "measurement light ML2 #2") enters the beam splitter 1321 through the mirror 1320. The beam splitter 1321 emits, toward the beam splitter 1322, the measurement lights ML #1 and ML #2 entering the beam splitter 1321.

The beam splitter 1322 reflects, toward the detector 1323, a measurement light ML2 #1-1 that is a part of the measurement light ML2 #1 entering the beam splitter 1322. The beam splitter 1322 emits, toward the beam splitter 1324, a measurement light ML2 #1-2 that is another part of the measurement light ML2 #1 entering the beam splitter 1322. The beam splitter 1322 reflects, toward the detector 1323, a measurement light ML2 #2-1 that is a part of the measurement light ML2 #2 entering the beam splitter 1322. The beam splitter 1322 emits, toward the beam splitter 1324, a measurement light ML2 #2-2 that is another part of the measurement light ML2 #2 entering the beam splitter 1322.

The measurement lights ML #1-1 and ML #2-1 emitted from the beam splitter 1322 enter the detector 1323. The detector 1323 detects an interfering light generated by an interference between the measurement light ML2 #1-1 and the measurement light ML2 #2-1. Specifically, the detector 1323 detects the interfering light by optically receiving the interfering light. Thus, the detector 1323 may include a light reception element (a light reception part and typically a photoelectron conversion element) that is configured to optically receive a light. A detected result by the detector 1323 is outputted to the control apparatus 3.

The measurement lights ML #1-2 and ML #2-2 emitted from the beam splitter 1322 enter the beam splitter 1324. The beam splitter 1324 reflects, toward the mirror 1325, at least a part of the measurement light ML2 #1-2 entering the beam splitter 1324. The beam splitter 1324 reflects, toward the mirror 1327, at least a part of the measurement light ML2 #2-2 entering the beam splitter 1324.

The measurement light ML2 #1-2 emitted from the beam splitter 1324 enters the mirror 1325. The measurement light ML2 #1-2 entering the mirror 1325 is reflected by a reflection surface (the reflection surface may be referred to as a reference surface) of the mirror 1325. Specifically, the mirror 1325 reflects, toward the beam splitter 1324, the measurement light ML2 #1-2 entering the mirror 1325. Namely, the mirror 1325 emits the measurement light ML2 #1-2, which has entered the mirror 1325, toward the beam splitter 1324 as a measurement light ML2 #1-3 that is a reflection light thereof. In this case, the measurement light ML2 #1-3 may be referred to as a reference light. The measurement light ML2 #1-3 emitted from the mirror 1325 enters the beam splitter 1324. The beam splitter 1324 emits, toward the beam splitter 1322, the measurement light ML2 #1-3 entering the beam splitter 1324. The measurement light ML2 #1-3 emitted from the beam splitter 1324 enters the beam splitter 1322. The beam splitter 1322 emits, toward the detector 1326, the measurement light ML2 #1-3 entering the beam splitter 1322.

On the other hand, the measurement light ML2 #2-2 emitted from the beam splitter 1324 enters the mirror 1327. The mirror 1327 reflects, toward the Galvano mirror 1328, the measurement light ML2 #2-2 entering the mirror 1327.

Namely, the mirror 1327 emits, toward the Galvano mirror 1328, the measurement light ML2 #2-2 entering the mirror 1327.

The Galvano mirror 1328 deflect the measurement light ML #2-2 (namely, change an emitting angle of the measurement light ML #2-2). The Galvano mirror 1328 changes a condensed position of the measurement light ML2 #2-2 in a plane intersecting with the optical axis AX of the fθ lens 1342 (namely, a plane along the XY plane in the head coordinate system) by deflecting the measurement light ML2 #2-2. The processing head 13 usually irradiates the workpiece W with the measurement light ML2 #2-2 in a state where the optical axis AX of the fθ lens 1342 intersects with the surface of the workpiece W, as illustrated in FIG. 4. Thus, when the condensed position of the measurement light ML2 #2-2 in the plane intersecting with the optical axis AX of the fθ lens 1342 is changed, the irradiation position of the measurement light ML2 #2-2 on the surface of the workpiece W is changed in a direction along the surface of the workpiece W. Namely, the irradiation position of the measurement light ML2 #2-2 is changed along at least one of the X-axis direction and the Y-axis direction in the head coordinate system. Thus, the Galvano mirror 1328 may be configured to serve as an irradiation position change apparatus that is configured to change, along the surface of the workpiece W, the irradiation position of the measurement light ML2 #2-2 on the surface of the workpiece W.

The Galvano mirror 1328 includes a X scanning mirror 1328X and a Y scanning mirror 1328Y. Each of the X scanning mirror 1328X and the Y scanning mirror 1328Y is an inclined angle variable mirror whose angle relative to the optical path of the measurement light ML2 #2-2 entering the Galvano mirror 1328 is changeable. The X scanning mirror 1328X deflects the measurement light ML2 #2-2 so as to change the irradiation position of the measurement light ML2 #2-2 on the surface of the workpiece W along the X-axis direction in the head coordinate system. In this case, the X scanning mirror 1328X may rotate or swing around the Y-axis in the head coordinate system. The Y scanning mirror 1328Y deflects the measurement light ML2 #2-2 so as to change the irradiation position of the measurement light ML2 #2-2 on the surface of the workpiece W along the Y-axis direction in the head coordinate system. In this case, the Y scanning mirror 1328Y may rotate or swing around the X-axis in the head coordinate system.

The measurement light ML2 #2-2 from the Galvano mirror 1328 enters the combining optical system 133. The beam splitter 1331 of the combining optical system 133 emits, toward the objective optical system 134, the measurement light ML2 #2-2 entering the beam splitter 1331. In the example illustrated in FIG. 4, the measurement light ML2 #2-2 entering the beam splitter 1331 is reflected by the polarization split surface to be emitted toward the objective optical system 134. Thus, in the example illustrated in FIG. 4, the measurement light ML2 #2-2 enters the polarization split surface of the polarized beam splitter 1331 in a state where it has a polarized direction by which it is allowed to be reflected by the polarization split surface (a polarized direction by which it is a s-polarized light with respect to the polarization split surface).

Here, not only the measurement light ML2 #2-2 but also the processing light EL enter the beam splitter 1331 as described above. Namely, both of the measurement light ML2 #2-2 and the processing light EL pass through the beam splitter 1331. The beam splitter 1331 emits, toward same direction (namely, toward the same objective optical system 134), the processing light EL and the measurement light ML2 #2-2 that respectively enter the beam splitter 1331 from different directions. Therefore, the beam splitter 1331 substantially serves as an combining optical system that combines the processing light EL and the measurement light ML2 #2-2.

Incidentally, when the wavelength of the processing light EL is different from the wavelength of the measurement light ML2 #2-2, the combining optical system 133 may include a dichroic mirror as the combining optical member instead of the beam splitter 1331. Even in this case, the combining optical system 133 may combine the processing light EL and the measurement light ML2 #2-2 (namely, combine the optical path of the processing light EL and the optical path of the measurement light ML2 #2-2) by using the dichroic mirror.

The measurement light ML2 #2-2 emitted from the beam splitter 1331 enters the Galvano mirror 1341. The Galvano mirror 1341 deflects the measurement light ML2 #2-2, as with the case where the processing light EL is deflected. Thus, the Galvano mirror 1341 is configured to change the irradiation position of the measurement light ML2 #2-2 on the surface of the workpiece W in a direction along the surface of the workpiece W.

As described above, not only the measurement light ML2 #2-2 but also the processing light EL enter the Galvano mirror 1341. Namely, the processing light EL and the measurement light ML2 #2-2 combined by the combining optical system 133 enter the Galvano mirror 1341. Therefore, both of the processing light EL and the measurement light ML2 #2-2 pass through the same Galvano mirror 1341. Thus, the Galvano mirror 1341 is configured to change the irradiation position of the processing light EL on the workpiece W and the irradiation position of the measurement light ML2 #2-2 on the workpiece W in synchronization with each other. Namely, the Galvano mirror 1341 may change the irradiation position of the processing light EL on the workpiece W and the irradiation position of the measurement light ML2 #2-2 on the workpiece W in conjunction with each other.

On the other hand, the measurement light ML2 #2-2 enters the workpiece W through the Galvano mirror 1328 and the processing light EL enters the workpiece W without passing through the Galvano mirror 1328. Thus, the processing system SYSa is configured to independently move the irradiation position of the measurement light ML2 #2-2 on the workpiece W relative to the irradiation position of the processing light EL on the workpiece W by using the Galvano mirror 1328. The processing system SYSa is configured to change the irradiation position of the processing light EL on the workpiece W and the irradiation position of the measurement light ML2 #2-2 on the workpiece W independently from each other. The processing system SYSa is configured to change a positional relationship between the irradiation position of the processing light EL on the workpiece W and the irradiation position of the measurement light ML2 #2-2 on the workpiece W. Note that the processing system SYSa may not include the Galvano mirror 1328 when the positional relationship between the irradiation position of the processing light EL on the workpiece W and the irradiation position of the measurement light ML2 #2-2 on the workpiece W is not changed.

The measurement light ML2 #2-2 emitted from the Galvano mirror 1341 enters the fθ lens 1342. The fθ lens 1342 irradiates the workpiece W with the measurement light ML2 #2-2 from the Galvano mirror 1341. Specifically, the fθ lens 1342 emits the measurement light ML2 #2-2 along the optical axis AX of the fθ lens 1342. As a result, the measurement light ML2 #2-2 emitted from the fθ lens 1342 propagates along the direction that is along the optical axis AX to enter the workpiece W.

The fθ lens 1342 may condense the measurement light ML2 #2-2 from the Galvano mirror 1341 on the workpiece W. In this case, the measurement light ML2 #2-2 that has been emitted from the fθ lens 1342 may enter the workpiece W without passing through another optical element (in other words, an optical member, and a lens for example) having a power.

When the workpiece W is irradiated with the measurement light ML2 #2-2, a light due to the irradiation with the measurement light ML2 #2-2 is generated from the workpiece W. Namely, when the workpiece W is irradiated with the measurement light ML2 #2-2, the light due to the irradiation with the measurement light ML2 #2-2 is emitted from the workpiece W. The light due to the irradiation with the measurement light ML2 #2-2 (in other words, the light emitted from the workpiece W due to the irradiation with the measurement light ML2 #2-2) may include at least one of the measurement light ML2 #2-2 reflected by the workpiece W (namely, a reflection light), the measurement light ML2 #2-2 scattered by the workpiece W (namely, a scattering light), the measurement light ML2 #2-2 diffracted by the workpiece W (namely, a diffraction light) and the measurement light ML2 #2-2 transmitted through the workpiece W (namely, a transmitted light).

At least a part of the light emitted from the workpiece W due to the irradiation with the measurement light ML2 #2-2 (hereinafter, this light is referred to as a "measurement light ML2 #2-3) enters the objective optical system 134. The measurement light ML2 #2-3 entering the objective optical system 134 enters the combining optical system 133 through the fθ lens 1342 and the Galvano mirror 1341. The beam splitter 1331 of the combining optical system 133 emits, toward the measurement optical system 132, the measurement light ML2 #2-3 entering the beam splitter 1331. In the example illustrated in FIG. 4, the measurement light ML2 #2-3 entering the beam splitter 1331 is reflected by the polarization split surface to be emitted toward the measurement optical system 132. Thus, in the example illustrated in FIG. 4, the measurement light ML2 #2-3 enters the polarization split surface of the polarized beam splitter 1331 in a state where it has a polarized direction by which it is allowed to be reflected by the polarization split surface.

The measurement light ML2 #2-3 emitted from the beam splitter 1331 enters the Galvano mirror 1328 of the measurement optical system 132. The Galvano mirror 1328 emits, toward the mirror 1327, the measurement light ML2 #2-3 entering the Galvano mirror 1328. The mirror 1327 reflects, toward the beam splitter 1324, the measurement light ML2 #2-3 entering the mirror 1327. The beam splitter 1324 emits, toward the beam splitter 1322, at least a part of the measurement light ML2 #2-3 entering the beam splitter 1324. The beam splitter 1322 emits, toward the detector 1326, at least a part of the measurement light ML2 #2-3 entering the beam splitter 1322.

As described above, not only the measurement light ML2 #2-3 but also the measurement light ML2 #1-3 enter the detector 1326. Namely, the measurement light ML2 #2-3 that propagates toward the detector 1326 through the workpiece W and the measurement light ML2 #1-3 that propagates toward the detector 1326 without going through the workpiece W enter the detector 1326. The detector 1326 detects an interfering light generated by an interference between the measurement light ML2 #1-3 and the measurement light ML2 #2-3. Specifically, the detector 1326 detects the interfering light by optically receiving the interfering light. Thus, the detector 1326 may include a light reception element (a light reception part) that is configured to optically receive a light. A detected result by the detector 1326 is outputted to the control apparatus 3.

The control apparatus 3 calculates the state of the workpiece W (typically, the position of the workpiece W as described above) based on the detected result by the detector 1323 and the detected result by the detector 1326. Specifically, since the pulse frequency of the measurement light ML2 #1 is different from the pulse frequency of the measurement light ML2 #2, a pulse frequency of the measurement light ML2 #1-1 is different from a pulse frequency of the measurement light ML2 #2-1. Therefore, the interfering light generated by the interference between the measurement light ML2 #1-1 and the measurement light ML2 #2-1 is an interfering light in which a pulsed light appears in synchronization with a timing at which the pulsed light of the measurement light ML2 #1-1 and the pulsed light of the measurement light ML2 #2-1 enter the detector 1323 at the same time. Similarly, a pulse frequency of the measurement light ML2 #1-3 is different from a pulse frequency of the measurement light ML2 #2-3. Therefore, the interfering light generated by the interference between the measurement light ML2 #1-3 and the measurement light ML2 #2-3 is an interfering light in which a pulsed light appears in synchronization with a timing at which the pulsed light of the measurement light ML2 #1-3 and the pulsed light of the measurement light ML2 #2-3 enter the detector 1326 at the same time. Here, a position (a position along a time axis) of the pulsed light of the interfering light detected by the detector 1326 changes depending on the positional relationship between the processing head 13 and the workpiece W. This is because the interfering light detected by the detector 1326 is the interfering light generated by the interference between the measurement light ML2 #2-3 that propagates toward the detector 1326 through the workpiece W and the measurement light ML2 #1-3 that propagates toward the detector 1326 without going through the workpiece W. On the other hand, a position (a position along a time axis) of the pulsed light of the interfering light detected by the detector 1323 does not change depending on the positional relationship between the processing head 13 and the workpiece W. Therefore, it can be said that a difference in time between the pulsed light of the interfering light detected by the detector 1323 and the pulsed light of the interfering light detected by the detector 1326 indirectly indicates the positional relationship between the processing head 13 and the workpiece W (typically, a distance between the processing head 13 and the workpiece W). Thus, the control apparatus 3 may calculate the state of the workpiece W based on the difference in time between the pulsed light of the interfering light detected by the detector 1323 and the pulsed light of the interfering light detected by the detector 1326. Specifically, the control apparatus 3 may calculate a position of an irradiated part of the workpiece W that is irradiated with the measurement light ML2 #2-2 based on the difference in time between the pulsed light of the interfering light detected by the detector 1326 and the pulsed light of the interfering light detected by the detector 1323. Especially, the control apparatus 3 may calculate the position of the irradiated part of the workpiece W in the irradiation direction of the measurement light ML2 emitted from the fθ lens 1342 (namely, the Z-axis direction of the head coordinate system). Namely, the control apparatus 3 may calculate the position of the workpiece W along the Z-axis direction of the head coordinate system.

The processing head 13 may irradiate a plurality of parts of the workpiece W with the measurement light ML2 #2-2 in order by deflecting the measurement light ML2 #2-2 by using at least one of the Galvano mirrors 1328 and 1341. Alternatively, the processing head 13 may sweep the workpiece W with the measurement light ML2 #2-2 by deflecting the measurement light ML2 #2-2 by using at least one of the Galvano mirrors 1328 and 1341. Alternatively, in this case, the control apparatus 3 may calculate the positions of the plurality of irradiated parts of the workpiece W in the irradiation direction of the measurement light ML2 emitted from the fθ lens 1342 (namely, the Z-axis direction of the head coordinate system). As a result, the control apparatus 3 may calculate a shape of the surface of the workpiece W. Furthermore, the control apparatus 3 may calculate the position of the workpiece W in at least one of the rotational direction around the X-axis of the head coordinate system and the rotational direction around the Y-axis of the head coordinate system based on the positions of at least three irradiated parts of the workpiece W in the Z-axis direction of the head coordinate system.

In this manner, the processing apparatus 1 may measure the position of the workpiece W by using the measurement light ML2 with which the workpiece W is irradiated through the measurement optical system 132 (furthermore, the combining optical system 133 and the objective optical system 134) in cooperation with the control apparatus 3. Especially, the processing apparatus 1 may measure the position of the workpiece W by using the measurement light ML2 with which the workpiece W is irradiated through at least the fθ lens 1342 in cooperation with the control apparatus 3. For example, the processing apparatus 1 may measure the position of the workpiece W in at least one of the direction along the Z-axis of the head coordinate system, the rotational direction around the X-axis of the head coordinate system and the rotational direction around the Y-axis of the head coordinate system. Thus, the measurement optical system 132 and so on used to irradiate the workpiece W with the measurement light ML2 may be referred to as a measurement apparatus.

(1-3) Configuration of Head Driving System 14

Next, one example of the configuration of the head driving system 14 will be described. As described above, the head driving system 14 includes the self-propelled driving system 141, the arm driving system 142 and the micromotion driving system 143. Thus, in the below-described description, the self-propelled driving system 141, the arm driving system 142 and the micromotion driving system 143 will be described in order.

(1-3-1-1) Configuration of Self-Propelled Driving System 141

Figure 6:
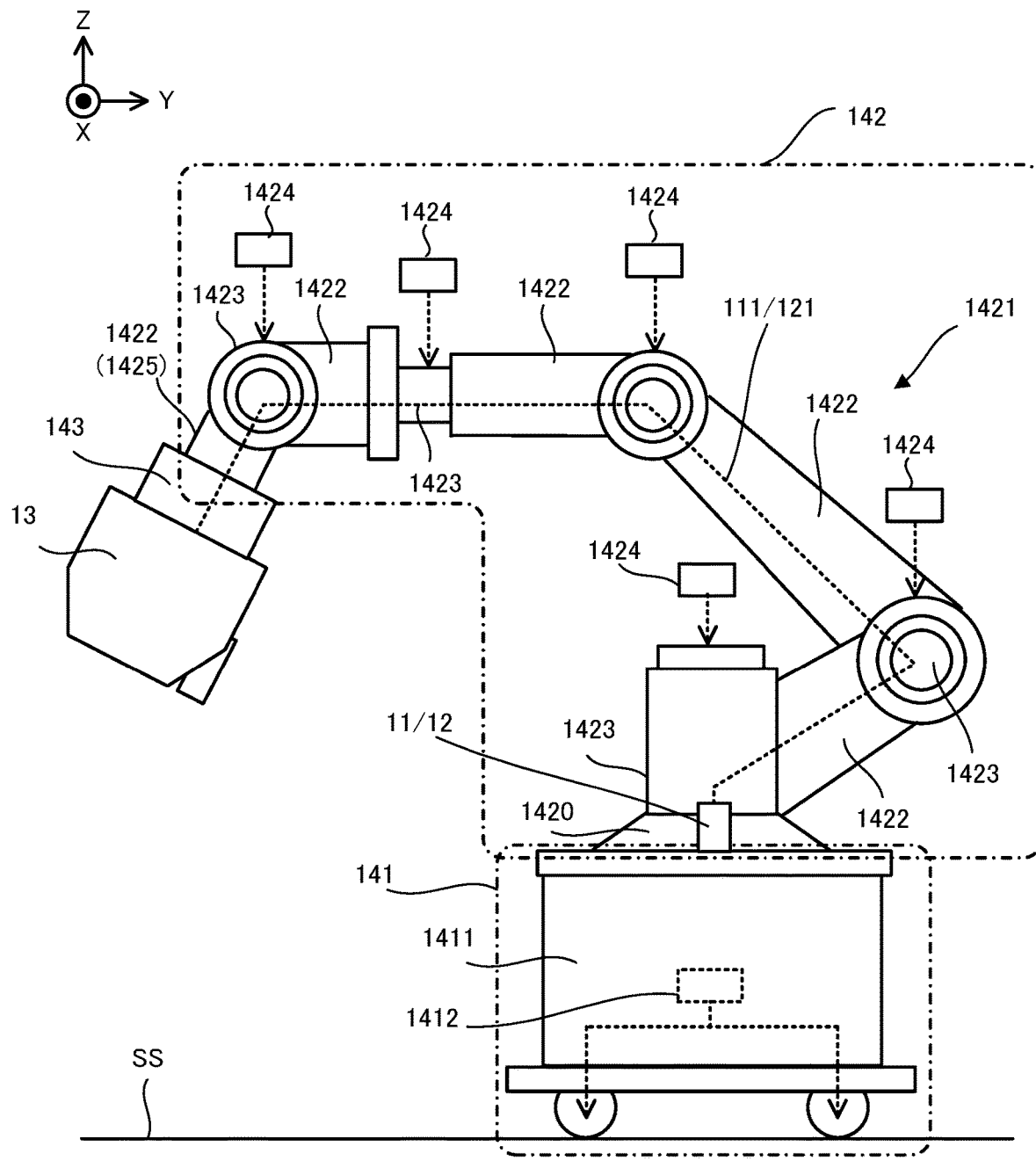
FIG. 6 is a schematical view that illustrates a configuration of a self-propelled driving system and an arm driving system.

Firstly, with reference to FIG. 6, a configuration of the self-propelled driving system 141 will be described. FIG. 6 is a cross-sectional view that illustrates the configuration of the self-propelled driving system 141.

As illustrated in FIG. 6, the self-propelled driving system 141 includes a wheeled platform 1411 and a motor 1412. The wheeled platform 1411 is a platform to which a wheel is attached. The wheeled platform 1411 is located on the support surface SS. The wheel of the wheeled platform 1411 is rotatable by using a driving force of the motor 1412. As a result, the wheeled platform 1411 is movable on the support surface SS by using the driving power of the motor 1412 that is driven under the control of the control apparatus 3. Namely, the wheeled platform 1411 is movable by itself on the support surface SS by using the driving power of the motor 1412. In this case, the motor 1412 may be regarded to serve as a movement mechanism that moves the wheeled platform 1411.

The arm driving system 142 is connected to the wheeled platform 1411. Thus, the wheeled platform 1411 may be referred to as a connection member to which the arm driving system 142 is connected. Specifically, the arm driving system 142 is attached (namely, fixed) to the wheeled platform 1411 (un upper surface of the wheeled platform 1411 in an example illustrated in FIG. 6). Thus, when the wheeled platform 1411 moves, the arm driving system 142 also moves. Furthermore, the micromotion driving system 143 is connected to the arm driving system 142. Specifically, the micromotion driving system 143 is attached (namely, fixed) to the arm driving system 142. Thus, when the wheeled platform 1411 moves, the micromotion driving system 143 also moves. Furthermore, the processing head 13 is connected to the micromotion driving system 143. Specifically, the processing head 13 is attached (namely, fixed) to the micromotion driving system 13. Thus, when the wheeled platform 1411 moves, the processing head 13 also moves. Thus, the self-propelled driving system 141 is configured to serve as a movement apparatus that moves the processing head 13 by moving by itself.

As described later in detail, the control apparatus 3 may control the self-propelled driving system 141 based on the measured result by the measurement apparatus 2. Namely, the control apparatus 3 may control the self-propelled driving system 141 so as to move the processing head 13 relative to the workpiece W based on the position of at least one of the processing head 13 and the workpiece W measured by the measurement apparatus 2. For example, as described above, the measurement apparatus 2 is configured to measure the position of at least one of the processing head 13 and the workpiece W in at least one of the X-axis direction, the Y-axis direction, Z-axis direction, the θX direction, the θY direction and the θZ direction. Thus, the control apparatus 3 may control the self-propelled driving system 141 so as to move the processing head 13 in at least one of the X-axis direction, the Y-axis direction, Z-axis direction, the θX direction, the θY direction and the θZ direction based on the measured result by the measurement apparatus 2. However, the control apparatus 3 may control the self-propelled driving system 141 based on at least one of the measured result by the processing head 13 and the measured result by the imaging apparatus 15.

(1-3-1-2) Configuration of Arm Driving System 142

Next, with reference to FIG. 6, a configuration of the arm driving system 142 will be described. FIG. 6 is a cross-sectional view that illustrates the configuration of the arm driving system 142.

As illustrated in FIG. 6, the arm driving system 142 includes a base 1420. The base 1420 is connected to the self-propelled driving system 141 (specifically, the wheeled platform 1411). Namely, the base 1420 is attached (namely, fixed) to the wheeled platform 1411. Thus, the base 1420 may be referred to as a connection member that is connected to the self-propelled driving system 141. One end part of a robot arm 1421 is attached to the base 1420. The base 1420 supports the robot arm 1421. The base 1420 is used as a base member that supports the robot arm 1421.

Note that the above-described processing light source 11 and the measurement light source 12 are disposed near a part of the wheeled platform 1411 to which the base 1420 is connected. However, disposed positions of the processing light source 11 and the measurement light source 12 are not limited to the examples illustrated in FIG. 6. For example, at least one of the processing light source 11 and the measurement light source 12 may be disposed at the arm driving system 142. For example, at least one of the processing light source 11 and the measurement light source 12 may be disposed in an exterior member that constitutes at least one of the self-propelled driving system 141 and the arm driving system 142 so that they are not visible from the outside.

The robot arm 1421 includes a plurality of arm members 1422. The plurality of arm members 1422 are coupled to each other in a pivotable manner through at least one joint member 1423. Therefore, the robot arm 1421 may be referred to as a movable arm. Note that the robot arm 1421 may be a manipulator having a three or more degree of freedom. Therefore, the arm driving system 142 may serve as a robot that has a vertically articulated configuration. Note that the arm driving system 142 is not limited to the robot that has the vertically articulated configuration, and may serve as a robot-polar-coordinate robot that has a horizontally articulated configuration, a cylindrical coordinate robot, a Cartesian coordinate robot, or a parallel-link type of robot, for example. The arm driving system 142 may include single joint (namely, a driving axis defined by the joint member 1423). Alternatively, the arm driving system 142 may include a plurality of joints.

The joint member 1423 may couple at least two arm members so that another arm member 1422 that is connected to the joint member 1423 is rotatable relative to one arm member 1422 that is connected to the joint member 1423 around one driving axis (for example, at least one of a rotational axis around the X-axis, a rotational axis around the Y-axis and a rotational axis around the Z-axis). The joint member 1423 may couple at least two arm members so that another arm member 1422 that is connected to the joint member 1423 is movable relative to one arm member 1422 that is connected to the joint member 1423 along one driving axis (for example, at least one of a movement axis along the X-axis, a movement axis along the Y-axis and a movement axis along the Z-axis).

Two arm member 1422 that are coupled through the joint member 1423 move by an actuator 1424 corresponding to each joint. FIG. 6 illustrates an example in which the arm driving system 142 includes four actuators 1424 corresponding to four joint members 1423. As a result, at least one arm member 1422 moves. Thus, at least one arm member 1422 is movable relative to the workpiece W. Namely, at least one arm member 1422 is movable so that a relative positional relationship between at least one arm member 1422 and the workpiece W is changed.

The micromotion driving system 143 is connected (namely, attached or fixed) to the arm driving system 142. Specifically, the micromotion driving system 143 is attached to one arm member 1422, which is located at a position that is farthest from the base 1420, of the plurality of arm members 1422. In the below-described description, one arm member 1422 to which the micromotion driving system 143 is attached is referred to as a tip arm member 1425 for convenience of the description. The micromotion driving system 143 may be directly attached to the tip arm member 1425, or may be indirectly attached to the tip arm member 1425 through another member. The tip arm member 1425 may be referred to as a connection member to which the micromotion driving system 143 is connected.

When the tip arm member 1425 moves by the above-described actuator 1424, the tip arm member 1425 moves relative to the base 1420. Namely, when the tip arm member 1425 moves, a relative position of the tip arm member 1425 and the base 1420 changes. As a result, the micromotion driving system 143 that is attached to the tip arm member 1425 also moves. Thus, the arm driving system 142 moves the micromotion driving system 143. Specifically, the arm driving system 142 moves the micromotion driving system 143 relative to the workpiece W. The arm driving system 142 moves the micromotion driving system 143 so that a relative positional relationship between the micromotion driving system 143 and the workpiece W is changed. Moreover, when the micromotion driving system 143 moves, the processing head 13 that is attached to the micromotion driving system 143 also moves. Thus, the arm driving system 142 may serve as a movement apparatus that moves the processing head 13. Note that the micromotion driving system 143 may be disposed between the plurality of arm members 1422, in addition to or instead of the micromotion driving system 143 that is attached to the tip arm member 1425. Moreover, the micromotion driving system 143 may be disposed between the arm member 1422 and the joint member 1423 and/or between the joint member 1423 and the base 1420.

As described later in detail, the control apparatus 3 may control the arm driving system 142 based on the measured result by the measurement apparatus 2. Namely, the control apparatus 3 may control the arm driving system 142 so as to move the processing head 13 based on the position of at least one of the processing head 13 and the workpiece W measured by the measurement apparatus 2. For example, as described above, the measurement apparatus 2 is configured to measure the position of at least one of the processing head 13 and the workpiece W in at least one of the X-axis direction, the Y-axis direction, Z-axis direction, the OX direction, the OY direction and the OZ direction. Thus, the control apparatus 3 may control the arm driving system 142 so as to move the processing head 13 in at least one of the X-axis direction, the Y-axis direction, Z-axis direction, the OX direction, the OY direction and the OZ direction based on the measured result by the measurement apparatus 2. However, the control apparatus 3 may control the arm driving system 142 based on at least one of the measured result by the processing head 13 and the measured result by the imaging apparatus 15.

(1-3-1-2) Configuration of Micromotion Driving System 143

Figure 7:
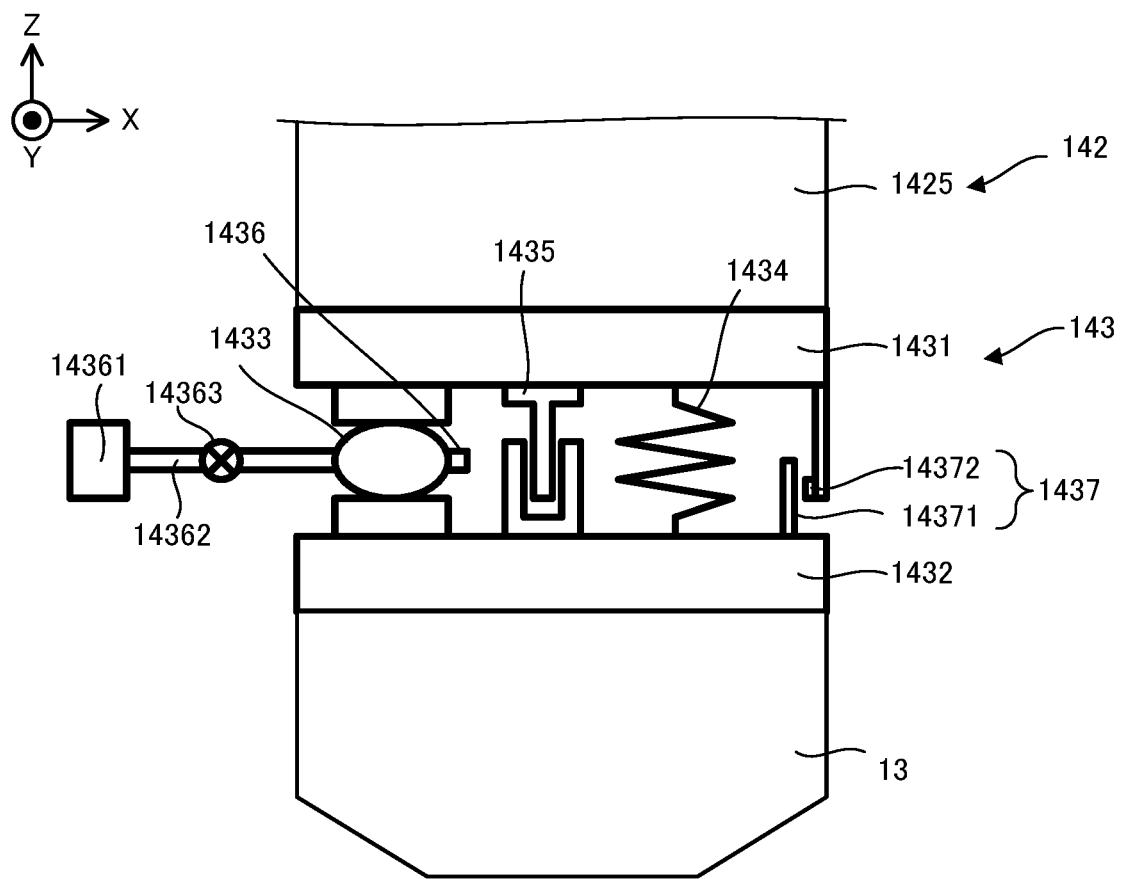
FIG. 7 is a schematical view that illustrates a configuration of a micromotion driving system.

Next, with reference to FIG. 7, a configuration of the micromotion driving system 143 will be described. FIG. 7 is a cross-sectional view that illustrates the configuration of the micromotion driving system 143.

As illustrated in FIG. 7, the micromotion driving system 143 includes a support member 1431, a support member 1432, an air spring 1433, a damper member 1434 and a driving member 1435.

The support member 1431 is attached to the arm driving system 142. Specifically, the support member 1431 is attached (namely, fixed) to the tip arm member 1425 of the arm driving system 142. Thus, the support member 1431 may be referred to as a connection member that is connected to the arm driving system 142. The support member 1432 is attached to the processing head 13. Thus, the support member 1432 may be referred to as a connection member that is connected to the processing head 13.

The support member 1431 is coupled (in other words, interlocked or connected) to the support member 1432 through the air spring 1433, the damper member 1434 and the driving member 1435. Namely, each of the air spring 1433, the damper member 1434 and the driving member 1435 is attached to the support members 1431 and 1432 to couple the support member 1431 and the support member 1432. Since the arm driving system 142 is attached to the support member 1431 and the processing head 13 is attached to the support member 1432, each of the air spring 1433, the damper member 1434 and the driving member 1435 may be regarded to be substantially attached to the support members 1431 and 1432 to couple the arm driving system 142 and the processing head 13.

The air spring 1433 applies an elastic force caused by a pressure of gas (as one example, air) to at least one of the support members 1431 and 1432 under the control of the control apparatus 3. The air spring 1433 applies the elastic force caused by the pressure of the gas to at least one of the arm driving system 142 and the processing head 13 through at least one of the support members 1431 and 1432 under the control of the control apparatus 3. Especially, the air spring 1433 may apply the elastic force caused by the pressure of the gas to at least one of the support members 1431 and 1432 along a direction (for example, the Z-axis direction of the arm coordinate system, and the gravity direction as one example) along which the support member 1431 and the support member 1432 are arranged. Note that the air spring 1433 may be referred to as an elastic member.

In order to apply the elastic force caused by the pressure of the gas, the gas is supplied to the air spring 1433 from a gas supply apparatus 14361 through a pipe 14362 and a valve 14363. The control apparatus 3 controls at least one of the gas supply apparatus 14361 and the valve 14363 based on a measured result by a pressure sensor 1436 that measures a pressure of the gas in the air spring 1433. Note that the micromotion driving system 143 may not include the gas supply apparatus 14361, the pipe 14362 and the valve 14363. In this case, the air spring 1433 may apply the elastic force caused by the pressure therein to at least one of the support members 1431 and 1432 regardless of the control of the control apparatus 3.

The air spring 1433 may support a weight of the support member 1432 by using the elastic force under the control of the control apparatus 3. Specifically, the air spring 1433 may support the weight of the support member 1432 along a direction (for example, the Z-axis direction of the arm coordinate system) along which the support member 1431 and the support member 1432 are arranged by using the elastic force. Since the processing head 13 is attached to the support member 1432, the air spring 1433 may support a weight of the processing head 13 attached to the support member 1432 by using the elastic force. Specifically, the air spring 1433 may support the weight of the processing head 13 along a direction in which the arm driving system 142 (especially, the tip arm member 1425) and the processing head 13 are arranged by using the elastic force. In this case, the air spring 1433 may serve as a weight canceler that cancels the weight of the processing head 13. Note that the air spring 1433 may support the weight of the support member 1432 by using the elastic force regardless of the control of the control apparatus 3.

The air spring 1433 may reduce a vibration, which is transmitted between the arm driving system 142 and the processing head 13 through the micromotion driving system 143, by using the elastic force under the control of the control apparatus 3. Namely, the air spring 1433 may damp the vibration, which is transmitted between the arm driving system 142 and the processing head 13 through the micromotion driving system 143, by using the elastic force. Specifically, the air spring 1433 may reduce (damp) the vibration, which propagates (namely, is transmitted) from the arm driving system 142 to the processing head 13 through the micromotion driving system 143, by using the elastic force. In this case, the control apparatus 3 may control at least one of the gas supply apparatus 14361 and the valve 14363 based on the measured result by the pressure sensor 1436 so that the vibration that is transmitted between the arm driving system 142 and the processing head 13 through the micromotion driving system 143 is reduced (namely, is damped). Note that the air spring 1433 may reduce the vibration, which is transmitted between the arm driving system 142 and the processing head 13 through the micromotion driving system 143, by using the elastic force regardless of the control of the control apparatus 3.

The damper member 1434 applies an elastic force caused by a factor different from the pressure of the air to at least one of the support members 1431 and 1432. The damper member 1434 applies the elastic force caused by the factor different from the pressure of the air to at least one of the arm driving system 142 and the processing head 13 through at least one of the support members 1431 and 1432. Especially, the damper member 1434 may apply the elastic force to at least one of the support members 1431 and 1432 along a direction (for example, the Z-axis direction of the head coordinate system, and the gravity direction as one example) along which the support member 1431 and the support member 1432 are arranged. Namely, the damper member 1434 may apply the elastic force to at least one of the arm driving system 142 and the processing head 13 through at least one of the support members 1431 and 1432 along a direction along which the arm driving system 142 (especially, the tip arm member 1425) and the processing head 13 are arranged. Note that the damper member 1434 may be referred to as an elastic member.

The damper member 1434 may support a weight of the support member 1432 by using the elastic force, as with the air spring 1433. The damper member 1434 may reduce a vibration, which is transmitted between the arm driving system 142 and the processing head 13 through the micromotion driving system 143, by using the elastic force, as with the air spring 1433. The damper member 1434 may convert the vibration of the air spring 1433 to a damping vibration by using the elastic force. Namely, the damper member 1434 may convert the vibration, which is transmitted between the arm driving system 142 and the processing head 13 through the micromotion driving system 143, to the damping vibration by using the elastic force.

The damper member 1434 may be any member as long as it is configured to apply the elastic force. For example, the damper member 1434 may include a compressed spring coil. For example, the damper member 1434 may include a plate spring.

The driving member 1435 is configured to generate a driving force under the control of the control apparatus 3. The driving member 1435 is configured to apply the generated driving force to at least one of the support members 1431 and 1432. The driving member 1435 is configured to apply the generated driving force to at least one of the arm driving system 142 and the processing head 13 through at least one of the support members 1431 and 1432. The driving member 1435 may have any configuration as long as it is configured to generate the driving force. For example, the driving member 1435 may have a configuration that is configured to generate the driving force electrically. For example, the driving member 1435 may have a configuration that is configured to generate the driving force magnetically. As one example, FIG. 7 illustrates an example in which the driving member 1435 is a voice coil motor (VCM: Voice Coil Motor) that is configured to generate the driving force electrically. Note that the driving member 1435 may be a linear motor that is different from the voice coil motor, because the voice coil motor is one type of linear motor. The driving member 1435 may be an apparatus that is configured to generate the driving force along a linear axis.

Note that the driving member 1435 may have a configuration in which a member of the driving member 1435 that is attached to the support member 1431 does not physically contact with a member of the driving member 1435 that is attached to the support member 1432. For example, when the driving member 1435 is the voice coil motor, the member (for example, a member including either one of a coil and a magnetic pole) of the driving member 1435 that is attached to the support member 1431 does not physically contact with a member (for example, a member including the other one of a coil and a magnetic pole) of the driving member 1435 that is attached to the support member 1432.

The driving member 1435 may move at least one of the support members 1431 and 1432 by using the driving force under the control of the control apparatus 3. The driving member 1435 may move at least one of the arm driving system 142 and the processing head 13 by moving at least one of the support members 1431 and 1432 by using the driving force under the control of the control apparatus 3. In this case, the driving member 1435 may change a relative position between the arm driving system 142 and the processing head 13 by moving at least one of the arm driving system 142 and the processing head 13 by using the driving force.

The driving member 1435 may change the relative position between the arm driving system 142 and the processing head 13 based on a measured result by a position measurement apparatus 1437 of the micromotion driving system 143 under the control of the control apparatus 3. The position measurement apparatus 1437 measures the relative position between the arm driving system 142 and the processing head 13. For example, the position measurement apparatus 1437 may be an encoder that includes a detection part 14371 that is attached to the support member 1431 and a scale part 14372 that is attached to the support member 1432. The measured result by the position measurement apparatus 1437 includes an information relating to the relative position between the support member 1431 and the support member 1432. Since the arm driving system 142 is attached to the support member 1431 and the processing head 13 is attached to the support member 1432, the information relating to the relative position between the support member 1431 and the support member 1432 includes an information relating to the relative position between the arm driving system 142 and the processing head 13. Therefore, the control apparatus 3 properly determines the relative position between the arm driving system 142 and the processing head 13. As a result, the control apparatus 3 properly changes the relative position between the arm driving system 142 and the processing head 13 based on the measured result by the position measurement apparatus 1437.

The driving member 1435 may move the processing head 13 relative to the workpiece W by changing the relative position between the arm driving system 142 and the processing head 13 (typically, moving the processing head 13 relative to the arm driving system 142) under the control of the control apparatus 3. The driving member 1435 may move the processing head 13 so that the relative positional relationship between the processing head 13 and the workpiece W is changed.

The driving member 1435 may reduce the vibration, which is transmitted between the arm driving system 142 and the processing head 13 through the micromotion driving system 143, by changing the relative position between the arm driving system 142 and the processing head 13 by using the driving force under the control of the control apparatus 3. Namely, the driving member 1435 may damp the vibration, which is transmitted between the arm driving system 142 and the processing head 13 through the micromotion driving system 143, by using the driving force. Specifically, the driving member 1435 may reduce (damp) the vibration, which propagates (is transmitted) from the arm driving system 142 to the processing head 13 through the micromotion driving system 143, by using the driving force.

The driving member 1435 may convert the vibration of the air spring 1433 to the damping vibration by changing the relative position between the arm driving system 142 and the processing head 13 by using the driving force. Namely, the driving member 1435 may convert the vibration, which is transmitted between the arm driving system 142 and the processing head 13 through the micromotion driving system 143, to the damping vibration by using the driving force. In this case, it can be said that the driving member 1435 reduces a relative displaced amount between the arm driving system 142 and the processing head 13, which is caused by the vibration propagating from the arm driving system 142 to the processing head 13, by using the driving force. Specifically, it can be said that the driving member 1435 reduces a relative displaced amount between a part of the arm driving system 142 (namely, the tip arm member 1425) to which the micromotion driving system 143 is attached and a part of the processing head 13 to which the micromotion driving system 143 is attached, which is caused by the vibration propagating from the arm driving system 142 to the processing head 13, by using the driving force. Incidentally, when the driving member 1435 is configured to convert the vibration of the air spring 1433 to the damping vibration, the micromotion driving system 143 may not include the damper member 1434. However, even when the driving member 1435 is not configured to convert the vibration of the air spring 1433 to the damping vibration, the micromotion driving system 143 may not include the damper member 1434. Moreover, the number of the air spring 1433, the number of the damper member 1434 and the number of the driving member 1435 may not be equal to one another.

The driving member 1435 may apply the driving force that acts along a direction including a component of the direction along which the air spring 1433 and/or the damper member 1434 applies the elastic force. In an example illustrated in FIG. 6, the driving member 1435 may apply the driving force that acts along a direction including a component of the Z-axis direction, because the air spring 1433 and/or the damper member 1434 applies the elastic force along the Z-axis direction. When the driving member 1435 generates the driving force that acts along the direction including the component of the direction along which the air spring 1433 and/or the damper member 1434 applies the elastic force, the driving member 1435 may be configured to convert the vibration of the air spring 1433 to the damping vibration by using this driving force. When the vibration of the air spring 1433 is converted to the damping vibration, the driving member 1435 may change a resonance frequency of the air spring 1433 by using the driving force. Typically, the driving member 1224 may increase the resonance frequency of the air spring 1433 by using the driving force.

An apparatus that actively reduces the vibration by using the driving member 1435 and the elastic member such as the air spring 1433 may be referred to as an active vibration isolation apparatus. Thus, the micromotion driving system 143 may be referred to as an active vibration isolation apparatus. The active vibration isolation apparatus may be referred to as an AVIS (Active Vibration Isolation System).

As described later in detail, the control apparatus 3 may control the micromotion driving system 143 based on the measured result by the imaging apparatus 15. Namely, the control apparatus 3 may control the micromotion driving system 143 so as to move the processing head 13 based on the position of the workpiece W measured by the imaging apparatus 15. For example, as described above, the imaging apparatus 15 is configured to measure the position of the workpiece W in at least one of the X-axis direction, the Y-axis direction and the θZ direction. Thus, the control apparatus 3 may control the micromotion driving system 143 so as to move the processing head 13 in at least one of the X-axis direction, the Y-axis direction and the θZ direction based on the measured result by the imaging apparatus 15. For example, as described above, the imaging apparatus 15 is configured to measure the position of the workpiece W in at least one of the Z-axis direction, the θX direction and the θY direction. Thus, the control apparatus 3 may control the micromotion driving system 143 so as to move the processing head 13 in at least one of the Z-axis direction, the θX direction and the θY direction based on the measured result by the imaging apparatus 15. However, the control apparatus 3 may control the micromotion driving system 143 based on at least one of the measured result by the processing head 13 and the measured result by the measurement apparatus 2.

(1-4) Configuration of Measurement Apparatus 2

Figure 8:
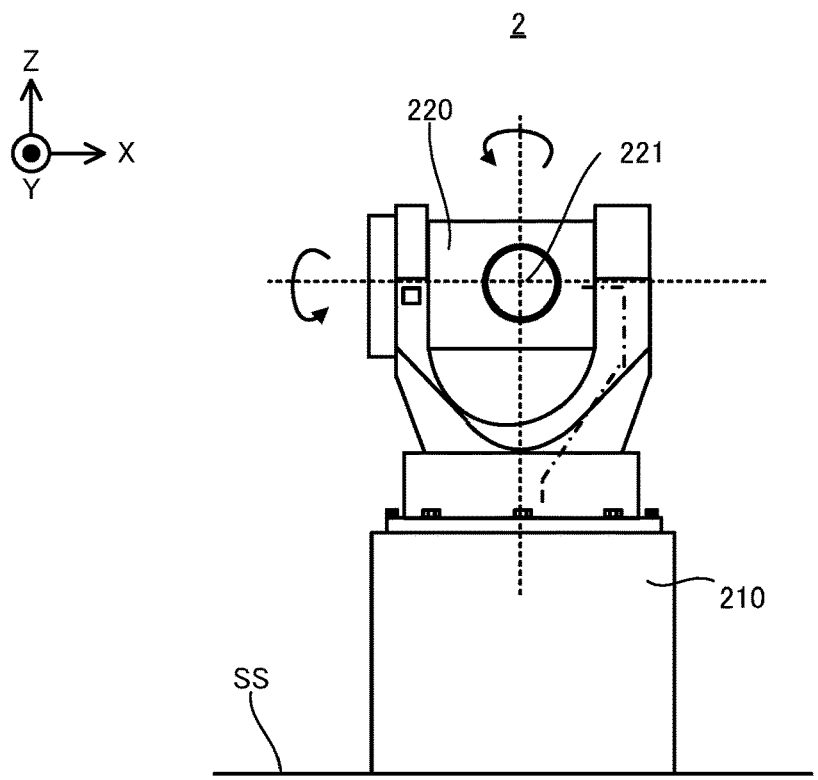
FIG. 8 is a front elevation view that illustrates an exterior appearance of a measurement apparatus.
Figure 9:
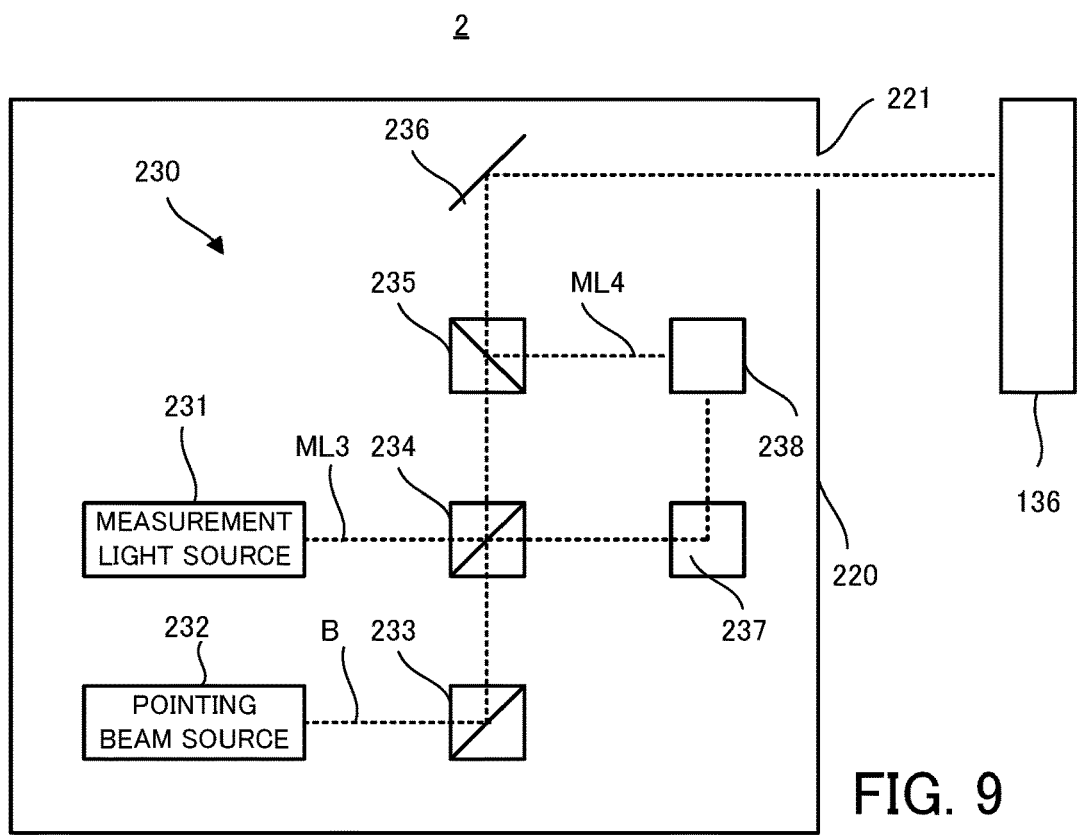
FIG. 9 is a block diagram that illustrates a configuration of the measurement apparatus.

Next, a configuration of the measurement apparatus 2 will be described. The measurement apparatus 2 may be a measurement apparatus including a laser radar system disclosed in US2012/188557A1 (for example, a measurement apparatus that uses a frequency-modulated measurement light), for example. Next, with reference to FIG. 8 and FIG. 9, one example of the measurement apparatus 2 including the laser radar system disclosed in US2012/188557A1 will be described. FIG. 8 is a front elevation view that illustrates an exterior appearance of the measurement apparatus 2. FIG. 9 is a block diagram that illustrates a configuration of the measurement apparatus 2.

As illustrated in FIG. 8, the measurement apparatus 2 includes a base 210 and a housing 220. The base 210 is a platform that supports the housing 220. The base 210 may be disposed on the support surface SS on which the processing apparatus 1 and the workpiece W are disposed, for example. The base 210 may be disposed on the support surface SS through a non-illustrated support member or may be directly disposed on the support surface SS. The housing 220 is a member in which an optical assembly 230 illustrated in FIG. 9 are contained. In an example illustrated in FIG. 8, the housing 220 is rotatable around a rotational axis along the X-axis and a rotational axis along the Z-axis.

As illustrated in FIG. 9, the optical assembly 230 includes a measurement light source 231, a pointing beam source 232, a beam splitter 233, a beam splitter 234, a beam splitter 235, a mirror 236, an optical circuit 237 and a detector 238.

The measurement light source 231 generate the measurement light ML3. A part of the measurement light ML3 generated by the measurement light source 231 is emitted from an emitting port 221 formed at the housing 220 through the beam splitters 234 and 235 and the mirror 236. The measurement light ML3 emitted from the emitting port 221 enters the reflector 136 (alternatively, the reflector W136, the same is applied to the below-described description). When the housing 220 rotates around the rotational axis as described above, an emitting direction of the measurement light ML3 from the measurement apparatus 2 changes. Thus, the control apparatus 3 may rotate the housing 220 so that the measurement light ML3 enters the reflector 136 disposed at a desired position. The reflector 136 reflects a part of the measurement light ML3 entering the reflector 136. At least a part of the measurement light ML3 entering the reflector 136 (hereinafter, it is referred to as a "returned light ML4") enters the optical assembly 230 through the emitting port 221. The returned light ML4 entering the optical assembly 230 enters the detector 238 through the mirror 236 and the beam splitter 235. On the other hand, another part of the measurement light ML3 generated by the measurement light source 231 enters the detector 238 through the beam splitter 234 and the optical circuit 237 that is disclosed in US2012/188557A1 (alternatively, U.S. Pat. No. 4,733,606B). The control apparatus 3 calculates the position of the processing head 13 based on a detected result of the measurement light ML3 and the returned light ML4 by the detector 238. For example, the control apparatus 3 calculates the position of the processing head 13 based on a detected result of the measurement light ML3 and the returned light ML4 by the detector 238 by using an optical heterodyne type detection disclosed in US2012/188557A1 (alternatively, U.S. Pat. No. 4,733,606B).

The pointing beam source 232 generates the pointing beam B. The pointing beam B is used to detect a position on the reflector 136 toward which the measurement light ML3 is directed. The pointing beam B may include a visible light. The pointing beam B generated by the pointing beam source 232 is emitted from the emitting port 221 formed at the housing 220 through the beam splitters 233, 234 and 235 and the mirror 236. The pointing beam B emitted from the emitting port 221 enters the reflector 136. However, the optical assembly 230 may not emit the pointing beam B toward the reflector 136.

Note that the measurement apparatus 2 is not limited to the measurement apparatus including the laser radar system disclosed in US2012/188557A1. For example, the measurement apparatus 2 may be a measurement apparatus including a measurement apparatus disclosed in U.S. Pat. No. 7,800,758B (for example, a measurement apparatus that uses an intensity-modulated measurement light). For example, the measurement apparatus 2 may be a measurement apparatus including a measurement apparatus disclosed in U.S. Pat. No. 6,847,436B (for example, a measurement apparatus that uses an intensity-modulated measurement light).

Figure 10:
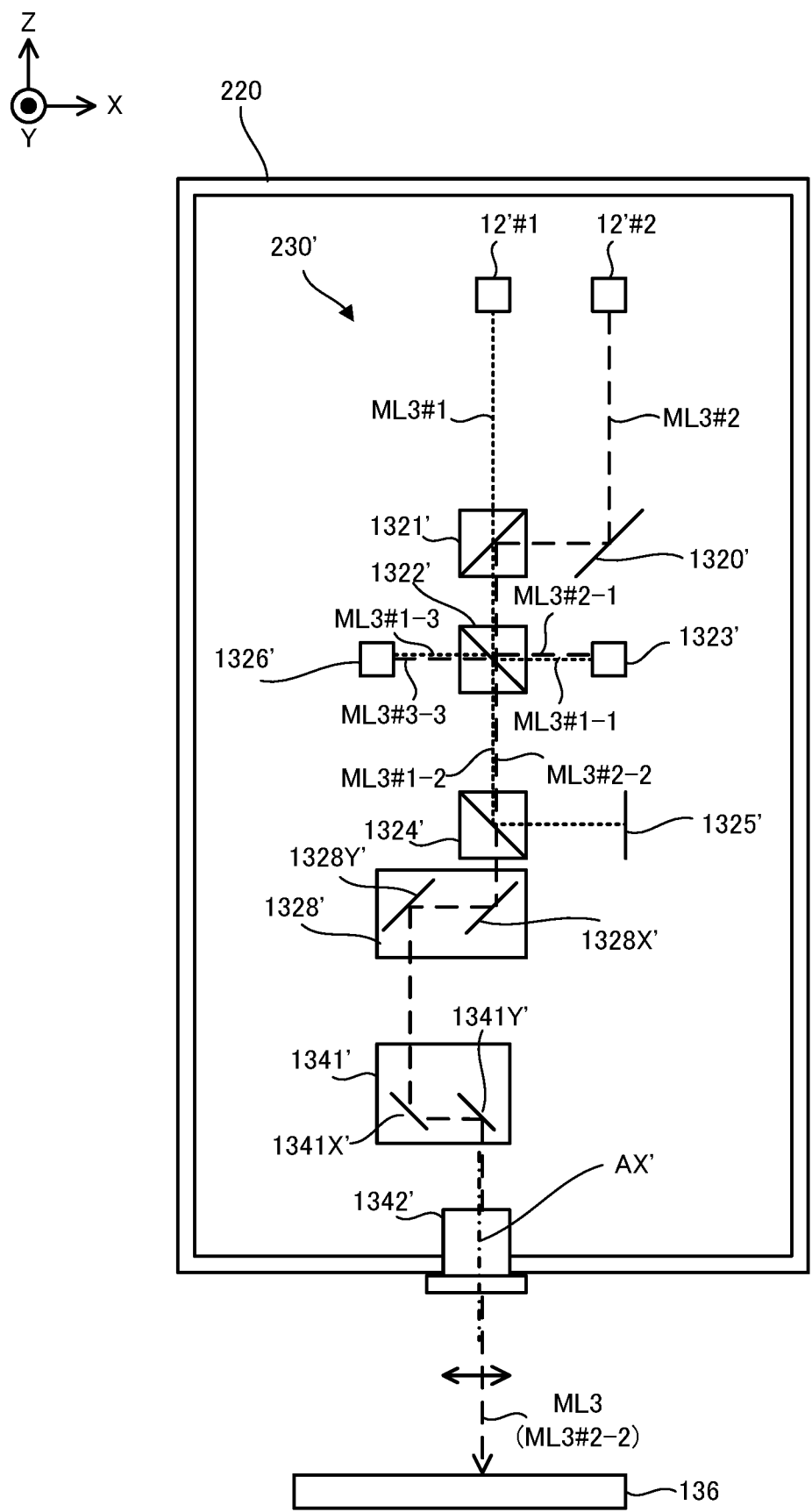
FIG. 10 is a block diagram that illustrates another configuration of the measurement apparatus.

Alternatively, the measurement apparatus 2 may include an optical assembly 230' that is configured to measure the position of at least one of the processing head 13 and the workpiece W by using a method that is same as the above-described method of measuring the position of the workpiece W by using the measurement light ML3, instead of the optical assembly 230 illustrated in FIG. 9. FIG. 10 illustrates one example of the optical assembly 230'. As illustrated in FIG. 10, the optical assembly 230' includes a measurement light source 12'#1, a measurement light source 12'#2, a mirror 1320', a beam splitter 1321', a beam splitter 1322', a detector 1323', a beam splitter 1324', a mirror 1325', a detector 1326', a mirror 1327', a Galvano mirror 1328', a Galvano mirror 1341' and a fθ lens 1342'. The measurement light source 12'#1, the measurement light source 12'#2, the mirror 1320', the beam splitter 1321', the beam splitter 1322', the detector 1323', the beam splitter 1324', the mirror 1325', the detector 1326', the mirror 1327', a Galvano mirror 1328', the Galvano mirror 1341' and the fθ lens 1342' may be same as the measurement light source 12 #1, the measurement light source 12 #2, the mirror 1320, the beam splitter 1321, the beam splitter 1322, the detector 1323, the beam splitter 1324, the mirror 1325, the detector 1326, the mirror 1327, a Galvano mirror 1328, the Galvano mirror 1341 and the fθ lens 1342 described above. Namely, the optical assembly 230' may measure the position of at least one of the processing head 13 and the workpiece W by detecting an interference light of a measurement light ML3 #1 from the measurement light source 12'#1 and a measurement light ML3 #2 from the measurement light source 12'#2 by using the detectors 1323' and 1326'. Note that the optical assembly 230' may not include the Galvano mirrors 1328 and 1341, because irradiation positions of the measurement lights ML3 #1 and ML3 #2 is changeable by rotating the housing 220.

(1-5) Processing Operation

Next, the processing operation that is performed by the processing system SYSa in order to process the workpiece W will be described.

(1-5-1) Specific Example of Workpiece W that is a Target for Processing Operation Firstly, with reference to FIG. 11, one specific example of the workpiece W that is a target for the processing operation will be described.

Figure 11:
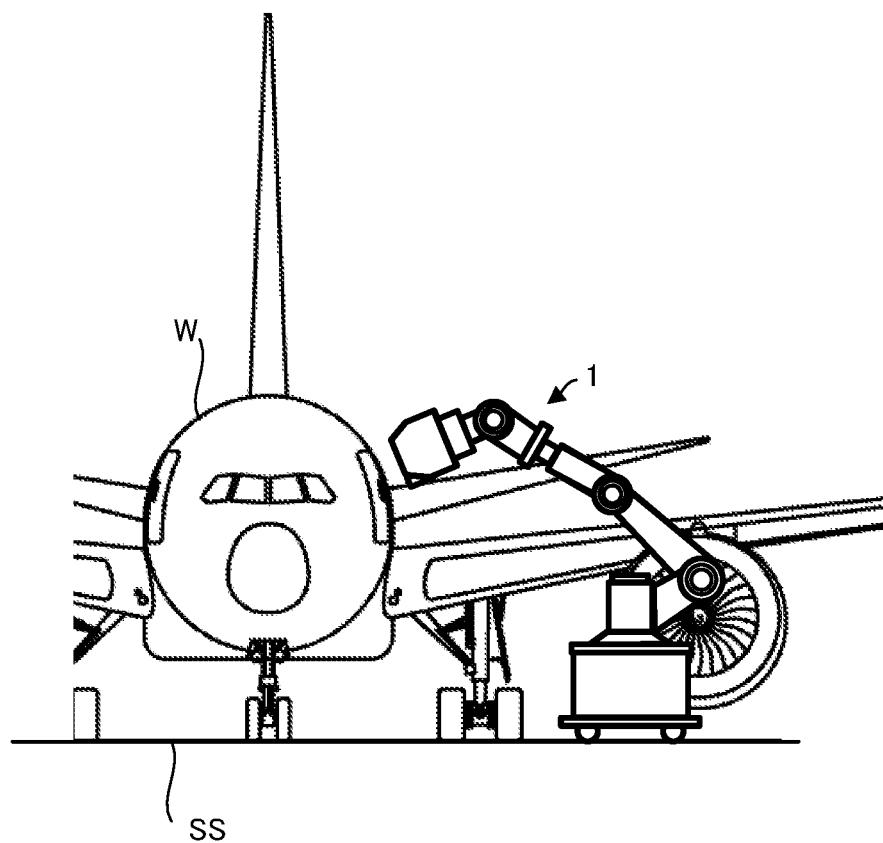
FIG. 11 is a schematical view that illustrates one specific example of the workpiece processed by a processing apparatus.

As illustrated in FIG. 11, the processing apparatus 1 may process the workpiece W that is larger than the processing apparatus 1. In an example illustrated in FIG. 11, the processing apparatus 1 processes the workpiece W that is at least a part of an airplane. In this case, the processing apparatus 1 may process at least a part of the airplane to form the above-described riblet structure on at least a part of the airplane. For example, the processing apparatus 1 may process at least a part of the airplane to form the above-described riblet structure on at least a part of a body, a main wing, a vertical tail and/or a horizontal tail of the airplane. However, the processing apparatus 1 may process the workpiece W that is smaller than the processing apparatus 1. The processing apparatus 1 may process the workpiece W a size of which is same as that of the processing apparatus 1. Moreover, the processing apparatus 1 may process the workpiece W a size of which is larger than the moving stroke of the head driving system 14 of the processing apparatus 1. The processing apparatus 1 may process the workpiece W a size of which is larger than a range that is irradiated with the processing light EL without moving the processing head 13 by using the head driving system 14 of the processing apparatus 1 (for example, a shot area SA described later).

As described above, the riblet structure is the structure by which the resistance (especially, at least one of the frictional resistance and the turbulent frictional resistance) of the surface of the workpiece W to the fluid is reducible. Thus, the processing apparatus 1 may process the workpiece W that is at least a part of an object the resistance relative to the fluid of which is preferably reduced. For example, the processing apparatus 1 may process the workpiece W that is at least a part of an object (namely, a movable body) that is movable so that at least a part thereof moves in the fluid (for example, at least one of the gas and the liquid). At least one of a helicopter and a drone is one example of the movable body. In this case, the processing apparatus 1 may process at least a part of a body and/or a rotary wing of at least one of the helicopter and the drone. At least one of a train, a linear motor car, a car, a bicycle, a ship and a rocket is another example of the movable body. In this case, the processing apparatus 1 may process at least a part of a body of the train, a body of the linear motor car, a body of the car, a frame of the bicycle, a body of the ship and a body of the rocket. At least one of a turbine, a fan and a windmill is another example of the movable body. In this case, a processed part is not limited to a rotating part (a moving part), and may be a fixed part that faces the fluid. Alternatively, the processing apparatus 1 may process the workpiece W that is an object at least a part of which faces the flowing fluid. A pipe in which the fluid flows in an inner path is one example of the object at least a part of which faces the flowing fluid. In this case, the processing apparatus 1 may process at least a part of an inner wall of the pipe that faces the path.

(1-5-2) Flow of Processing Operation

Figure 12:
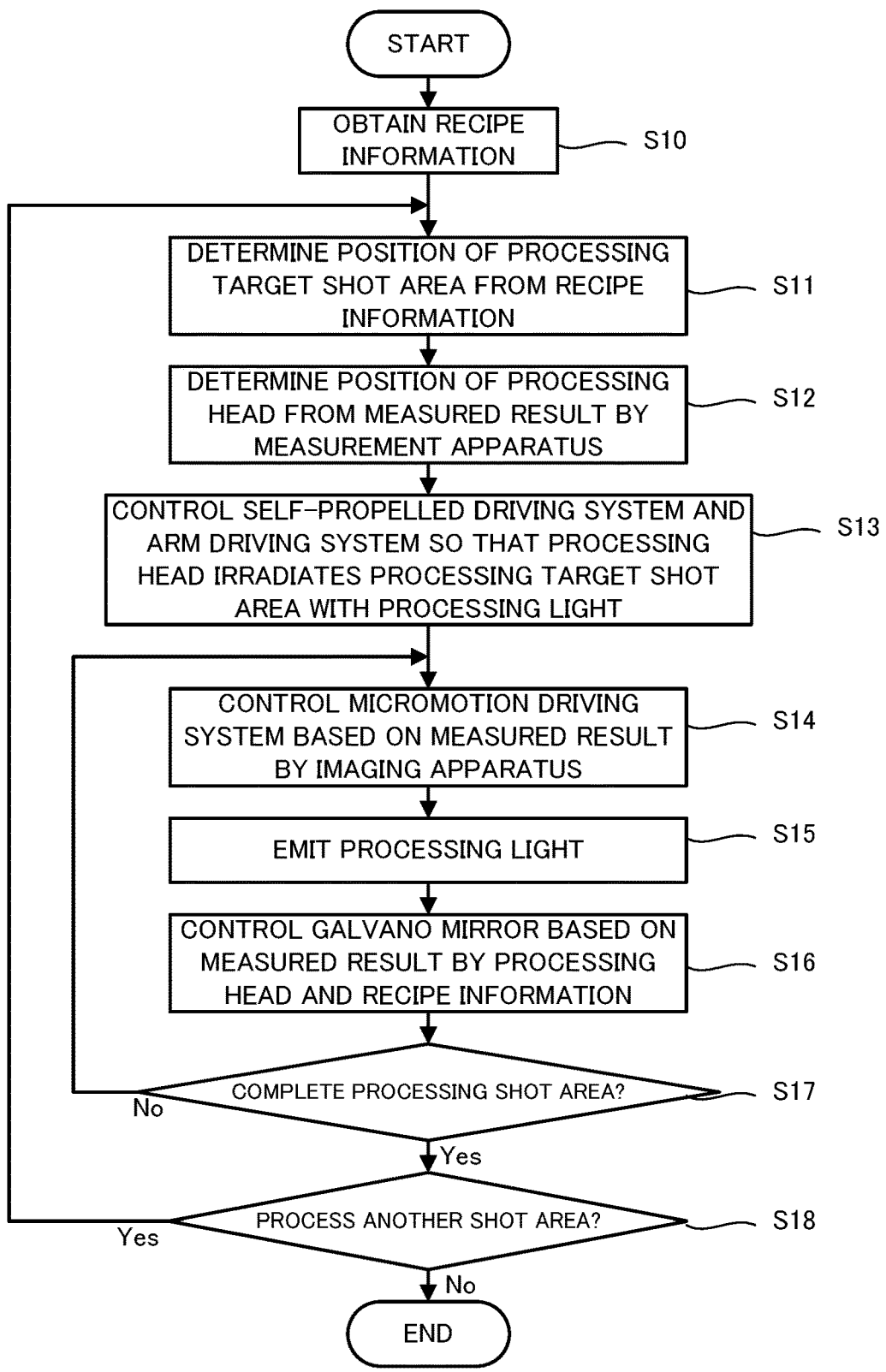
FIG. 12 is a flowchart that illustrates one example of a flow of a processing operation.

Next, with reference to FIG. 12, one example of the processing operation will be described. FIG. 12 is a flowchart that illustrates a flow of one example of the processing operation.

As illustrated in FIG. 12, the control apparatus 3 obtains an recipe information (a step S10). The recipe information is an information that is used by the processing system SYSa to process the workpiece W. Thus, the recipe information may include various information related to the processing of the workpiece W. For example, the recipe information may include a workpiece information related to the workpiece W that is a processing target. The workpiece information may include an information related to the shape of the workpiece W, an information related to the size of the workpiece W and an information related to the position of the workpiece W. The recipe information may include a processing detail information related to the detail of the processing that should be performed on each part of the workpiece W, in addition to or instead of the workpiece information. For example, the processing detail information may include an information related to a characteristic of the riblet structure (for example, at least one of a width, a depth, an extending direction and a pitch of the groove included in the riblet structure). The characteristic of the riblet structure may be referred to as a morphology of the riblet structure.

Figure 13:
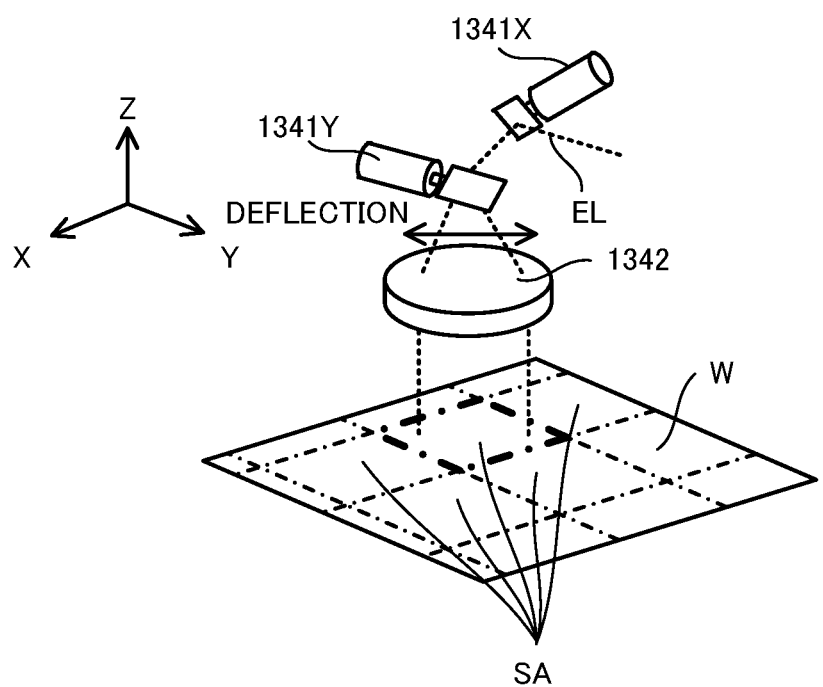
FIG. 13 is a perspective view illustrating a shot area SA.

The recipe information may include a shot area information related to the shot area SA set on the surface of the workpiece W. As illustrated in FIG. 13 that is a perspective view illustrating the shot area SA, a plurality of shot areas SA may be set on the workpiece W. Especially, when the processing apparatus 1 processes the workpiece W that is larger than the processing apparatus 1 as described above, there is a high possibility that the plurality of shot areas SA are set on the workpiece W. Each shot area SA may indicate an area (in other words, a range) that is processed by the processing apparatus 1 in a state where the positional relationship between the processing head 13 and the workpiece W is fixed (namely, is not change). Since the workpiece W is processed by the processing light EL as described above, the area that is processed by the processing apparatus 1 corresponds to an area that is able to be irradiated with the processing light EL by the processing head 13. Furthermore, when the positional relationship between the processing head 13 and the workpiece W is fixed, the irradiation position of the processing light EL on the workpiece W is changed by the Galvano mirror 1341. Thus, the shot area SA may be typically set to be an area that is same as or narrower than a sweeping range of the processing light EL deflected by the Galvano mirror 1341 in the state where the positional relationship between the processing head 13 and the workpiece W is fixed.

The shot area information may include an information related to a position of each shot area SA on the workpiece W. The shot area information may include an information related to a size of each shot area SA on the workpiece W. The shot area information may include an information related to a largeness of each shot area SA on the workpiece W. Note that the control apparatus 3 may set the plurality of shot areas SA on the surface of the workpiece W. In this case, the shot area information may not be included in the recipe information.

When the plurality of shot areas SA are set on the surface of the workpiece W, the processing apparatus 1 processes the plurality of shot areas SA in sequence. Specifically, the processing apparatus 1 moves the processing head 13 to a position at which the processing head 13 is capable of irradiating one shot area SA with the processing light EL. Then, the processing apparatus 1 processes the one shot area SA by irradiating the one shot area SA with the processing light EL. After the processing of the one shot area SA is completed, the processing apparatus 1 moves the processing head 13 to a position at which the processing head 13 is capable of irradiating another shot area SA that is different from the shot area SA with the processing light EL. Then, the processing apparatus 1 processes the another shot area SA by irradiating the another shot area SA with the processing light EL. Then, the processing apparatus 1 repeats the same operation until the processing of the plurality of shot areas SA are completed.

Thus, the control apparatus 3 determines a position (typically, a position in the base coordinate system) of one shot area SA, which should be processed by the processing apparatus 1, on the workpiece W based on the recipe information (a step S11). In the below-described description, the one shot area SA determined at the step S11 is referred to as a processing target shot area PSA. Incidentally, when the control apparatus 3 may set the plurality of shot areas SA on the surface of the workpiece W, the control apparatus 3 may set one of the plurality of shot areas SA set by the control apparatus 3 to be the processing target shot area PSA.

Then, the control apparatus 3 determines the position of the processing head 13 based on the measured result by the measurement apparatus 2 (a step S12). Moreover, the control apparatus 3 may determine the position of the workpiece W if needed. Note that the measurement apparatus 2 may keep measuring the position of the processing head 13 in a period during which the processing operation illustrate in FIG. 2 is performed. However, the measurement apparatus 2 may measure the position of the processing head 13 at a timing when the measured result by the measurement apparatus 2 is necessary. The measurement apparatus 2 may measure the position of the processing head 13 periodically. The measurement apparatus 2 may measure the position of the processing head 13 at a random timing.

Figure 14:
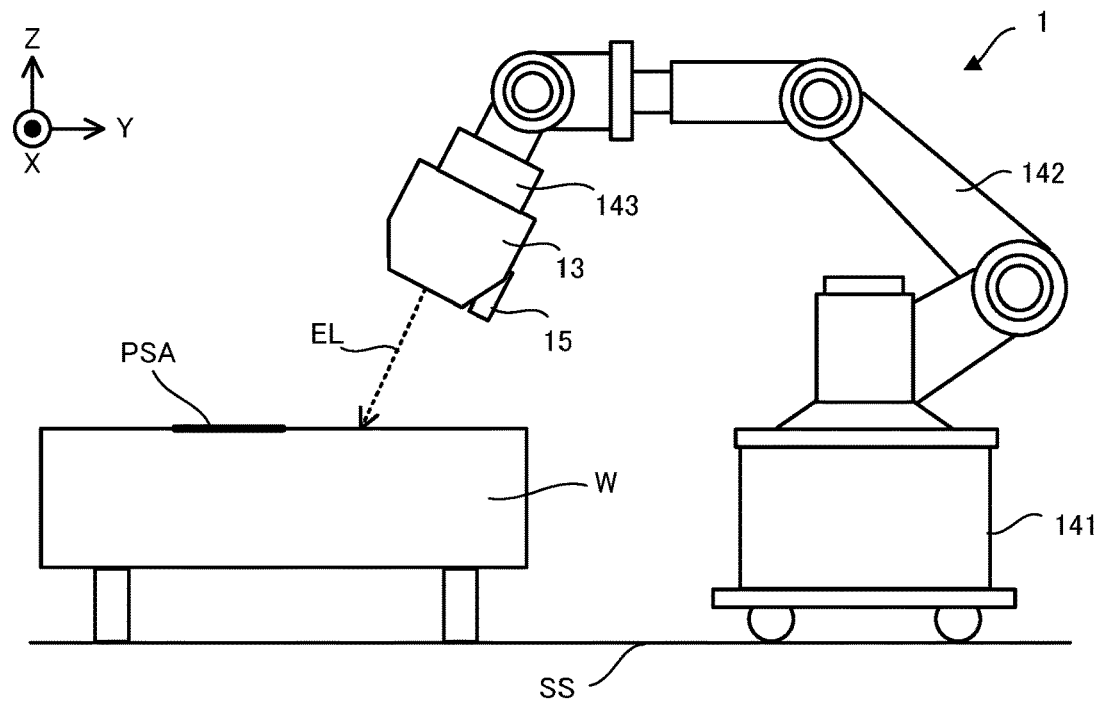
FIG. 14 is a schematical view that illustrates the processing head located at a position from which it cannot irradiate a processing target shot area with a processing light.
Figure 15:
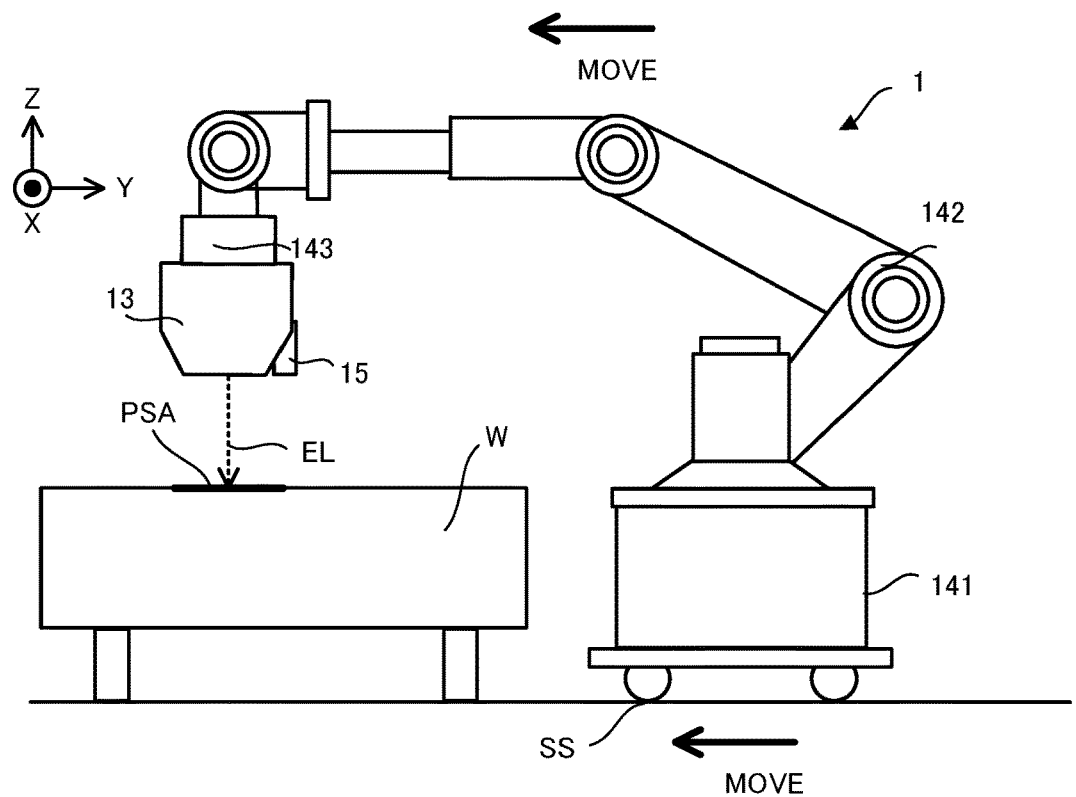
FIG. 15 is a schematical view that illustrates the processing head located at a position from which it can irradiate a processing target shot area with the processing light.

Then, the control apparatus 3 moves, based on the position of the processing target shot area PSA determined at the step S11 and the position of the processing head 13 determined at the step S12, the processing head 13 to a position at which the processing head 13 is capable of irradiating the processing target shot area PSA with the processing light EL (a step S13). Specifically, the control apparatus 3 moves, by controlling at least one of the self-propelled driving system 141 and the arm driving system 142, the processing head 13 to the position at which the processing head 13 is capable of irradiating the processing target shot area PSA with the processing light EL. Namely, the control apparatus 3 moves the processing head 13 to the processing target shot area PSA by controlling at least one of the self-propelled driving system 141 and the arm driving system 142. As a result, the processing head 13 moves from a position at which the processing head 13 is not capable of irradiating the processing target shot area PSA with the processing light EL as illustrated in FIG. 14 to a position at which the processing head 13 is capable of irradiating the processing target shot area PSA with the processing light EL as illustrated in FIG. 15.

Since the imaging apparatus 15 is attached to the processing head 13, when the processing head 13 moves, the imaging apparatus 15 also moves. In this case, the imaging apparatus 15 may be capable of capturing the image of the processing target shot area PSA in a state where the processing head 13 is located at the position at which the processing head 13 is capable of irradiating the processing target shot area PSA with the processing light EL. Thus, the imaging apparatus 15 may be aligned relative to the processing head 13 so that the imaging apparatus 15 is capable of capturing the image of the processing target shot area PSA in the state where the processing head 13 is located at the position at which the processing head 13 is capable of irradiating the processing target shot area PSA with the processing light EL When the moving accuracy of the processing head 13 by the arm driving system 142 is higher than the moving accuracy of the processing head 13 by the self-propelled driving system 141, the control apparatus 3 may move the processing head 13 by using the self-propelled driving system 141 with relatively rough accuracy and then move the processing head 13 by using the arm driving system 142 with relatively fine accuracy. Namely, the control apparatus 3 may align the processing head 13 relative to the processing target shot area PSA by using the self-propelled driving system 141 with relatively rough accuracy and then align the processing head 13 relative to the processing target shot area PSA by using the arm driving system 142 with relatively fine accuracy.

The control apparatus 3 may control at least one of the self-propelled driving system 141 and the arm driving system 142 so that the processing apparatus 1 (especially, the processing head 13 and the head driving system 14) does not interfere with the workpiece W in a period during which the processing head 13 moves. Namely, the control apparatus 3 may control at least one of the self-propelled driving system 141 and the arm driving system 142 so that the processing apparatus 1 (especially, the processing head 13 and the head driving system 14) does not contact with or collide with the workpiece W in a period during which the processing head 13 moves. In this case, the self-propelled driving system 142 may be regarded to be a driving system that is movable without interfering with the workpiece W.

On the other hand, the micromotion driving system 143 may not move the processing head 13 in a period during which at least one of the self-propelled driving system 141 and the arm driving system 142 moves the processing head 13. The processing apparatus 1 may not irradiated the workpiece W with the processing light EL in the period during which at least one of the self-propelled driving system 141 and the arm driving system 142 moves the processing head 13. Thus, the Galvano mirror 1341 for deflecting the processing light EL may not be driven in the period during which at least one of the self-propelled driving system 141 and the arm driving system 142 moves the processing head 13. Namely, the Galvano mirror 1341 may not change the condensed position of the processing light EL in the plane along the XY plane in the head coordinate system. The Galvano mirror 1341 may not change the irradiation position of the processing light EL on the workpiece W.

After the processing head 13 has moved to the position at which the processing head 13 is capable of irradiating the processing target shot area PSA with the processing light EL, the control apparatus 3 controls the micromotion driving system 143 based on the measured result by the imaging apparatus 15 (a step S14). Thus, after the processing head 13 has moved to the position at which the processing head 13 is capable of irradiating the processing target shot area PSA with the processing light EL, the imaging apparatus 15 may start capturing the image of the workpiece W (especially, the processing target shot area PSA). Namely, after the processing head 13 has moved to the position at which the processing head 13 is capable of irradiating the processing target shot area PSA with the processing light EL, the processing apparatus 1 may start measuring the position of the workpiece W by using the imaging apparatus 15. However, when the processing apparatus 1 does not include the micromotion driving system 143, the processing system SYSa may not perform the operation at the step S14.

The control apparatus 3 may recognize the processing target shot area PSA from the measured result by the imaging apparatus 15 and control the micromotion driving system 143 based on the measured¥ result by the imaging apparatus 15 so that the relative positional relationship between the recognized processing target shot area PSA and the processing head 13 (especially, the fθ lens 1342) is fixed. Namely, the control apparatus 3 may control the micromotion driving system 143 based on the measured result by the imaging apparatus 15 so that the processing head 13 (especially, the fθ lens 1342) is static relative to the recognized processing target shot area PSA. In this case, even when the workpiece W moves relative to the processing head 13, the micromotion driving system 143 moves the processing head 13 in response to the movement of the processing head 13. For example, even when the workpiece W moves relative to the processing head 13 toward one direction by one moving distance, the micromotion driving system 143 moves the processing head 13 toward the one direction by the one moving distance in response to the movement of the processing head 13. As a result, the relative positional relationship between the processing target shot area PSA and the processing head 13 (especially, the fθ lens 1342) does not change. Thus, the control apparatus 3 may not necessarily consider the movement of the workpiece W relative to the processing head 13 in controlling the Galvano mirror 1341 to irradiate a desired position in the processing target shot area PSA with the processing light EL. Namely, the control apparatus 3 may control the Galvano mirror 1341 to irradiate the desired position in the processing target shot area PSA with the processing light EL without considering the movement of the workpiece W relative to the processing head 13. Since the relative positional relationship between the processing target shot area PSA and the processing head 13 (especially, the fθ lens 1342) does not change, it can be said that the control apparatus 3 performs a control for not changing the relative positional relationship between the recognized processing target shot area PSA and the processing head 13 (especially, the fθ lens 1342).

Figure 16:
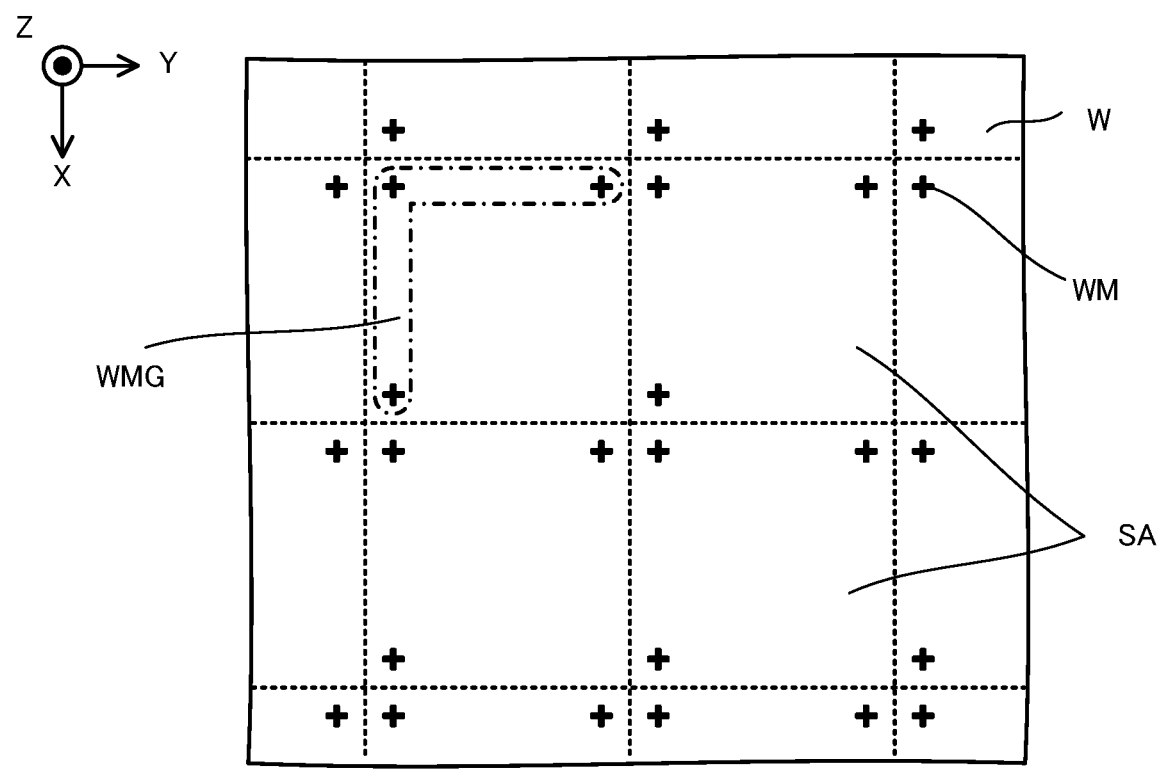
FIG. 16 is a planar view that illustrates examples of the workpiece markers formed on a plurality of shot areas.

When the imaging apparatus 15 captures the image of the workpiece marker WM formed in the workpiece W as described above, the workpiece marker WM may be formed in each shot area SA. For example, as illustrated in FIG. 16 that illustrates the plurality of workpiece markers WM formed in the plurality of shot areas SA, the workpiece marker WM may be formed at a position in each shot area SA that is same as a position at which the workpiece marker WM is formed in another shot area SA. When the marker group WMG including the plurality of workpiece markers WM is formed, the marker group WMG may be formed at a position in each shot area SA that is same as a position at which the marker group WMG is formed in another shot area SA. In this case, the control apparatus 3 may calculate the position of the processing target shot area PSA based on the position of the workpiece marker WM formed in the processing target shot area PSA. Alternatively, the control apparatus 3 may calculate the position of the processing target shot area PSA based on the position of the workpiece marker WM formed in another shot area SA that has a predetermined positional relationship relative to the processing target shot area PSA.

The workpiece marker WM may be formed on the workpiece W in advance before the processing apparatus 1 starts processing the workpiece W. Alternatively, the workpiece marker WM may be formed by the processing apparatus 1. For example, the processing apparatus 1 may form the workpiece marker WM by irradiating a first shot area SA (alternatively, a position that has the predetermined positional relationship relative to the first shot area SA) with the processing light EL before start processing the first shot area SA that has been set to be the processing target shot area PSA. In this case, the imaging apparatus 15 may capture the image of the workpiece marker WM formed in the first shot area SA (alternatively, the position that has the predetermined positional relationship relative to the first shot area SA) in a period during which the processing apparatus 1 processes the first shot area SA. The control apparatus 3 may calculate the position of the first shot area SA based on the position of the workpiece marker WM formed in the first shot area SA. Alternatively, the processing apparatus 1 may form the workpiece marker WM by irradiating a second shot area SA that is expected to be processed next to the first shot area SA (alternatively, a position that has the predetermined positional relationship relative to the second shot area SA, and for example, the first shot area SA) with the processing light EL in at least a part of a period during which the processing apparatus 1 processes the first shot area SA that has been set to be the processing target shot area PSA. In this case, the imaging apparatus 15 may capture the image of the workpiece marker WM formed in the second shot area SA (alternatively, the position that has the predetermined positional relationship relative to the second shot area SA, and for example, the first shot area) in a period during which the processing apparatus 1 processes the second shot area SA. The control apparatus 3 may calculate the position of the second shot area SA based on the position of the workpiece marker WM formed in the second shot area SA (alternatively, the position that has the predetermined positional relationship relative to the second shot area SA, and for example, the first shot area).

The position of the processing head 13 is adjusted relative to the processing target shot area PSA by the micromotion driving system 143 in a period during which the control apparatus 3 controls the micromotion driving system 143 based on the measured result by the imaging apparatus 15. Thus, the self-propelled driving system 141 and the arm driving system 142, the moving accuracy of each of which is lower than that of the micromotion driving system 143, may not move the processing head 13 in the period during which the control apparatus 3 controls the micromotion driving system 143 based on the measured result by the imaging apparatus 15.

Note that the control apparatus 3 may control the micromotion driving system 143 based on the measured result by the imaging apparatus 15 when at least one of the self-propelled driving system 141 and the arm driving system 142 moves the processing head 13 at the step S13. Namely, the imaging apparatus 15 may start capturing the image of the workpiece W (especially, the processing target shot area PSA) when at least one of the self-propelled driving system 141 and the arm driving system 142 moves the processing head 13 at the step S13. The processing apparatus 1 may start measuring the position of the workpiece W by using the imaging apparatus 15 when at least one of the self-propelled driving system 141 and the arm driving system 142 moves the processing head 13 at the step S13.

The processing apparatus 1 starts processing the processing target shot area PSA in a period during which the micromotion driving system 143 is controlled based on the measured result by the imaging apparatus 15. Specifically, the processing apparatus 1 determines the detail of the processing of the processing target shot area PSA based on the recipe information, and irradiates the processing target shot area PSA with the processing light EL so that the workpiece W is processed based on the determined processing detail (a step S15). For example, the processing apparatus 1 may irradiate the desired position in the processing target shot area PSA with the processing light EL by using the Galvano mirror 1341 so that the riblet structure based on the recipe information is formed in the processing target shot area PSA.

The control apparatus 3 controls the Galvano mirror 1341 based on the measured result by the processing head 13 and the recipe information in a period during which the processing target shot area PSA is processed (a step S16). Namely, the control apparatus 3 controls the Galvano mirror 1341 based on the measured result by the processing head 13 while controlling the micromotion driving system 143 based on the measured result by the imaging apparatus 15. Specifically, the control apparatus 3 controls the Galvano mirror 1341 based on the measured result by the processing head 13 when or after the micromotion driving system 143 moves the processing head 13 in response to the movement of the workpiece W because of the movement of the workpiece W relative to the processing head 13. However, when the processing apparatus 1 does not include the Galvano mirror 1341, the processing system SYSa may not perform the operation at the step S16.

Specifically, the control apparatus 3 may irradiate a plurality of positions in the processing target shot area PSA with the measurement light ML2 by controlling the Galvano mirror 1328 that is configured to change the irradiation position of the measurement light ML2 on the surface of the workpiece W independently from the irradiation position of the processing light EL. As a result, the control apparatus 3 may determine a shape of the processing target shot area PSA (a shape of a surface part at which the processing target shot area PSA is set on the surface of the workpiece W). note that the control apparatus 3 may irradiate a plurality of positions in a second shot area SA that is expected to be set to be the processing target shot area PSA next before a period during which a first shot area SA is set to be the processing target shot area PSA (for example, when the second shot area SA is set to be the processing target shot area PSA).

Then, the control apparatus 3 may control the Galvano mirror 1341 based on the determined shape of the processing target shot area PSA so that the desired position in the processing target shot area PSA having the determined shape is irradiated with the processing light EL. As one example, when an operation of the Galvano mirror 1341 for irradiating the processing target shot area PSA the shape of the surface of which is a planar shape with the processing light EL is same as an operation of the Galvano mirror 1341 for irradiating the processing target shot area PSA the shape of the surface of which is a curved shape with the processing light EL, there is a possibility that a characteristic of the processing light EL with which the processing target shot area PSA the shape of the surface of which is the planar shape is irradiated is different from a characteristic of the processing light EL with which the processing target shot area PSA the shape of the surface of which is the curved shape is irradiated. For example, there is a possibility that a fluence of the processing light EL with which the processing target shot area PSA the shape of the surface of which is the planar shape is irradiated is different from a fluence of the processing light EL with which the processing target shot area PSA the shape of the surface of which is the curved shape is irradiated. Thus, the control apparatus 3 may control an irradiation aspect of the processing light EL in the processing target shot area PSA by controlling the Galvano mirror 1341 so that the processing target shot area PSA is processed based on the detail of the processing indicated by the recipe information regardless of the difference of the shape of the surface of the processing target shot area PSA. For example, the control apparatus 3 may control the Galvano mirror 1341 so that the processing target shot area PSA is processed based on the detail of the processing indicated by the recipe information regardless of the difference of the shape of the surface of the processing target shot area PSA. For example, the control apparatus 3 may control the Galvano mirror 1341 to control at least one of the moving direction, the moving distance and the moving speed of the condensed position of the processing light EL along at least one of the X-axis direction and the Y-axis direction of the head coordinate system.

The Galvano mirror 1341 may be an optical system that is configured to move the condensed position of the processing light EL along the Z-axis direction of the head coordinate system (namely, the propagating direction of the processing light EL) in addition to or instead of moving the condensed position of the processing light EL along at least one of the X-axis direction and the Y-axis direction of the head coordinate system. The condensed position along the Z-axis direction of the head coordinate system may be referred to as a focal position. Thus, the Galvano mirror 1341 may be referred to as a focal position change apparatus. Namely, the Galvano mirror 1341 may be an optical system that is configured to a relative positional relationship between the condensed position of the processing light EL and the surface of the workpiece W along the Z-axis of the head coordinate system. In this case, the control apparatus 3 may control the Galvano mirror 1341 so that the processing target shot area PSA is processed based on the detail of the processing indicated by the recipe information regardless of the difference of the shape of the surface of the processing target shot area PSA. For example, the control apparatus 3 may control the Galvano mirror 1341 to control at least one of the moving direction, the moving distance and the moving speed of the condensed position of the processing light EL along the Z-axis direction of the head coordinate system. The control apparatus 3 may control the Galvano mirror 1341 so that the condensed position of the processing light EL is set on or near the surface of the processing target shot area PSA regardless of the difference of the shape of the surface of the processing target shot area PSA.

Incidentally, the above-described condensed position adjustment optical system 1313 is an optical system that is configured to move the condensed position (the focal position) of the processing light EL along the Z-axis direction of the head coordinate system (namely, the propagating direction of the processing light EL). Therefore, the control apparatus 3 may control the condensed position adjustment optical system 1313 in addition to or instead of the Galvano mirror 1341, based on the measured result by the measurement light ML2 by the processing head 13.

After starting the processing of the processing target shot area PSA, the control apparatus 3 determines whether or not the processing of the processing target shot area PSA is complete (a step S17). As a result of the determination at the step S17, when it is determined that the processing of the processing target shot area PSA is not yet complete (the step S17: No), the processing system SYSa repeats the operations from the step S14 to the step S17. In other words, the processing system SYSa continues the processing of the processing target shot area PSA.

On the other hand, As a result of the determination at the step S17, when it is determined that the processing of the processing target shot area PSA is complete (the step S17: Yes), the control apparatus 3 determines whether or not other shot area SA is newly processed (a step S18). In other words, the control apparatus 3 determines whether or not to start the processing the new processing target shot area PSA after setting other shot area SA to be the new processing target shot area PSA (a step S18). For example, when the processing of at least one of the plurality of shot areas SA set on the workpiece W is not yet complete, the control apparatus 3 may determine that at least one shot area SA that has not yet been processed is to be newly processed. For example, when the processing of all of the plurality of shot areas SA set on the workpiece W have been complete, the control apparatus 3 may determine that other shot areas SA does not need to be processed anew.

As a result of the determination at the step S18, when it is determined that other shot areas SA is to be processed anew (the step S18: Yes), the processing system SYSa repeats the operations from the step S11 to the step S18. In other words, the processing system SYSa sets other shot area SA to be the new processing target shot area PSA, and then processes the new processing target shot area PSA. On the other hand, as a result of the determination at the step S18 when it is determined that other shot area SA is not to be newly processed (the step S18: No), the processing system SYSa may terminate the processing operation illustrated in FIG. 12.

(1-6) Technical Effect of Processing SYSa

The above-described processing system SYSa is capable of properly processing the workpiece W by using the processing light EL. Furthermore, the processing system SYSa is capable of measuring the position of the workpiece W by using at least one of the imaging apparatus 15, the processing head 13 and the measurement apparatus 2. Furthermore, the processing system SYSa is capable of measuring the position of the processing head 13 by using the measurement apparatus 2. Thus, the processing system SYSa is capable of determining the relative position relationship between the processing head 13 and the workpiece W with high accuracy, and adjusting the position of the processing head 13 relative to the workpiece W with high accuracy. As a result, the processing system SYSa is capable of processing the workpiece W with high accuracy.

In addition, the processing system SYSa capable of measuring the position of at least one of the workpiece W and the processing head 13 by using at least one of the imaging apparatus 15, the processing head 13 and the measurement apparatus 2 that are configured serve as three measurement apparatuses using different measurement methods. Thus, the processing system SYSa is capable of measuring the position of the object, which is difficult to be measured by a measurement apparatus using a first measurement method, by using a measurement apparatus using a second measurement method different from the first measurement method. Thus, the processing system SYSa is capable of measuring the position of at least one of the workpiece W and the processing head 13 more accurately, compared to a processing system in a comparison example that does not include a plurality of measurement apparatuses using different measurement methods.

(2) Processing System SYSb in Second Example Embodiment

Figure 17:
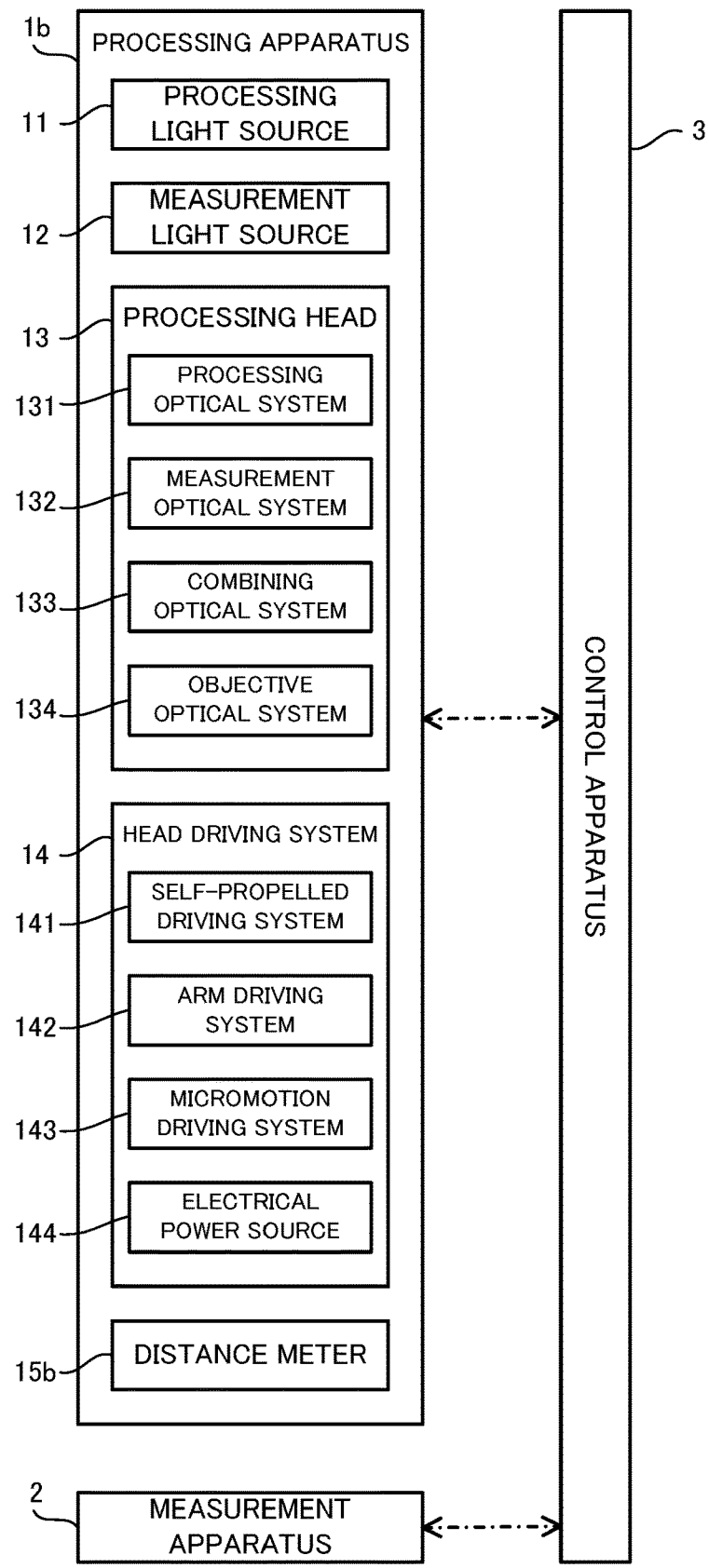
FIG. 17 is a system configuration diagram that illustrates one example of a system configuration of a processing system in a second example embodiment.

Next, with reference to FIG. 17, a processing system SYS in a second example embodiment (in the below-described description, the processing system SYS in the second example embodiment is referred to as a "processing system SYSb") will be described. FIG. 17 is a system configuration diagram that illustrates a system configuration of the processing system SYSb in the second example embodiment.

As illustrated in FIG. 17, the processing system SYSb in the second example embodiment is different from the above-described processing system SYSa in the first example embodiment in that it includes a processing apparatus 1*b* instead of the processing apparatus 1. Other feature of the processing system SYSb may be same as other feature of the processing system SYSa. The processing apparatus 1*b* is different from the processing apparatus 1 in that it includes a distance meter 15*b* instead of the imaging apparatus 15. Other feature of the processing apparatus 1*b* may be same as other feature of the processing apparatus 1.

The distance meter 15*b* is different from the imaging apparatus 15 that measures the position of the workpiece W by capturing the image of the workpiece W in that it measures the position of the workpiece W by irradiating a metering light such as a laser light with the workpiece W and detecting the metering from the workpiece W. In this case, the distance meter 15*b* irradiates the workpiece W with the metering light not through each optical system (especially, at least the fθ lens 1342) of the processing head 13. Furthermore, the distance meter 15*b* detects the metering light from the workpiece W not through each optical system (especially, at least the fθ lens 1342) of the processing head 13. Thus, the distance meter 15*b* may serve as a measurement apparatus that measures the position of the workpiece W not through each optical system (especially, at least the fθ lens 1342) of the processing head 13. Other feature of the distance meter 15*b* may be same as other feature of the imaging apparatus 15.

The distance meter 15*b* may serve as a measurement apparatus that measures the position of the workpiece W (especially, the position of the irradiated part that is irradiated with the metering light) along an irradiation direction of the metering light (for example, the Z-axis direction in the head coordinate system), as with the above-described processing head 13 that emits the measurement light ML2. Furthermore, the distance meter 15*b* may irradiate a plurality of parts of the workpiece W with the metering light. In this case, the distance meter 15*b* may serve as a measurement apparatus that measures the shape of the workpiece W, as with the above-described processing head 13 that emits the measurement light ML2.

A measured result by the distance meter 15*b* may be used for a usage that is same as a usage of the measured result by the imaging apparatus 15. For example, the control apparatus 3 may control the micromotion driving system 143 based on the measured result by the distance meter 15*b* (see the step S14 in FIG. 12).

The distance meter 15*b* is disposed at (namely, attached to or fixed to) the processing head 13, as with the imaging apparatus 15. Namely, a disposed aspect of the distance meter 15*b* may be same as a disposed aspect of the imaging apparatus 15. Thus, the distance meter 15*b* moves along with the movement of the processing head 13.

Note that a TOF (Time Of Flight) sensor is one example of the distance meter 15*b*. moreover, when the processing system SYSb includes the distance meter 15*b* in addition to the imaging apparatus 15, the processing system SYSb may measure the position of the processing head 13 by using a RGB-D sensor (namely, a sensor that is configured to measure a depth).

The processing system SYSb in the second example embodiment described above is capable of achieving an effect that is same as the effect achievable by the processing system SYSa in the first example embodiment described above.

(3) Processing System SYSc in Third Example Embodiment

Figure 18:
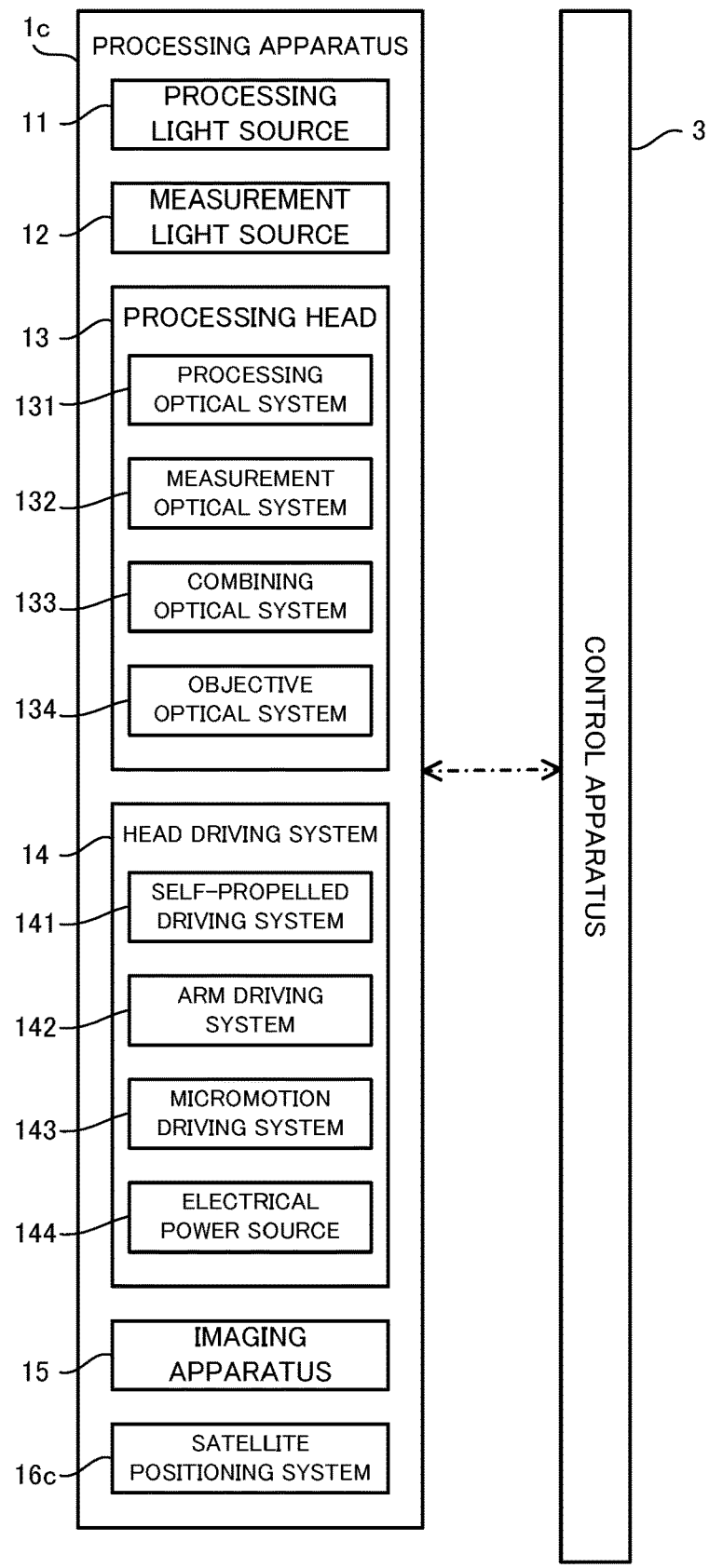
FIG. 18 is a system configuration diagram that illustrates one example of a system configuration of a processing system in a third example embodiment.

Next, with reference to FIG. 18, a processing system SYS in a third example embodiment (in the below-described description, the processing system SYS in the third example embodiment is referred to as a "processing system SYSc") will be described. FIG. 18 is a system configuration diagram that illustrates a system configuration of the processing system SYSc in the third example embodiment.

As illustrated in FIG. 18, the processing system SYSc in the third example embodiment is different from the above-described processing system SYSa in the first example embodiment in that it includes a processing apparatus 1*c* instead of the processing apparatus 1. Furthermore, the processing system SYSc is different from the processing system SYSa in that it may not include the measurement apparatus 2. However, the processing system SYSc may include the measurement apparatus 2. Other feature of the processing system SYSc may be same as other feature of the processing system SYSa. The processing apparatus 1*c* is different from the processing apparatus 1 in that it includes a satellite positioning apparatus 16*c*. Other feature of the processing apparatus 1*c* may be same as other feature of the processing apparatus 1.

The satellite positioning apparatus 16*c* is same as the above-described measurement apparatus 2 in that it is configured to measure the position of at least one of the processing head 13 and the workpiece W. However, a method of measuring the position of at least one of the processing head 13 and the workpiece W by the satellite positioning apparatus 16*c* is different from a method of measuring the position of at least one of the processing head 13 and the workpiece W by the measurement apparatus 2. Specifically, the satellite positioning apparatus 16*c* measures the position of at least one of the processing head 13 and the workpiece W by using a satellite positioning system such as a GPS (Global Positioning System) and the like. Thus, the satellite positioning apparatus 16*c* may include a reception apparatus that is disposed at a position fixed to at least one of the processing head 13 and the workpiece W (namely, a position that has an invariable positional relationship relative to at least one of the processing head 13 and the workpiece W) and that is configured to receive a signal from a satellite included in the satellite positioning system. A received result by the reception apparatus (namely, a measured result by the satellite positioning apparatus 16*c*) is outputted to the control apparatus 3. The control apparatus 3 calculates, based on the received result by the reception apparatus, the position of at least one of the processing head 13 and the workpiece W at which the reception apparatus is disposed. Note that the processing system SYSc may include a local positioning apparatus in addition to or instead of the satellite positioning apparatus 16*c*. Namely, the processing system SYSc may measure the position of at least one of the processing head 13 and the workpiece W by using the local positioning apparatus in addition to or instead of the satellite positioning apparatus 16*c*.

The processing system SYSc in the third example embodiment described above is capable of achieving an effect that is same as the effect achievable by the processing system SYSa in the first example embodiment described above.

Note that the processing system SYSb in the second example embodiment described above may include a feature that is unique to the processing system SYSc in the third example embodiment. The feature that is unique to the processing system SYSc in the third example embodiment may include a feature related to the satellite positioning apparatus 16*c*.

(4) Processing System SYSd in Fourth Example Embodiment

Figure 19:
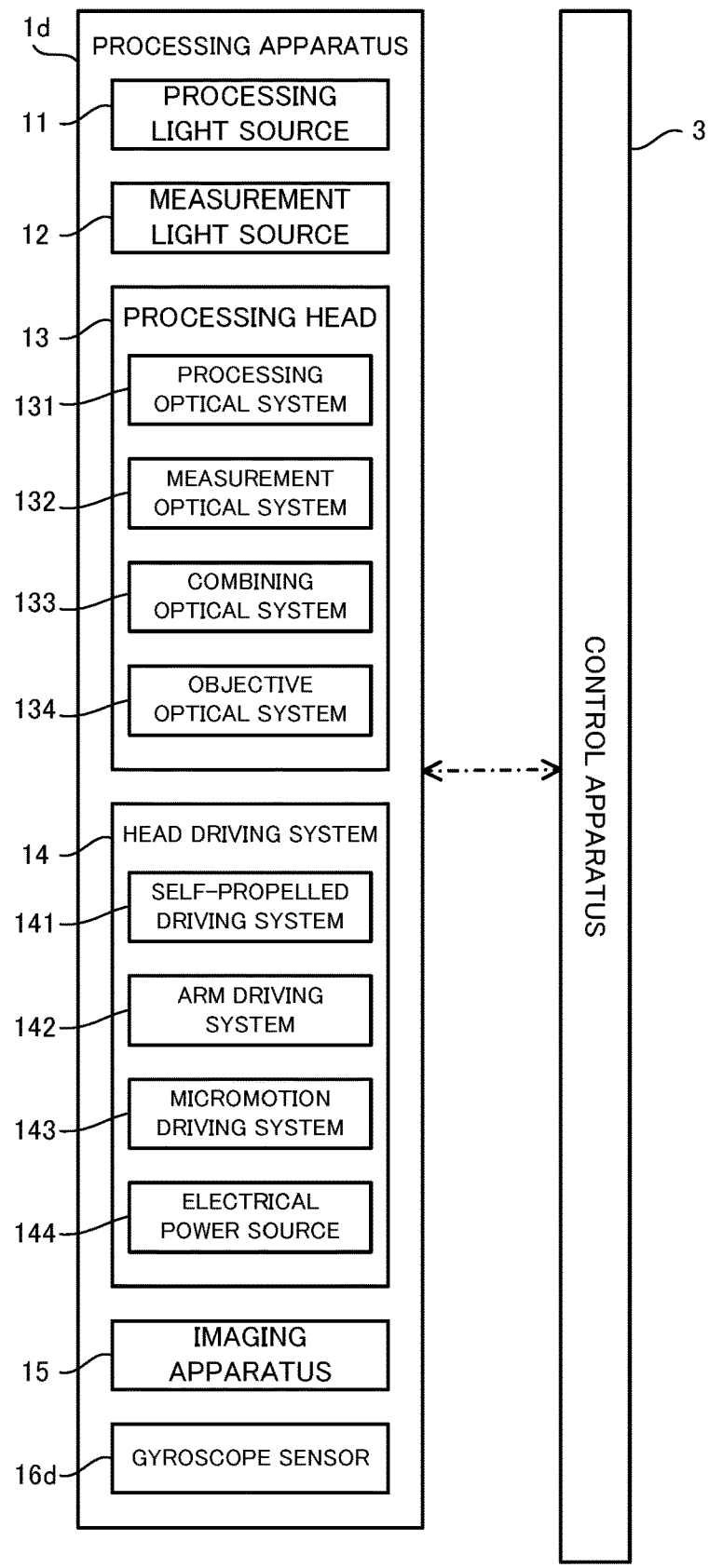
FIG. 19 is a system configuration diagram that illustrates one example of a system configuration of a processing system in a fourth example embodiment.

Next, with reference to FIG. 19, a processing system SYS in a fourth example embodiment (in the below-described description, the processing system SYS in the fourth example embodiment is referred to as a "processing system SYSd") will be described. FIG. 19 is a system configuration diagram that illustrates a system configuration of the processing system SYSd in the fourth example embodiment.

As illustrated in FIG. 19, the processing system SYSd in the fourth example embodiment is different from the above-described processing system SYSa in the first example embodiment in that it includes a processing apparatus 1*d* instead of the processing apparatus 1. Furthermore, the processing system SYSd is different from the processing system SYSa in that it may not include the measurement apparatus 2. However, the processing system SYSd may include the measurement apparatus 2. Other feature of the processing system SYSd may be same as other feature of the processing system SYSa. The processing apparatus 1*d* is different from the processing apparatus 1 in that it includes a gyroscope sensor 16*d*. Other feature of the processing apparatus 1*d* may be same as other feature of the processing apparatus 1.

The gyroscope sensor 16*d* is an angular velocity detection apparatus that is configured to detect an angular velocity of the processing head 13. Thus, the gyroscope sensor 16*d* may be disposed at the processing head 13. The angular velocity of the processing head 13 detected by the gyroscope sensor 16*d* is outputted to the control apparatus 3. The control apparatus 3 may calculate the position of the processing head 13 based on the angular velocity of the processing head 13. For example, the control apparatus 3 may calculate a moving distance of the processing head 13 by integrating the angular velocity of the processing head 13 and calculate the position of the processing head 13 based on the moving distance of the processing head 13. More specifically, thus, the gyroscope sensor 16*d* may be regarded to serve as a measurement apparatus that is configured to measure the position of the processing head 13.

The processing system SYSd may include the gyroscope sensor 16d that is configured to detect an angular velocity of the workpiece W in addition to or instead of the gyroscope sensor 16d that is configured to detect an angular velocity of the processing head 13. The gyroscope sensor 16d that is configured to detect an angular velocity of the workpiece W may be disposed at the workpiece W. The angular velocity of the workpiece W detected by the gyroscope sensor 16d is outputted to the control apparatus 3. The control apparatus 3 may calculate the position of the workpiece W based on the angular velocity of the workpiece W. For example, the control apparatus 3 may calculate a moving distance of the workpiece W by integrating the angular velocity of the workpiece W and calculate the position of the workpiece W based on the moving distance of the workpiece W. More specifically, thus, the gyroscope sensor 16d may be regarded to serve as a measurement apparatus that is configured to measure the position of the workpiece W.

The processing system SYSd in the fourth example embodiment described above is capable of achieving an effect that is same as the effect achievable by the processing system SYSa in the first example embodiment described above.

Note that at least one of the processing system SYSb in the second example embodiment to the processing system SYSc in the third example embodiment described above may include a feature that is unique to the processing system SYSd in the fourth example embodiment. The feature that is unique to the processing system SYSd in the fourth example embodiment may include a feature related to the gyroscope sensor 16d.

(5) Processing System SYSe in Fifth Example Embodiment

Figure 20:
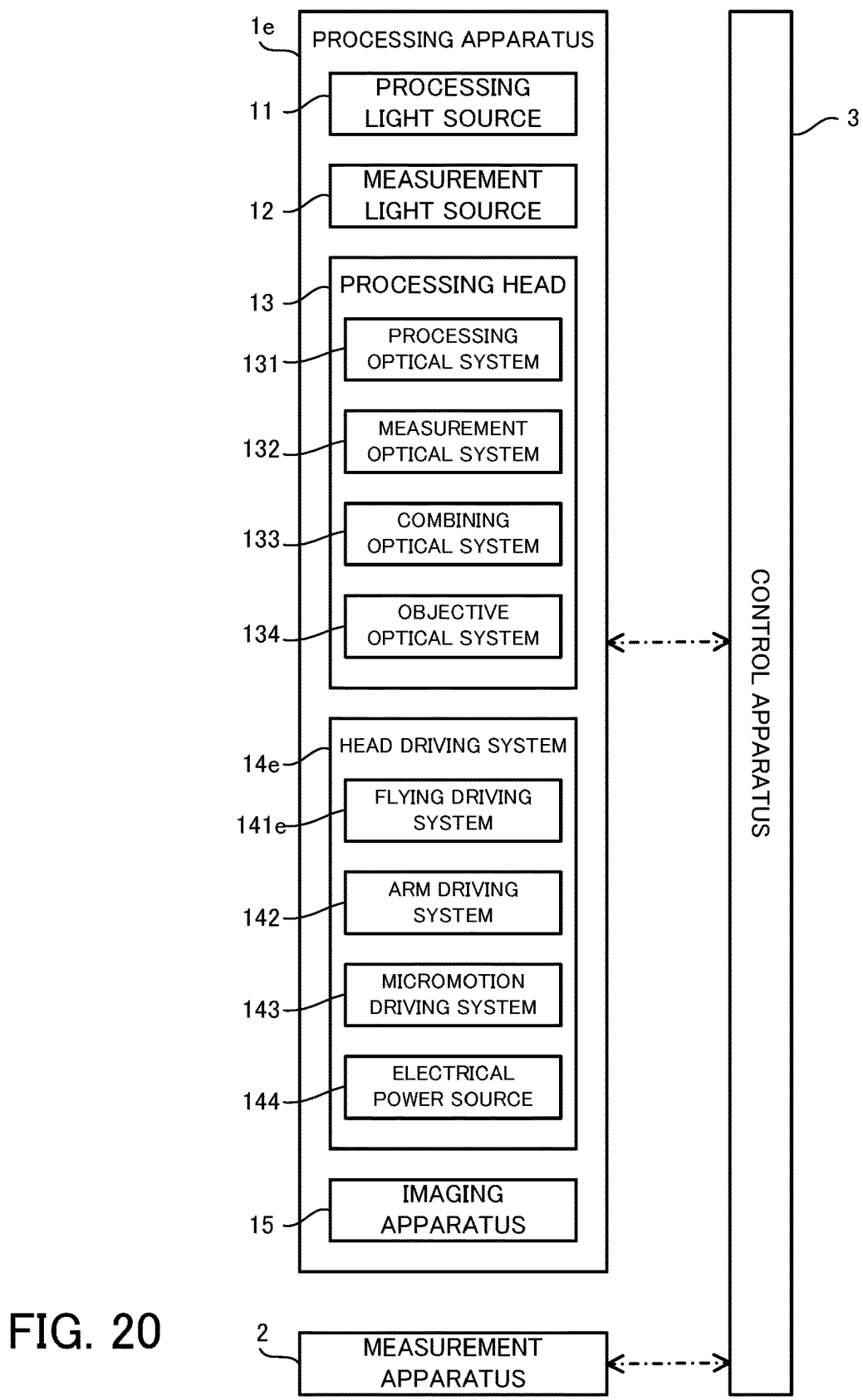
FIG. 20 is a system configuration diagram that illustrates one example of a system configuration of a processing system in a fifth example embodiment.
Figure 21:
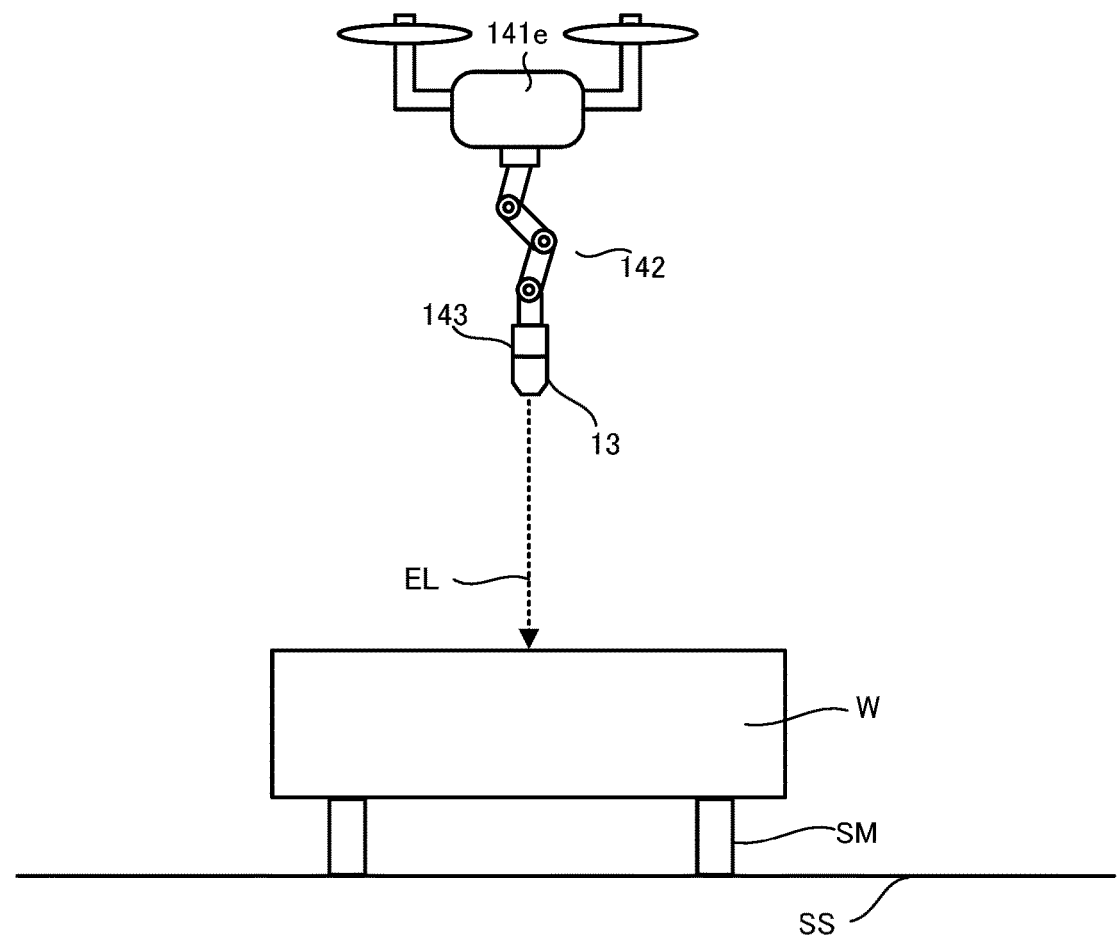
FIG. 21 is a front elevation view that illustrates an exterior appearance of the processing system in the fifth example embodiment.

Next, with reference to FIG. 20 and FIG. 21, a processing system SYS in a fifth example embodiment (in the below-described description, the processing system SYS in the fifth example embodiment is referred to as a "processing system SYSe") will be described. FIG. 20 is a system configuration diagram that illustrates a system configuration of the processing system SYSe in the fifth example embodiment. FIG. 21 is a front elevation view that illustrates an exterior appearance of the processing system SYSe in the fifth example embodiment.

As illustrated in FIG. 20 and FIG. 21, the processing system SYSe in the fifth example embodiment is different from the above-described processing system SYSa in the first example embodiment in that it includes a processing apparatus 1e instead of the processing apparatus 1. Other feature of the processing system SYSe may be same as other feature of the processing system SYSa. The processing apparatus 1e is different from the processing apparatus 1 in that it includes a head driving system 14e instead of the head driving system 14. Other feature of the processing apparatus 1e may be same as other feature of the processing apparatus 1. The head driving system 14e is different from the head driving system 14 in that it includes a flying driving system 141e instead of the self-propelled driving system 141. Other feature of the head driving system 14e may be same as other feature of the head driving system 14.

The flying driving system 141e is different from the self-propelled driving system 141 that is configured to move by itself on the support surface SS in that it is configured to fly at a position that is away from the support surface SS. Namely, the flying driving system 141e is different from the self-propelled driving system 141 that moves the processing head 13 by moving by itself on the support surface SS in that it moves the processing head 13 by flying at the position that is away from the support surface SS. Note that the position that is away from the support surface SS may mean at least one of a position that is different from a position at which the support surface SS exists and a position satisfying that there is a space between the position and the support surface SS. Moreover, a state where the flying driving system 141e flies may mean a state where the flying driving system 141e flies in the air. Other feature of the flying driving system 141e may be same as other feature of the self-propelled driving system 141.

The processing system SYSe in the fifth example embodiment described above is capable of achieving an effect that is same as the effect achievable by the processing system SYSa in the first example embodiment described above.

Note that at least one of the processing system SYSb in the second example embodiment to the processing system SYSd in the fourth example embodiment described above may include a feature that is unique to the processing system SYSe in the fifth example embodiment. The feature that is unique to the processing system SYSe in the fifth example embodiment may include a feature related to the flying driving system 141e.

(6) Processing System SYSf in Sixth Example Embodiment

Figure 22:
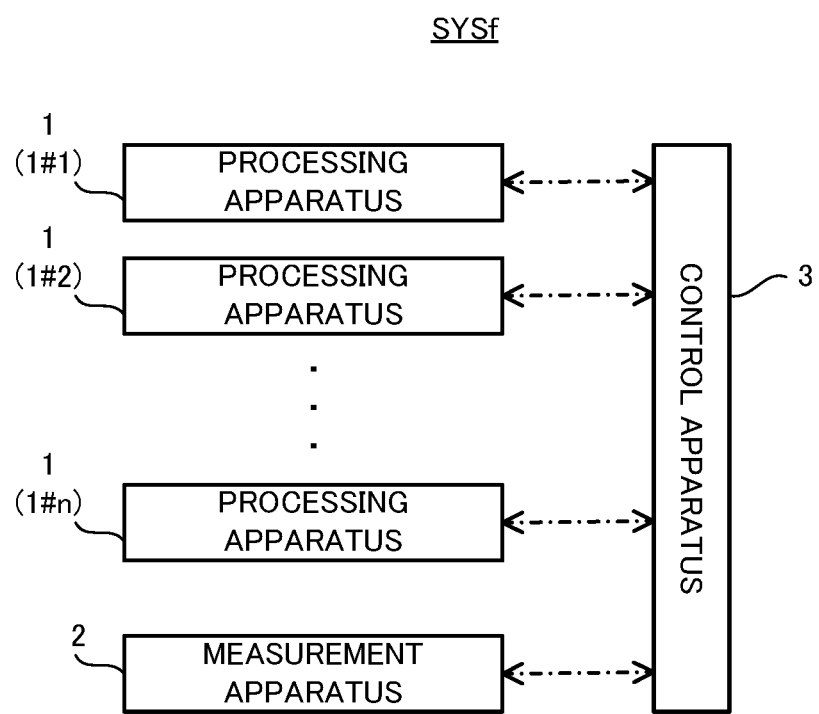
FIG. 22 is a system configuration diagram that illustrates one example of a system configuration of a processing system in the sixth example embodiment.

Next, with reference to FIG. 22, a processing system SYS in a sixth example embodiment (in the below-described description, the processing system SYS in the sixth example embodiment is referred to as a "processing system SYSf") will be described. FIG. 22 is a system configuration diagram that illustrates a system configuration of the processing system SYSf in the sixth example embodiment.

As illustrated in FIG. 22, the processing system SYSf in the sixth example embodiment is different from the above-described processing system SYSa in the first example embodiment in that it includes a plurality of processing apparatuses 1. In an example illustrated in FIG. 22, the processing system SYSf includes n (note that n is an integer that is equal to or larger than 2) number of processing apparatuses 1 (specifically, a processing apparatus 1 #1 to a processing apparatus 1 #n). Other feature of the processing system SYSf may be same as other feature of the processing system SYSa.

Each of the plurality of processing apparatuses 1 corresponds to the above-described processing apparatus 1. Thus, each processing apparatus 1 #k (note that k is a variable number representing an integer that is equal to or larger than 1 and that is equal to or smaller than n) includes the processing light source 11, the measurement light source 12, the processing head 13, the head driving system 14 (namely, the self-propelled driving system 141, the arm driving system 142 and the micromotion driving system 143) and the imaging apparatus 15. Note that a label "#k" is added to an end of the reference numbers of the component of the processing apparatus 1 #k and the component unique to the processing apparatus 1 #k.

Figure 23:
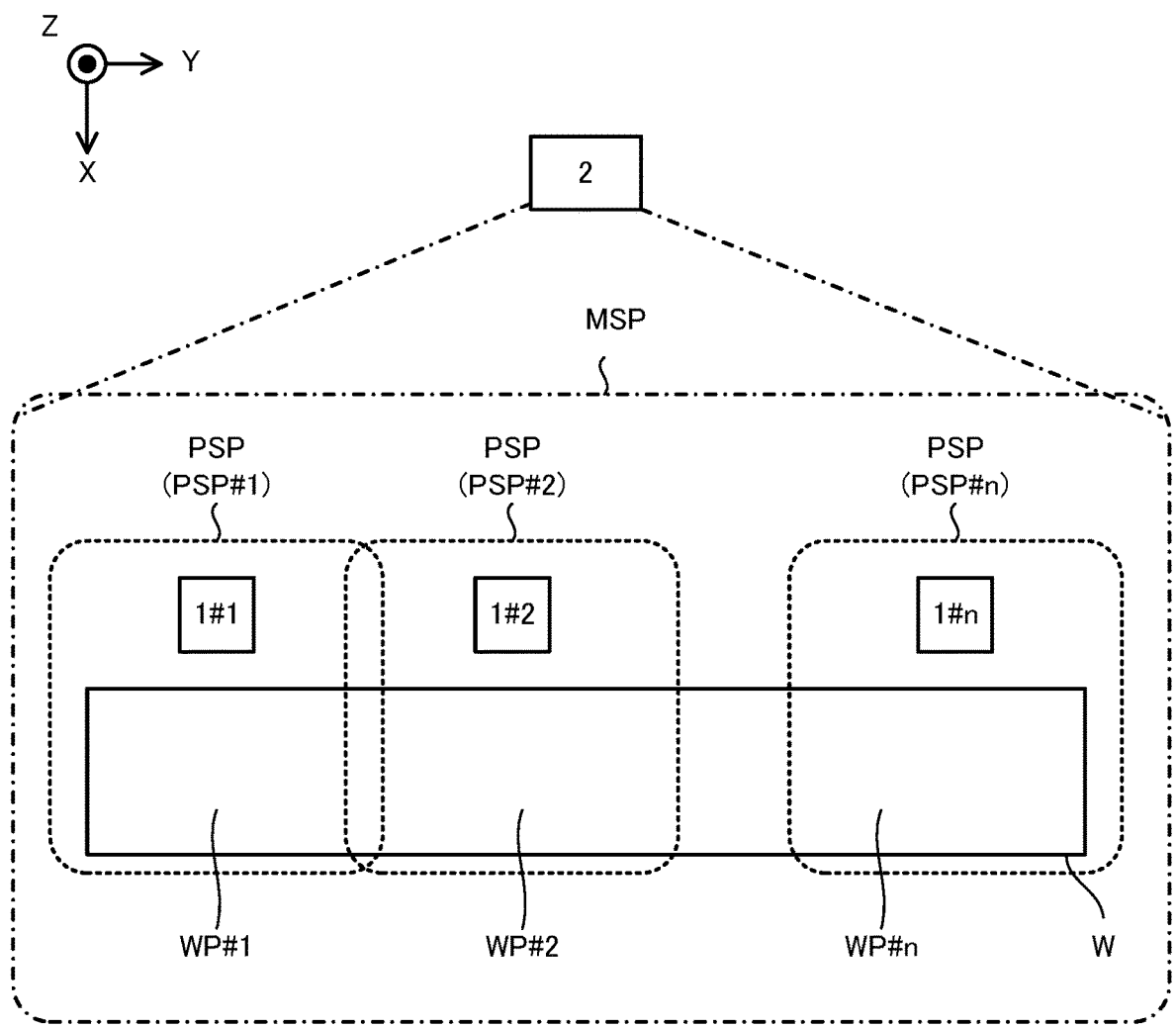
FIG. 23 is a planar view that illustrates disposed positions of a plurality of processing apparatuses of the processing system in the sixth example embodiment.

The plurality of processing apparatuses 1 are disposed in a plurality of different processing spaces PSP, respectively. As illustrated in FIG. 23 that is a planar view illustrating disposed positions of the plurality of processing apparatuses 1, the processing apparatus 1 #1 may be disposed in the processing space PSP #1, the processing apparatus 1 #2 may be disposed in the processing space PSP #2, . . . , and the processing apparatus 1 #n may be disposed in the processing space PSP #n. The head driving system 14 #k may move the processing head 13 #k in the processing space PSP #k. On the other hand, the head driving system 14 #k may move the processing head 13 #k so that the processing head 13 #k does not move (furthermore, the processing apparatus 1 #k does not move) outside the processing space PSP #k. The processing apparatus 1 #k processes a part of the workpiece W that is included in the processing space PSP #k. Namely, the processing apparatus 1 #k irradiates an area of the surface of the workpiece W that is included in the processing space PSP #k with the processing light EL to process this area. Specifically, as illustrated in FIG. 23, the processing apparatus 1 #1 processes an area WP #1 of the surface of the workpiece W that is included in the processing space PSP #1, the processing apparatus 1 #2 processes an area WP #2 of the surface of the workpiece W that is included in the processing space PSP #2, . . . , and the processing apparatus 1 #n processes an area WP #n of the surface of the workpiece W that is included in the processing space PSP #n, The processing space PSP #k may not overlap with the processing space PSP #m (note that m is a variable number representing an integer that is equal to or larger than 1, that is equal to or smaller than n and that is different from the variable number k) that is different from the processing space PSP #k. Alternatively, the processing space PSP #k may overlap with the processing space PSP #m at least partially. In the example illustrated in FIG. 23, the processing space PSP #1 overlaps with the processing space PSP #2 partially.

The measurement apparatus 2 measures the positions of the plurality of processing heads 13 which the plurality of processing apparatuses 1 include, respectively. Namely, the measurement apparatus 2 (i) measures the position of the processing head 13 #1 of the processing apparatus 1 #1 by irradiating the processing apparatus 1 #1 with the measurement light ML3, (ii) measures the position of the processing head 13 #2 of the processing apparatus 1 #2 by irradiating the processing apparatus 1 #2 with the measurement light ML3, . . . , and (n) measures the position of the processing head 13 #n of the processing apparatus 1 #n by irradiating the processing apparatus 1 #n with the measurement light ML3. Thus, a measurement space MSP of the measurement apparatus 2 may include the plurality of processing spaces PSP #1 to PSP #n. Note that the measurement space MSP may mean a space in which the position of the object existing therein is measurable by the measurement apparatus 2.

The control apparatus 3 controls each of the plurality of processing apparatuses 1. The control apparatus 3 may use the measured result of the position of the workpiece W by the imaging apparatus 15 #k, the measured result of the position of the workpiece W by the processing head 13 #k and the measured result of the position of the processing head 13 #k by the measurement apparatus 2 in order to control the processing apparatus 1 #k. For example, at the step S13 in FIG. 12, the control apparatus 3 may control the self-propelled driving system 141 #1 and the arm driving system 142 #k based on the measured result of the position of the processing head 13 #k by the measurement apparatus 2 so that the processing head 13 #k moves to the processing target shot area PSA that should be processed by the processing apparatus 1 #k (hereinafter, it is referred to as a processing target shot area PSA #k). In this case, the control apparatus 3 may control the head driving system 14 #k (especially, the self-propelled driving system 141 #k and the arm driving system 142 #k) and the head driving system 14 #m (especially, the self-propelled driving system 141 #m and the arm driving system 142 #m) so that the processing apparatus 1 #k does not collide with another processing apparatus 1 #m. Especially, when the processing space PSP #k overlaps with the processing space PSP #m at least partially, the control apparatus 3 may control the head driving systems 14 #k and 14 #m so that the processing apparatus 1 #k does not collide with another processing apparatus 1 #m. For example, at the step S14 in FIG. 12, the control apparatus 3 may control the micromotion driving system 143 #k based on the measured result by the imaging apparatus 15 #k so that the relative positional relationship between the processing target shot area PSA #k and the processing head 13 #k (especially, the f0 lens 1342 #k). For example, at the step S14 in FIG. 12, the control apparatus 3 may control the Galvano mirror 1341 #k based on the measured result by the processing head 13 #k.

The control apparatus 3 may control the plurality of processing apparatuses 1 so that the plurality of processing apparatuses 1 process the workpiece W at the same time. The control apparatus 3 may control the plurality of processing apparatuses 1 so that at least two of the plurality of processing apparatuses 1 process the workpiece W at the same time. The control apparatus 3 may control the plurality of processing apparatuses 1 so that at least one of the plurality of processing apparatuses 1 processes the workpiece W and at least another one of the plurality of processing apparatuses 1 does not process the workpiece W.

The processing system SYSf in the sixth example embodiment described above is capable of achieving an effect that is same as the effect achievable by the processing system SYSa in the first example embodiment described above. Especially, when at least two processing apparatuses process the workpiece W simultaneously, a through-put related to the processing of the workpiece W improves.

Note that at least one of the processing system SYSb in the second example embodiment to the processing system SYSe in the fifth example embodiment described above may include a feature that is unique to the processing system SYSf in the sixth example embodiment. The feature that is unique to the processing system SYSf in the sixth example embodiment may include a feature related to the plurality of processing apparatuses 1.

(7) Processing System SYSg in Seventh Example Embodiment

Figure 24:
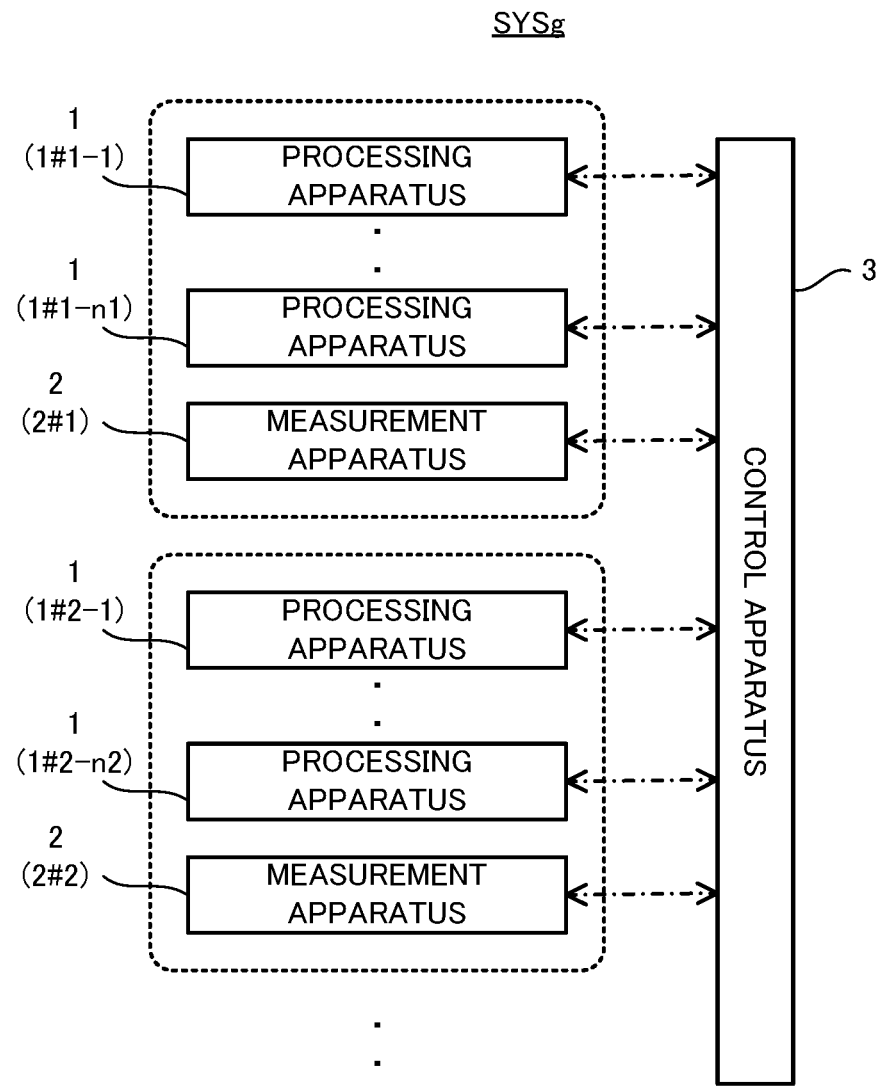
FIG. 24 is a system configuration diagram that illustrates one example of a system configuration of a processing system in the seventh example embodiment.

Next, with reference to FIG. 24, a processing system SYS in a seventh example embodiment (in the below-described description, the processing system SYS in the seventh example embodiment is referred to as a "processing system SYSg") will be described. FIG. 24 is a system configuration diagram that illustrates a system configuration of the processing system SYSg in the seventh example embodiment.

As illustrated in FIG. 24, the processing system SYSg in the seventh example embodiment is different from the above-described processing system SYSf in the sixth example embodiment in that it includes a plurality of measurement apparatuses 2. In an example illustrated in FIG. 24, the processing system SYSg includes two measurement apparatuses 2 (specifically, a measurement apparatus 2 #1 and a measurement apparatus 2 #2). However, the processing system SYSg may include three or more measurement apparatuses 2. Other feature of the processing system SYSf may be same as other feature of the processing system SYSa.

Figure 25:
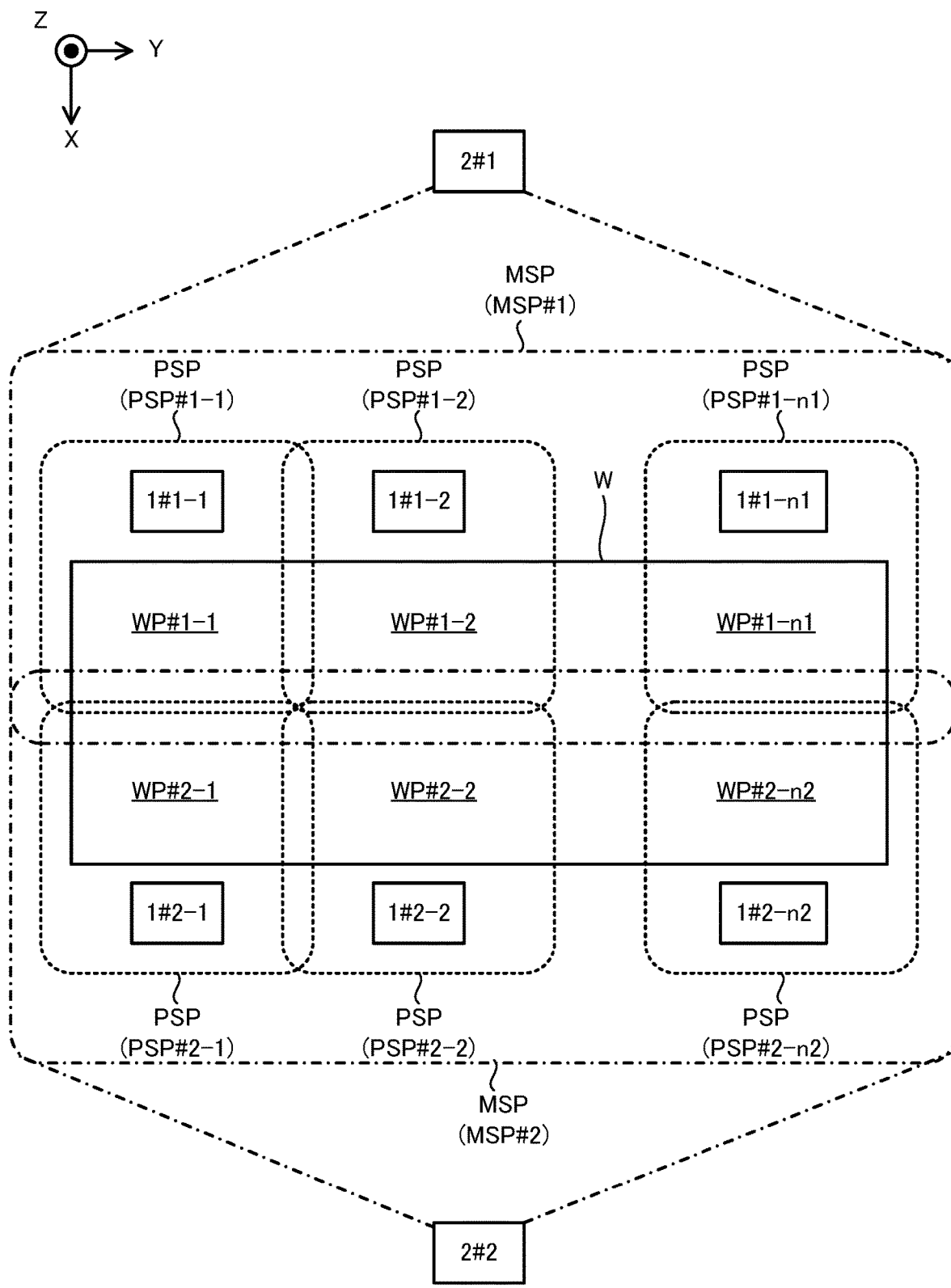
FIG. 25 is a planar view that illustrates disposed positions of a plurality of processing apparatuses of the processing system in the seventh example embodiment.

Each measurement apparatus 2 measures the position of at least one processing head 13 existing in the measurement space MSP of each measurement apparatus 2. For example, as illustrated in FIG. 25 that is a planar view illustrating disposed positions of the plurality of measurement apparatuses 2, the measurement apparatus 2 #1 measures the position of at least one processing head 13 existing in the measurement space MSP #1 of the measurement apparatus 2 #1. On the other hand, the measurement apparatus 2 #2 measures the position of at least one processing head 13 existing in the measurement space MSP #2 of the measurement apparatus 2 #2. In an example illustrated in FIG. 25, n1 (note that n1 is an integer that is equal to or larger than 1) number of processing apparatus 1 (specifically, the processing apparatus 1 #1-1 to the processing apparatus 1 #1-$n$1) exists in the measurement space MSP #1. Thus, the measurement apparatus 2 #1 measures the position of each of the processing head 13 #1-1 to the processing head 13 #1-$n$1 which the processing apparatus 1 #1-1 to the processing apparatus 1 #1-$n$1 include, respectively. Moreover, in the example illustrated in FIG. 25, n2 (note that n2 is an integer that is equal to or larger than 1) number of processing apparatus 1 (specifically, the processing apparatus 1 #2-1 to the processing apparatus 1 #2-$n$2) exists in the measurement space MSP #2. Thus, the measurement apparatus 2 #2 measures the position of each of the processing head 13 #2-1 to the processing head 13 #2-$n$2 which the processing apparatus 1 #2-1 to the processing apparatus 1 #2-$n$2 include, respectively.

One measurement space MSP may not overlap with another measurement space MSP that is different from the one measurement space MSP. Alternatively, one measurement space MSP may overlap with another measurement space MSP at least partially. In the example illustrated in FIG. 25, the measurement space MSP #1 overlaps with another measurement space MSP #2 at least partially.

The processing apparatus 1 #1-1 to the processing apparatus 1 #1-$n$1 are respectively disposed in a plurality of different processing spaces PSP included in the measurement space MSP #1. Specifically, as illustrated in FIG. 25, the processing apparatus 1 #1-1 may be disposed in the processing space PSP #1-1, the processing apparatus 1 #1-2 may be disposed in the processing space PSP #1-2, . . . , and the processing apparatus 1 #1-$n$1 may be disposed in the processing space PSP #1-$n$1. In this case, the processing apparatus 1 #1-1 processes a part WP #1-1 of the workpiece W that is included in the processing space PSP #1-1, the processing apparatus 1 #1-2 processes a part WP #1-2 of the workpiece W that is included in the processing space PSP #1-2, . . . , and the processing apparatus 1 #1-$n$1 processes a part WP #1-$n$1 of the workpiece W that is included in the processing space PSP #1-$n$1.

Similarly, the processing apparatus 1 #2-1 to the processing apparatus 1 #2-$n$2 are respectively disposed in a plurality of different processing spaces PSP included in the measurement space MSP #2. Specifically, as illustrated in FIG. 25, the processing apparatus 1 #2-1 may be disposed in the processing space PSP #2-1, the processing apparatus 1 #2-2 may be disposed in the processing space PSP #2-2, . . . , and the processing apparatus 1 #2-$n$2 may be disposed in the processing space PSP #2-$n$2. In this case, the processing apparatus 1 #2-1 processes a part WP #2-1 of the workpiece W that is included in the processing space PSP #2-1, the processing apparatus 1 #2-2 processes a part WP #2-2 of the workpiece W that is included in the processing space PSP #2-2, . . . , and the processing apparatus 1 #2-$n$2 processes a part WP #2-$n$2 of the workpiece W that is included in the processing space PSP #2-$n$2.

The control apparatus 3 controls each of the plurality of processing apparatuses 1. The control apparatus 3 may use at least the measured result of the position of the workpiece W by the imaging apparatus 15 #1-$k$1 of the processing apparatus 1 #1-$k$1, the measured result of the position of the workpiece W by the processing head 13 #1-$k$1 of the processing apparatus 1 #1-$k$1 and the measured result of the position of the processing head 13 #1-$k$1 of the processing apparatus 1 #1-$k$1 by the measurement apparatus 2 #1 in order to control the processing apparatus 1 #1-$k$1 (note that k1 is a variable number representing an integer that is equal to or larger than 1 and that is equal to or smaller than n1). On the other hand, the control apparatus 3 may use at least the measured result of the position of the workpiece W by the imaging apparatus 15 #2-$k$2 of the processing apparatus 1 #2-$k$2, the measured result of the position of the workpiece W by the processing head 13 #2-$k$2 of the processing apparatus 1 #2-$k$2 and the measured result of the position of the processing head 13 #2-$k$2 of the processing apparatus 1 #2-$k$2 by the measurement apparatus 2 #2 in order to control the processing apparatus 1 #2-$k$2 (note that k2 is a variable number representing an integer that is equal to or larger than 1 and that is equal to or smaller than n2). Note that a method of controlling the plurality of processing apparatuses 1 by the control apparatus 3 may be same as a method in the six example embodiment, and thus, a detailed description thereof is omitted. However, in the seventh example embodiment, at the step S13 in FIG. 12, the control apparatus 3 may control the head driving system 14 #1-$k$1 of the processing apparatus 1 #1-$k$1 and the head driving system 14 #2-$k$2 of the processing apparatus 1 #2-$k$2 and based on the measured results by the measurement apparatuses 2 #1 and 2 #2 so that the processing apparatus 1 #1-$k$1 does not collide with the processing apparatus 1 #2-$k$2.

The processing system SYSg in the seventh example embodiment described above is capable of achieving an effect that is same as the effect achievable by the processing system SYSf in the sixth example embodiment described above.

Incidentally, in the processing system SYSf in the sixth example embodiment and the processing system SYSg in the seventh example embodiment, the number of the measurement apparatuses 2 is smaller than the number of the processing apparatuses 1. However, the number of the measurement apparatuses 2 may be larger than the number of the processing apparatuses 1. Moreover, the number of the measurement apparatuses 2 may be equal to the number of the processing apparatuses 1.

Note that at least one of the processing system SYSb in the second example embodiment to the processing system SYSe in the fifth example embodiment described above may include a feature that is unique to the processing system SYSg in the seventh example embodiment. The feature that is unique to the processing system SYSg in the seventh example embodiment may include a feature related to the plurality of measurement apparatuses 2.

(8) Modified Example

In the above-described description, the processing system SYS measures the position of the workpiece W by using the imaging apparatus 15, measures the position of the workpiece W by using the measurement light ML2 through the measurement optical system 132 and measures the position of at least one of the processing head 13 the workpiece W by using the measurement apparatus 2. However, the processing system SYS may not measure the position of the workpiece W by using the imaging apparatus 15. In this case, the processing system SYS may not include the imaging apparatus 15. The processing system SYSa may not perform the operation at the step S14 in FIG. 12. The processing system SYS may not measure the position of the workpiece W by using the measurement light ML2 through the measurement optical system 132. In this case, the processing system SYS may not include a component that is necessary for irradiating the workpiece W with the measurement light ML2 (Specifically, the measurement light source 12 and the measurement optical system 132). The processing system SYSa may not perform the operation at the step S16 in FIG. 12. The processing system SYS may not measure the position of at least one of the processing head 13 the workpiece W by using the measurement apparatus 2. In this case, the processing system SYS may not include the measurement apparatus 2.

Figure 26:
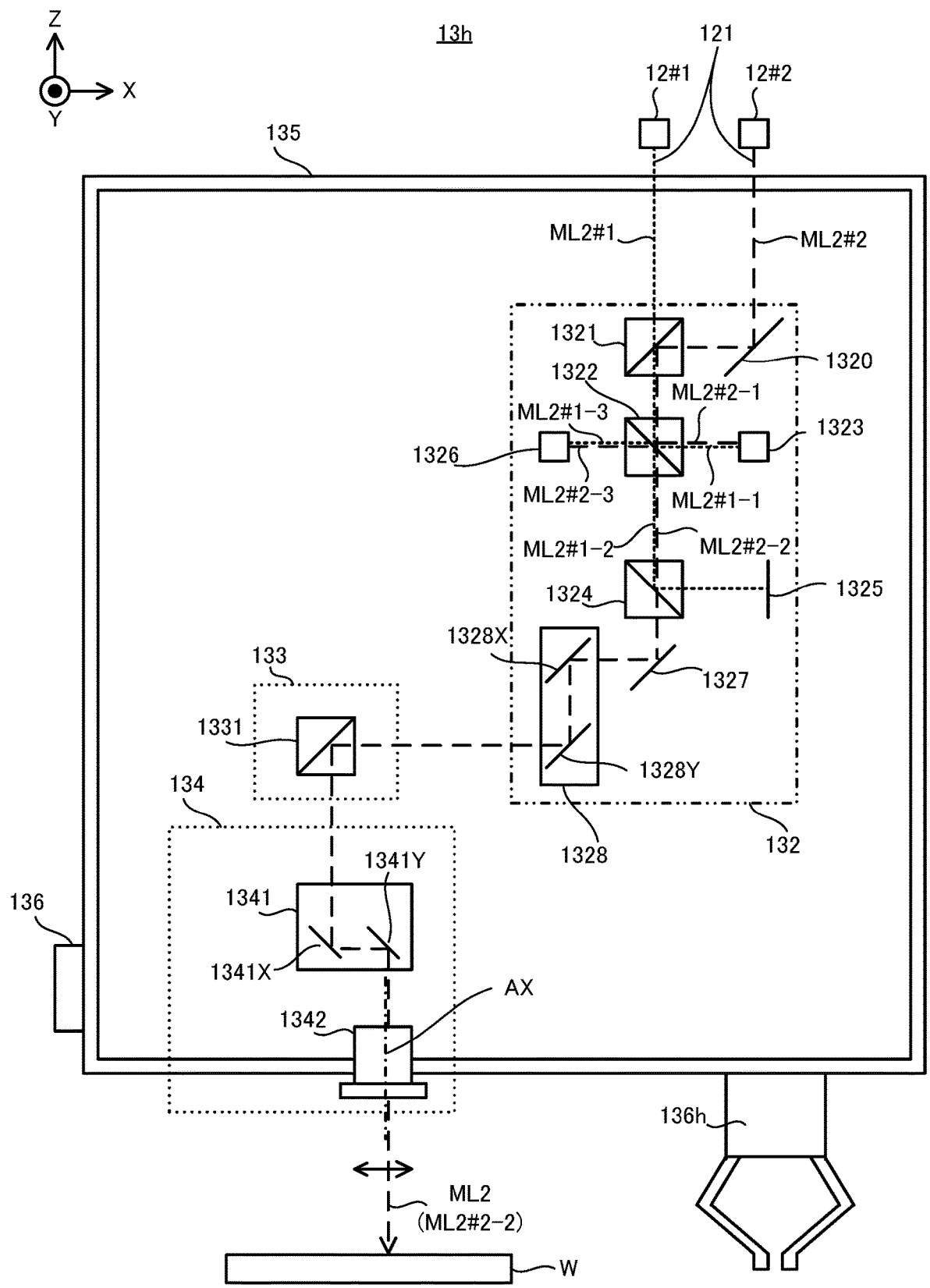
FIG. 26 is a cross-sectional view that illustrates one example of the processing head including an end effector.

In the above-described description, the processing system SYS includes the processing head 13 that is configured to emit the processing light EL. However, the processing system SYS may include a processing head 13h including any end effector 136h that is configured to perform any operation for the workpiece W, in addition to or instead of the processing head 13 that is configured to emit the processing light EL. FIG. 26 illustrates one example of the processing head 13h including the end effector 136h. In an example illustrated in FIG. 26, the end effector 136h is attached to the head housing 135. The processing system SYS including the end effector 136h may be referred to as a robot system. The processing head 13h may be different from the processing head 13 in that it may not include a component related to the processing light EL (specifically, the processing optical system 131). Furthermore, when the processing head 13h does not include the component relate to the processing light EL, the processing head 13h may not include the combining optical system 133, because the processing light EL may not be combined with the measurement light ML2. However, the processing head 13h may include the component relate to the processing light EL and the combining optical system 133.

In the above-described description, the processing system SYS processes the workpiece W by irradiating the workpiece W with the processing light EL. However, the processing system SYS may process the workpiece W by irradiating the workpiece W with any energy beam (this energy beam may be referred to as a "processing beam") that is different from a light. In this case, the processing system SYS may include a beam source that is configured to generate any energy beam in addition to or instead of the processing light source 11. A charged particle beam such as an electron beam, an ion beam and the like is one example of any energy beam An electromagnetic wave is another example of any energy beam.

Alternatively, the processing apparatus 1 may process the workpiece W by using a tool. Namely, the processing apparatus 1 may perform a machine processing of the workpiece W. In this case, the processing head 13 may include the tool in addition to or instead of each optical system. However, when the processing head 13 measures the position of the workpiece W by using the measurement light ML2 even in a case where the processing apparatus 1 performs the machine processing, the processing head 13 may include the optical system that is necessary for irradiating the workpiece W with the measurement light ML2 (Specifically, the measurement optical system 132 and the objective optical system 134).

The processing apparatus 1 may include an exhaust apparatus. The exhaust apparatus may be configured to exhaust a gas in the processing space in which the workpiece W is disposed. Especially, the exhaust apparatus may be configured to suck an unnecessary substance, which is generated by the irradiation with the processing light EL, from the processing space to an outside of the processing space by exhausting the gas in the processing space. Especially, there is a possibility that the unnecessary substance affect the irradiation of the workpiece W with the processing light EL when the unnecessary substance exists on the optical path of the processing light EL. Thus, the exhaust apparatus especially suck the unnecessary substance from a space including the optical path of the processing light EL between the fθ lens 1342, which is the terminal optical element of the processing head 13, and the workpiece W as well as the gas in this space. Note that a vapor of the workpiece W (namely, a gas including a particle generated by a clumping of the vapor of the workpiece W, and what we call a fume) is one example of the unnecessary substance.

The processing apparatus 1 may include a gas supply apparatus. The gas supply apparatus may supply a gas to the processing space in which the workpiece W is disposed. Especially, the exhaust apparatus may prevent the unnecessary substance, which is generated by the irradiation with the processing light EL, from being adhered to processing head 13 (especially, the fθ lens 1342 that is the terminal optical element of the processing head 13) located in the processing space by supplying the gas to the processing space. The exhaust apparatus may blow (namely, remove) the unnecessary substance adhered to processing head 13 (especially, the fθ lens 1342 that is the terminal optical element of the processing head 13) by supplying the gas to the processing space.

The feature of each example embodiment described above is allowed to be combined appropriately. A part of the feature of each example embodiment described above may not be used. The feature of each example embodiment described above may be allowed to be replaced by the feature of other example embodiment, if needed. Moreover, the disclosures of all publications and United States patents related to the apparatus and the like that are cited in each example embodiment described above are incorporated in the disclosures of the present application by reference if it is legally permitted.

The present invention is allowed to be changed, if desired, without departing from the essence or spirit of the invention which can be read from the claims and the entire specification, and a processing system, which involves such changes, is also intended to be within the technical scope of the present invention.

DESCRIPTION OF REFERENCE CODES

1 processing apparatus
13 processing head
131 processing optical system
132 measurement optical system
134 objective optical system
14 head driving system
141 self-propelled driving system
142 arm driving system
143 micromotion driving system
15 imaging apparatus
2 measurement apparatus
3 control apparatus
EL processing light
ML1, ML2, ML3 measurement light
SYS processing system

The invention claimed is:

1. A processing system that processes an object by irradiating the object with a processing light through an irradiation optical system,
the processing system comprising:
an irradiation apparatus that includes at least a terminal optical element of the irradiation optical system;
a movement apparatus that moves the irradiation apparatus;
a first measurement apparatus that is disposed at the irradiation apparatus and that measures a position of the object;
a second measurement apparatus that measures a position of the object through the irradiation optical system; and
a third measurement apparatus that measures a position of the irradiation apparatus.

2. The processing system according to claim 1, wherein
the first measurement apparatus is disposed at a position fixed relative to the terminal optical element and measures the position of the object,
the third measurement apparatus measures the position of a reflection part by irradiating the reflection part, which is disposed at a position fixed relative to the terminal optical element, with a measurement light and detecting the measurement light reflected by the reflection part.

3. The processing system according to claim 1, wherein
the first measurement apparatus measures the position of the object in at least a direction that intersects with an irradiation direction of the processing light,
the second measurement apparatus measures the position of the object in the irradiation direction of the processing light through at least a part of the irradiation optical system,
the third measurement apparatus measures the position of the irradiation apparatus by emitting, from a position which is away from the irradiation apparatus, a measurement light toward the irradiation apparatus and detecting the measurement light.

4. The processing system according to claim 1, wherein
the processing system processes the object based on a measured result by the first measurement apparatus, a measured result by the second measurement apparatus and a measured result by the third measurement apparatus.

5. The processing system according to claim 1, wherein
a measurement resolution of the first measurement apparatus and a measurement resolution of the second measurement apparatus are higher than a measurement resolution of the third measurement apparatus.

6. The processing system according to claim 1 further comprising a driving apparatus that drives the irradiation apparatus in a moving stroke that is shorter than a moving stroke by the movement apparatus,
the driving apparatus driving the irradiation apparatus based on a measured result by the first measurement apparatus.

7. The processing system according to claim 1, wherein
the movement apparatus moves the irradiation apparatus based on a measured result by the third measurement apparatus,
a measurement by the first measurement apparatus starts in a period during which or after the movement apparatus moves the irradiation apparatus.

8. The processing system according to claim 1 further comprising:
a driving apparatus that drives the irradiation apparatus in a moving stroke that is shorter than a moving stroke by the movement apparatus; and
a focal position change apparatus that changes a focal position of the processing light,
the movement apparatus moving the irradiation apparatus and the first measurement apparatus based on a measured result by the third measurement apparatus,
the driving apparatus driving the irradiation apparatus in at least one direction based on a measured result by the first measurement apparatus in a period during which or after the movement apparatus moves the irradiation apparatus,
the focal position change apparatus changing the focal position of the processing light based on a measured result by the second measurement apparatus in a period during which or after the driving apparatus drives the irradiation apparatus.

9. The processing system according to claim 1, wherein
the second measurement apparatus measures the position of the object by emitting a measurement light source light from a measurement light source through at least a part of the irradiation optical system and detecting the measurement light source light from the object through the irradiation optical system.

10. The processing system according to claim 1, wherein
a distance between the irradiation apparatus and the object is shorter than a distance between the third measurement apparatus and the irradiation apparatus.

11. The processing system according to claim 1 further comprising a control apparatus that controls a processing of the object,
the control apparatus recognizing a predetermined area of the object based on a measurement result by the first measurement apparatus and performing a control for allowing the irradiation apparatus to be static relative to the recognized predetermined area.

12. The processing system according to claim 1, wherein
the first measurement apparatus includes an imaging apparatus that is configured to capture an image of the object.

13. The processing system according to claim 12, wherein
the imaging apparatus is configured to capture an image of an object marker formed on the object.

14. The processing system according to claim 1, wherein
the first measurement apparatus includes a first optical measurement apparatus that is configured to measure the position of the object by irradiating the object with a metering light not through the irradiation optical system and detecting the metering light from the object not through the irradiation optical system.

15. The processing system according to claim 1, wherein
the first measurement apparatus measures the position of the object not through at least the terminal optical system.

16. The processing system according to claim 1, wherein
the second measurement apparatus is configured to emit a measurement light source light from a measurement light source through the irradiation optical system and detect the measurement light source light from the object through the irradiation optical system.

17. The processing system according to claim 1, wherein
the third measurement apparatus is configured to emit measurement light and detect the measurement light from the irradiation apparatus.

18. The processing system according to claim 1, wherein the third measurement apparatus is configured to measures a position of at least one of the irradiation apparatus and the object from a position that is away from the irradiation apparatus and the object.

19. The processing system according to claim 1, wherein the first measurement apparatus is configured to measure the position of the object in at least one of a direction along a first measurement axis, a direction along a second measurement axis that intersects with the first measurement axis, and a rotational direction around a third measurement axis that intersects with both of the first and second measurement axes.

20. The processing system according to claim 1, wherein the second measurement apparatus is configured to measure the position of the object in a direction along a third measurement axis that intersects with both of a first measurement axis and a second measurement axis that intersects with the first measurement axis.

21. The processing system according to claim 20, wherein the second measurement apparatus measures the position of the object by emitting a measurement light source light from a measurement light source and detecting the measurement light source light from the object, the direction along the third measurement axis is parallel to a direction along an irradiation direction of the measurement light source light.

22. The processing system according to claim 1, wherein the second measurement apparatus is configured to detect a shape of a surface of the object by irradiating each of a plurality of parts on the surface of the object with a measurement light source light from a measurement light source and detecting the measurement light source light from the plurality of parts on the surface of the object through the irradiation optical system.

23. The processing system according to claim 1, wherein the second measurement apparatus is configured to measure the position of the object in at least one of a direction along a third measurement axis that intersects with both of a first measurement axis and a second measurement axis that intersects with the first measurement axis, a rotational direction around the first measurement axis and a rotational direction around the second measurement axis.

24. The processing system according to claim 1, wherein the third measurement apparatus includes an angular velocity detection apparatus that is configured to detect an angular velocity of the irradiation apparatus.

25. The processing system according to claim 1, wherein the third measurement apparatus is configured to measure a position of at least one of the irradiation optical system and the object by using a satellite positioning system.

26. The processing system according to claim 1, wherein the third measurement apparatus is configured to measure the position of the irradiation apparatus in at least one of a direction along a first measurement axis, a direction along a second measurement axis that intersects with the first measurement axis, a direction along a third measurement axis that intersects with both of the first and second measurement axes, a rotational direction around the first measurement axis, a rotational direction around the second measurement axis and a rotational direction around the third measurement axis.

27. The processing system according to claim 1, wherein the movement apparatus is a first movement apparatus, the processing system further comprises:
a driving apparatus that drives the irradiation apparatus in a moving stroke that is shorter than a moving stroke by the first movement apparatus; and
a second movement apparatus that moves the irradiation apparatus in a moving stroke that is longer than the moving stroke by the first movement apparatus,
the irradiation optical system includes a focal position change apparatus that changes an irradiation position of the processing light on a surface of the object by changing a focal position of the processing light,
the driving apparatus includes:
a first connection member that is connected to the irradiation apparatus;
a second connection member that is connected to the first movement apparatus;
a driving member that moves the irradiation apparatus relative to the object by changing a relative positional relationship between the first connection member and the second connection member; and
an elastic member by which the first connection member is coupled with the second connection member,
the first movement apparatus includes:
a third connection member that is connected to the driving apparatus;
a fourth connection member that is connected to the second movement apparatus; and
a movable member that is movable to change a relative positional relationship between the third connection member and the fourth connection member,
the second movement apparatus includes:
a fifth connection member that is connected to the first movement apparatus; and
a movement mechanism that moves the fifth connection member relative to the object.

28. The processing system according to claim 27, wherein the movable member includes: a plurality of arm members; and a joint member that connects the plurality of arm members in a movable manner.

29. The processing system according to claim 27, wherein the movement mechanism includes at least one of a self-propelled apparatus that is configured to move by itself without interfering with the object and a flying apparatus that is configured to fly at a position that is away from the object.

30. The processing system according to claim 27, wherein a moving accuracy of the driving apparatus is higher than a moving accuracy of the first movement apparatus, the moving accuracy of the first movement apparatus is higher than a moving accuracy of the second movement apparatus.

31. The processing system according to claim 27 performing:
a first operation for controlling at least one of the first and second movement apparatuses based on a measured result by the third measurement apparatus and a position information related to a position of a shot area so that the irradiation apparatus moves to a position at which the irradiation optical system is allowed to irradiate the shot area on a surface of the object with the processing light; and
a second operation for controlling the driving apparatus based on a measured result by the first measurement apparatus so that a relative positional relationship between the shot area and at least a terminal optical element of the irradiation optical system is fixed and for controlling the focal position change apparatus based on a measured result by the second measurement apparatus and a processing detail information indicating a detail of a processing in the shot area so that a desired position in the shot area is irradiated with the processing light after performing the first operation.

32. The processing system according to claim 31, wherein the driving apparatus does not move the irradiation apparatus and the focal position change apparatus does not change the focal position in a period during which the first operation is performed,
the first and second movement apparatuses do not move the irradiation apparatus in a period during which the second operation is performed.

33. The processing system according to claim 31, wherein the second movement apparatus moves the irradiation apparatus and then the first movement apparatus moves the irradiation apparatus in a period during which the first operation is performed.

34. A processing system that processes an object by irradiating the object with a processing light through an irradiation optical system,
the processing system comprising:
an irradiation apparatus that includes at least a terminal optical element of the irradiation optical system;
a movement apparatus that moves the irradiation apparatus;
a first measurement apparatus that is disposed at the irradiation apparatus and that measures a position of the object;
a second measurement apparatus that measures a position of the object through at least the terminal optical element of the irradiation optical system; and
a third measurement apparatus that measures a position of the irradiation apparatus by emitting, from a position which is away from the irradiation apparatus, a measurement light toward the irradiation apparatus and detecting the measurement light.

35. The processing system according to claim 34 further comprising a driving apparatus that drives the irradiation apparatus in a moving stroke that is shorter than a moving stroke by the movement apparatus,
the driving apparatus driving the irradiation apparatus based on a measured result by the first measurement apparatus.

36. The processing system according to claim 34, wherein the movement apparatus moves the irradiation apparatus based on a measured result by the third measurement apparatus,
a measurement by the first measurement apparatus starts in a period during which or after the movement apparatus moves the irradiation apparatus.

37. The processing system according to claim 34 further comprising:
a driving apparatus that drives the irradiation apparatus in a moving stroke that is shorter than a moving stroke by the movement apparatus; and
a focal position change apparatus that changes a focal position of the processing light,
the movement apparatus moving the irradiation apparatus and the first measurement apparatus based on a measured result by the third measurement apparatus,
the driving apparatus driving the irradiation apparatus in at least one direction based on a measured result by the first measurement apparatus in a period during which or after the movement apparatus moves the irradiation apparatus,
the focal position change apparatus changing the focal position of the processing light based on a measured result by the second measurement apparatus in a period during which or after the driving apparatus drives the irradiation apparatus.

38. The processing system according to claim 34, wherein the processing system processes the object based on a measured result by the first measurement apparatus, a measured result by the second measurement apparatus and a measured result by the third measurement apparatus.

39. The processing system according to claim 34, wherein the second measurement apparatus measures the position of the object by emitting a measurement light source light from a measurement light source through at least a part of the irradiation optical system and detecting the measurement light source light from the object through the irradiation optical system.

40. The processing system according to claim 39, wherein the measurement light source is a first measurement light source,
the second measurement apparatus is configured to detect an interference light of the measurement light source light from the object through the irradiation optical system and a reference light from a second measurement light source.

41. The processing system according to claim 40, wherein at least one of the measurement light source light and the reference light includes a pulsed light including frequency components that are arranged with equal interval on a frequency axis.

42. The processing system according to claim 34, wherein a distance between the irradiation apparatus and the object is shorter than a distance between the third measurement apparatus and the irradiation apparatus.

43. The processing system according to claim 34, wherein a measurement resolution of the first measurement apparatus and a measurement resolution of the second measurement apparatus are higher than a measurement resolution of the third measurement apparatus.

44. The processing system according to claim 34 further comprising a control apparatus that controls a processing of the object,
the control apparatus recognizing a predetermined area of the object based on a measured result by the first measurement apparatus and performing a control for allowing the irradiation apparatus to be static relative to the recognized predetermined area.

45. The processing system according to claim 34 further comprising a control apparatus that controls a processing of the object,
the control apparatus:
controls the movement apparatus to move the irradiation apparatus to a predetermined area of the object based on a measured result by the third measurement apparatus;
recognizes the predetermined area based on a measurement result by the first measurement apparatus and performs a control for allowing the irradiation apparatus to be static relative to the recognized predetermined area; and
controls the irradiation apparatus to perform the processing based on a measurement result by the second measurement apparatus.

46. A processing system that processes an object, the processing system comprising:
- a movable arm;
- an end effector that is connected to the movable arm and that is for processing the object;
- a first measurement apparatus that is fixed relative to the end effector and that measures a position of the object;
- a second measurement apparatus that measures a position of the object through an irradiation optical system; and
- a third measurement apparatus that measures a position of the end effector by emitting, from a position which is away from the end effector, a measurement light toward the end effector and detecting the measurement light.

47. The processing system according to claim 46, wherein
the processing system processes the object by irradiating the object with a processing light through an irradiation optical system,
the end effector includes an irradiation apparatus that includes at least a terminal optical element of the irradiation optical system,
the movable arm is a movement apparatus that moves the irradiation apparatus.

48. The processing system according to claim 47 further comprising a driving apparatus that drives the irradiation apparatus in a moving stroke that is shorter than a moving stroke by the movable arm,
the driving apparatus driving the irradiation apparatus based on a measured result by the first measurement apparatus.

49. The processing system according to claim 47, wherein
the movable arm moves the irradiation apparatus based on a measured result by the third measurement apparatus,
a measurement by the first measurement apparatus starts in a period during which or after the movable arm moves the irradiation apparatus.

50. The processing system according to claim 47 further comprising:
- a driving apparatus that drives the irradiation apparatus in a moving stroke that is shorter than a moving stroke by the movable arm; and
- a focal position change apparatus that changes a focal position of the processing light,
the movable arm moving the irradiation apparatus and the first measurement apparatus based on a measured result by the third measurement apparatus,
the driving apparatus driving the irradiation apparatus in at least one direction based on a measured result by the first measurement apparatus in a period during which or after the movable arm moves the irradiation apparatus,
the focal position change apparatus changing the focal position of the processing light based on a measured result by the second measurement apparatus in a period during which or after the driving apparatus drives the irradiation apparatus.

51. The processing system according to claim 47, wherein
the second measurement apparatus measures the position of the object by emitting a measurement light source light from a measurement light source through at least a part of the irradiation optical system and detecting the measurement light source light from the object through the irradiation optical system.

52. The processing system according to claim 47, wherein
a distance between the irradiation apparatus and the object is shorter than a distance between the third measurement apparatus and the irradiation apparatus.

53. The processing system according to claim 47 further comprising a control apparatus that controls a processing of the object,
the control apparatus recognizing a predetermined area of the object based on a measurement result by the first measurement apparatus and performing a control for allowing the irradiation apparatus to be static relative to the recognized predetermined area.

54. The processing system according to claim 46, wherein
the third measurement apparatus includes an angular velocity detection apparatus that is configured to detect an angular velocity of the end effector.

55. The processing system according to claim 46, wherein
the third measurement apparatus is configured to measure the position of the end effector by using a satellite positioning system.

56. The processing system according to claim 46, wherein
the third measurement apparatus is configured to measure the position of the end effector in at least one of a direction along a first measurement axis, a direction along a second measurement axis that intersects with the first measurement axis, a direction along a third measurement axis that intersects with both of the first and second measurement axes, a rotational direction around the first measurement axis, a rotational direction around the second measurement axis and a rotational direction around the third measurement axis.

57. The processing system according to claim 46, wherein
the processing system processes the object by irradiating the object with a processing light through an irradiation optical system,
the end effector includes an irradiation apparatus that includes at least a terminal optical element of the irradiation optical system,
the movable arm is a movement apparatus that moves the irradiation apparatus.

58. A processing method of processing an object by irradiating the object with a processing light through an irradiation optical system,
the processing method comprising:
- measuring a position of the object by using a first measurement apparatus that is disposed at an irradiation apparatus, the irradiation apparatus including at least a terminal optical element of the irradiation optical system;
- measuring a position of the object through the irradiation optical system by using a second measurement apparatus;
- measuring a position of the irradiation apparatus by using a third measurement apparatus; and
- moving the irradiation apparatus by using a movement apparatus.

59. A processing method of processing an object by irradiating the object with a processing light through an irradiation optical system,
the processing method comprising:
- measuring a position of the object by using a first measurement apparatus, the first measurement apparatus being disposed at an irradiation apparatus, the irradiation apparatus including at least a terminal optical element of the irradiation optical system;
- measuring a position of the object through at least the terminal optical element of the irradiation optical system by using a second measurement apparatus;
- measuring a position of the irradiation apparatus by using a third measurement apparatus, the third measurement apparatus being configured to measure the position of the irradiation apparatus by emitting, from a position which is away from the irradiation apparatus, a measurement light toward the irradiation apparatus and detecting the measurement light; and moving the irradiation apparatus by using a movement apparatus.

60. A processing method of processing an object, the processing method comprising:

measuring a position of the object by using a first measurement apparatus, the first measurement apparatus being fixed relative to an end effector, the end effector being connected to a movable arm and being for processing the object;

measuring a position of the object through an irradiation optical system by using a second measurement apparatus; and measuring a position of the end effector by using a third measurement apparatus, the third measurement apparatus being configured to measure the position of the end effector by emitting, from a position which is away from the end effector, a measurement light toward the end effector and detecting the measurement light.

\* \* \* \* \*